(12) United States Patent
Lynam et al.

(10) Patent No.: US 11,543,724 B2
(45) Date of Patent: Jan. 3, 2023

(54) MULTIFUNCTIONAL REARWARD VIEWING CAMERA SYSTEM

(71) Applicant: MAGNA MIRRORS OF AMERICA, INC., Holland, MI (US)

(72) Inventors: Niall R. Lynam, Holland, MI (US); Hamid Habibi, Holland, MI (US); Rodney K. Blank, Zeeland, MI (US); Christopher R. Koetje, Zeeland, MI (US); Mark L. Larson, Grand Haven, MI (US); Patrick M. Foley, IV, Nunica, MI (US); Michael L. Gallas, South Haven, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 169 days.

(21) Appl. No.: 17/249,685

(22) Filed: Mar. 10, 2021

(65) Prior Publication Data

US 2021/0191222 A1    Jun. 24, 2021

Related U.S. Application Data

(62) Division of application No. 16/098,177, filed as application No. PCT/IB2017/052542 on May 2, 2017, now Pat. No. 10,948,798.

(Continued)

(51) Int. Cl.
*G02F 1/163* (2006.01)
*B60R 1/04* (2006.01)
(Continued)

(52) U.S. Cl.
CPC ............... *G02F 1/163* (2013.01); *B60R 1/04* (2013.01); *B60R 1/088* (2013.01); *G02F 1/153* (2013.01); *G02F 1/155* (2013.01); *G02F 1/161* (2013.01)

(58) Field of Classification Search
CPC .......... G02F 1/163; G02F 1/153; G02F 1/155; G02F 1/161; B60R 1/04; B60R 1/088
(Continued)

(56) References Cited

U.S. PATENT DOCUMENTS 3,427,096 A    2/1969  Dykema et al.
4,435,042 A    3/1984  Wood et al.
(Continued)

FOREIGN PATENT DOCUMENTS

FR       2396728 A1   2/1979
WO    2012051500 A1   4/2012
WO    2013071070 A1   5/2013

OTHER PUBLICATIONS

European Extended Search Report dated May 7, 2019 for EP Application No. 17792580.7.
(Continued)

*Primary Examiner* — Mohammed A Hasan
(74) *Attorney, Agent, or Firm* — Honigman LLP

(57) ABSTRACT

A multifunctional rear camera system includes a rear camera and a processor. Responsive to processing of captured image data, the processor generates respective outputs for (i) a rear backup assist function, (ii) a mirror dimming control for at least an electro-optic interior rearview mirror assembly of the vehicle and (iii) ambient light detection. The processor processes a mirror zone of captured image data for mirror dimming control and processes upper corner regions of captured image data for ambient light detection. The processor processes at least lower regions of captured image data for the rear backup assist function. The generated output for the mirror dimming control is provided to the electro-optic interior rearview mirror assembly to control dimming of the electro-optic reflective element. The generated output for the rear backup assist function provides (i)

(Continued)

object detection and/or (ii) video display of video images derived from captured image data.

28 Claims, 35 Drawing Sheets

Related U.S. Application Data

(60) Provisional application No. 62/471,491, filed on Mar. 15, 2017, provisional application No. 62/371,256, filed on Aug. 5, 2016, provisional application No. 62/344,527, filed on Jun. 2, 2016, provisional application No. 62/340,679, filed on May 24, 2016, provisional application No. 62/338,124, filed on May 18, 2016, provisional application No. 62/330,556, filed on May 2, 2016.

(51) Int. Cl.
  *B60R 1/08* (2006.01)
  *G02F 1/155* (2006.01)
  *G02F 1/161* (2006.01)
  *G02F 1/153* (2006.01)

(58) Field of Classification Search
  USPC ......................................................... 359/265
  See application file for complete search history.

(56) References Cited

U.S. PATENT DOCUMENTS

| | | |
|---|---|---|
| 4,436,371 A | 3/1984 | Wood et al. |
| 4,826,289 A | 5/1989 | Vandenbrink et al. |
| 4,948,242 A | 8/1990 | Desmond et al. |
| 5,066,112 A | 11/1991 | Lynam et al. |
| 5,073,012 A | 12/1991 | Lynam |
| 5,115,346 A | 5/1992 | Lynam |
| 5,128,799 A | 7/1992 | Byker |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,239,405 A | 8/1993 | Varaprasad et al. |
| 5,327,288 A | 7/1994 | Wellington et al. |
| 5,424,865 A | 6/1995 | Lynam |
| 5,446,576 A | 8/1995 | Lynam et al. |
| 5,500,760 A | 3/1996 | Varaprasad et al. |
| 5,525,264 A | 6/1996 | Cronin et al. |
| 5,530,240 A | 6/1996 | Larson et al. |
| 5,668,663 A | 9/1997 | Varaprasad et al. |
| 5,688,663 A | 11/1997 | Yaver et al. |
| 5,715,093 A | 2/1998 | Schierbeek et al. |
| 5,724,187 A | 3/1998 | Varaprasad et al. |
| 5,760,962 A | 6/1998 | Schofield et al. |
| 5,796,094 A | 8/1998 | Schofield et al. |
| 5,877,897 A | 3/1999 | Schofield et al. |
| 5,984,482 A | 11/1999 | Rumsey et al. |
| 6,097,023 A | 8/2000 | Schofield et al. |
| 6,139,172 A | 10/2000 | Bos et al. |
| 6,178,034 B1 | 1/2001 | Allemand et al. |
| 6,201,642 B1 | 3/2001 | Bos |
| 6,318,870 B1 | 11/2001 | Spooner et al. |
| 6,326,613 B1 | 12/2001 | Heslin et al. |
| 6,420,036 B1 | 7/2002 | Varaprasad et al. |
| 6,439,755 B1 | 8/2002 | Fant, Jr. et al. |
| 6,445,287 B1 | 9/2002 | Schofield et al. |
| 6,501,387 B2 | 12/2002 | Skiver et al. |
| 6,590,719 B2 | 7/2003 | Bos |
| 6,598,980 B2 | 7/2003 | Marusawa et al. |
| 6,690,268 B2 | 2/2004 | Schofield et al. |
| 6,717,610 B1 | 4/2004 | Bos et al. |
| 6,757,109 B2 | 6/2004 | Bos |
| 6,824,281 B2 | 11/2004 | Schofield et al. |
| 7,004,606 B2 | 2/2006 | Schofield |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,480,149 B2 | 1/2009 | DeWard et al. |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,914,188 B2 | 3/2011 | DeLine et al. |
| 8,154,418 B2 | 4/2012 | Peterson et al. |
| 8,256,821 B2 | 9/2012 | Lawlor et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 9,346,403 B2 | 5/2016 | Uken et al. |
| 9,598,016 B2 | 3/2017 | Blank et al. |
| 10,948,798 B2 | 3/2021 | Lynam et al. |
| 2001/0022550 A1 | 9/2001 | Steffel |
| 2002/0003571 A1 | 1/2002 | Schofield et al. |
| 2002/0158805 A1 | 10/2002 | Turnbull et al. |
| 2003/0117728 A1 | 6/2003 | Hutzel et al. |
| 2004/0196179 A1 | 10/2004 | Turnbull |
| 2004/0207940 A1 | 10/2004 | Carter et al. |
| 2009/0097097 A1 | 4/2009 | Desmond et al. |
| 2009/0295181 A1 | 12/2009 | Lawlor et al. |
| 2012/0026571 A1 | 2/2012 | Uken et al. |
| 2012/0105641 A1 | 5/2012 | Schofield et al. |
| 2012/0154591 A1* | 6/2012 | Baur ..................... H04N 7/183 348/148 |
| 2012/0236388 A1 | 9/2012 | De Wind et al. |
| 2013/0088884 A1 | 4/2013 | Brummel et al. |
| 2013/0107563 A1 | 5/2013 | McCabe et al. |
| 2014/0002239 A1 | 1/2014 | Rayner |
| 2014/0022390 A1 | 1/2014 | Blank et al. |
| 2014/0160284 A1 | 6/2014 | Achenbach et al. |
| 2014/0209790 A1 | 7/2014 | Turnbull et al. |
| 2014/0226012 A1 | 8/2014 | Achenbach |
| 2014/0268281 A1 | 9/2014 | Nelson et al. |
| 2014/0293169 A1 | 10/2014 | Uken et al. |
| 2014/0313563 A1 | 10/2014 | Uken et al. |
| 2015/0015713 A1 | 1/2015 | Wang et al. |
| 2015/0097955 A1 | 4/2015 | De Wind et al. |
| 2015/0140146 A1 | 5/2015 | Habibi |
| 2015/0251605 A1 | 9/2015 | Uken et al. |
| 2015/0283945 A1 | 10/2015 | Krebs et al. |
| 2015/0327398 A1 | 11/2015 | Achenbach et al. |
| 2015/0334354 A1 | 11/2015 | Uken et al. |
| 2016/0009226 A1 | 1/2016 | Krebs |
| 2016/0023606 A1 | 1/2016 | Krebs |
| 2016/0375833 A1 | 12/2016 | Larson et al. |
| 2018/0022266 A1* | 1/2018 | Tzeng ..................... B60Q 1/143 362/466 |
| 2019/0047475 A1* | 2/2019 | Uken ..................... B60R 1/088 |
| 2020/0254932 A1 | 8/2020 | De Wind et al. |

OTHER PUBLICATIONS

International Search Report and Written Opinion dated Sep. 29, 2017 for corresponding PCT Application No. PCT/IB2017/052542.
"Car Wireless Rearview Camera System Car Bluetooth Handfree Rearview Mirror," Souq.com N.p. Nov. 16, 2013 Web Mar. 2, 2017 <http://web.archive.org/web/20131116070456/http://uae.souq.com/ae-en/car-wireless-rearview-camera-system-car-bluetooth-handsfree-rearview-mirror-3-5inch-monitor-wireless-earpiece-5034623/i/>.

* cited by examiner

MULTIFUNCTIONAL REARWARD VIEWING CAMERA SYSTEM

CROSS REFERENCE TO RELATED APPLICATIONS

The present application is a division of U.S. patent application Ser. No. 16/098,177, filed Nov. 1, 2018, now U.S. Pat. No. 10,948,798, which is a 371 U.S. national stage filing of PCT Application No. PCT/IB2017/052542, filed May 2, 2017, which claims the filing benefits of U.S. provisional applications, Ser. No. 62/471,491, filed Mar. 15, 2017, Ser. No. 62/371,256, filed Aug. 5, 2016, Ser. No. 62/344,527, filed Jun. 2, 2016, Ser. No. 62/340,679, filed May 24, 2016, Ser. No. 62/338,124, filed May 18, 2016, and Ser. No. 62/330,556, filed May 2, 2016, which are hereby incorporated herein by reference in their entireties.

FIELD OF THE INVENTION

The present invention relates to rearview mirror assemblies for vehicles and, more particularly, to interior rearview mirror assemblies adjustably mounted at an interior of a vehicle.

BACKGROUND OF THE INVENTION

Rearview mirrors have been used in the interior of vehicles for decades upon decades. Conventionally, an interior rearview mirror assembly comprises a mirror reflective element housed or encased by or in a casing or housing and includes a mounting portion that attaches typically at the inner surface of the windshield of an equipped vehicle. Exemplary conventional interior rearview mirror assemblies are disclosed in U.S. Pat. Nos. 6,139,172; 6,690,268; 7,195,381; 6,318,870; 6,598,980; 5,327,288; 4,948,242; 4,826,289; 4,436,371 and 4,435,042, which are hereby incorporated herein by reference in their entireties. Although there has been a progression and improvement in construction of such interior rearview mirror assemblies over time (for example such as the frameless mirror constructions disclosed in U.S. Pat. Nos. 8,508,831 and 8,730,553, and International Publication Nos. WO 2012/051500 and WO 2013/071070, which are hereby incorporated herein by reference in their entireties), conventional interior rearview mirror assemblies utilize a relatively bulky housing or casing (usually formed of a plastic material via plastic injection molding). Furthermore, the likes of interior electrochromic (EC) rearview mirror assemblies (for example such as the interior EC rearview mirror constructions disclosed in U.S. Pat. Nos. 7,626,749; 7,274,501; 7,255,451; 7,195,381; 7,184,190; 6,690,268; 5,151,824; 5,446,576; 5,724,187 and 5,668,663, which are hereby incorporated herein by reference in their entireties) house in a mirror housing (together with the interior electrochromic mirror reflective element itself) the likes of circuitry for automatic dimming of the EC medium used and also the likes of an ambient light detecting photosensor and a glare detecting photosensor used in conjunction with such automatic dimming circuitry.

The interior electrochromic mirror reflective element/mirror housing combination is then mounted in the equipped vehicle and is adjustable about a pivot joint. Conventional interior rearview mirrors thus utilize a bulky and often heavy mirror housing/casing with disadvantages that include impaired vibration performance due to weight, bulky and thus unattractive size, and manufacturing cost and complexity challenges.

SUMMARY OF THE INVENTION

In accordance with the present invention, the need for and use of a mirror housing/casing is dispensed with and the mirror reflective element itself is pivotally attached to a windshield electronics module that itself attaches at the interior of the equipped vehicle (typically to or at the inner surface of the in-cabin side of the vehicle windshield). The mirror head comprises a mirror reflective element and a plate or rear attachment portion for pivotally mounting the mirror head at the interior of the vehicle.

In accordance with an aspect of the present invention, a caseless mirror assembly comprises a caseless electro-optic rearview mirror reflective element that includes a front transparent glass substrate with a rounded outer circumferential glass edge and a rear substrate with a rounded outer circumferential edge, with an electro-optic medium sandwiched between the front transparent glass substrate and the rear substrate. A plate (including a pivot element for pivotally mounting the mirror assembly at an interior portion of the vehicle) is part of or attached at the rear substrate. The caseless mirror assembly of the present invention thus provides a low profile mirror head. Control circuitry for automatically controlling dimming of the electro-optic medium is disposed separate from the caseless electro-optic rearview mirror reflective element, and the control circuitry may control dimming of the electro-optic medium of the caseless electro-optic rearview mirror reflective element via wiring that passes through the ball and socket pivot joint.

In accordance with another aspect of the present invention, a multifunctional rear backup camera or system utilizes image data captured by a single rear backup camera (disposed at a rear portion of the vehicle and having a field of view rearward of the vehicle and encompassing the area immediately behind the vehicle) for multiple functions, including (i) video image display during a reversing maneuver and/or as part of a surround view system of the vehicle, (ii) object detection during a reversing or parking maneuver, (iii) glare light detection at a mirror zone of activity (or rearward field of view) of the interior rearview mirror assembly, (iv) ambient light detection, and (v) dimming control of an electro-optic reflective element of the interior rearview mirror assembly. Optionally, the image data captured by the single rear backup camera is processed to provide independent dimming control of each of the interior mirror, driver-side mirror and passenger-side mirror based on processing of captured image data representative of respective zones of activity for each mirror.

These and other objects, advantages, purposes and features of the present invention will become apparent upon review of the following specification in conjunction with the drawings.

BRIEF DESCRIPTION OF THE DRAWINGS

FIG. 24 is an image of a 5×5 grid of a rear backup camera, showing the region of the rear backup camera's field of view that is relevant for determining glare at the interior rearview mirror;

FIG. 26 is another image captured by the rear backup camera;

DESCRIPTION OF THE PREFERRED EMBODIMENTS

Figure 1:
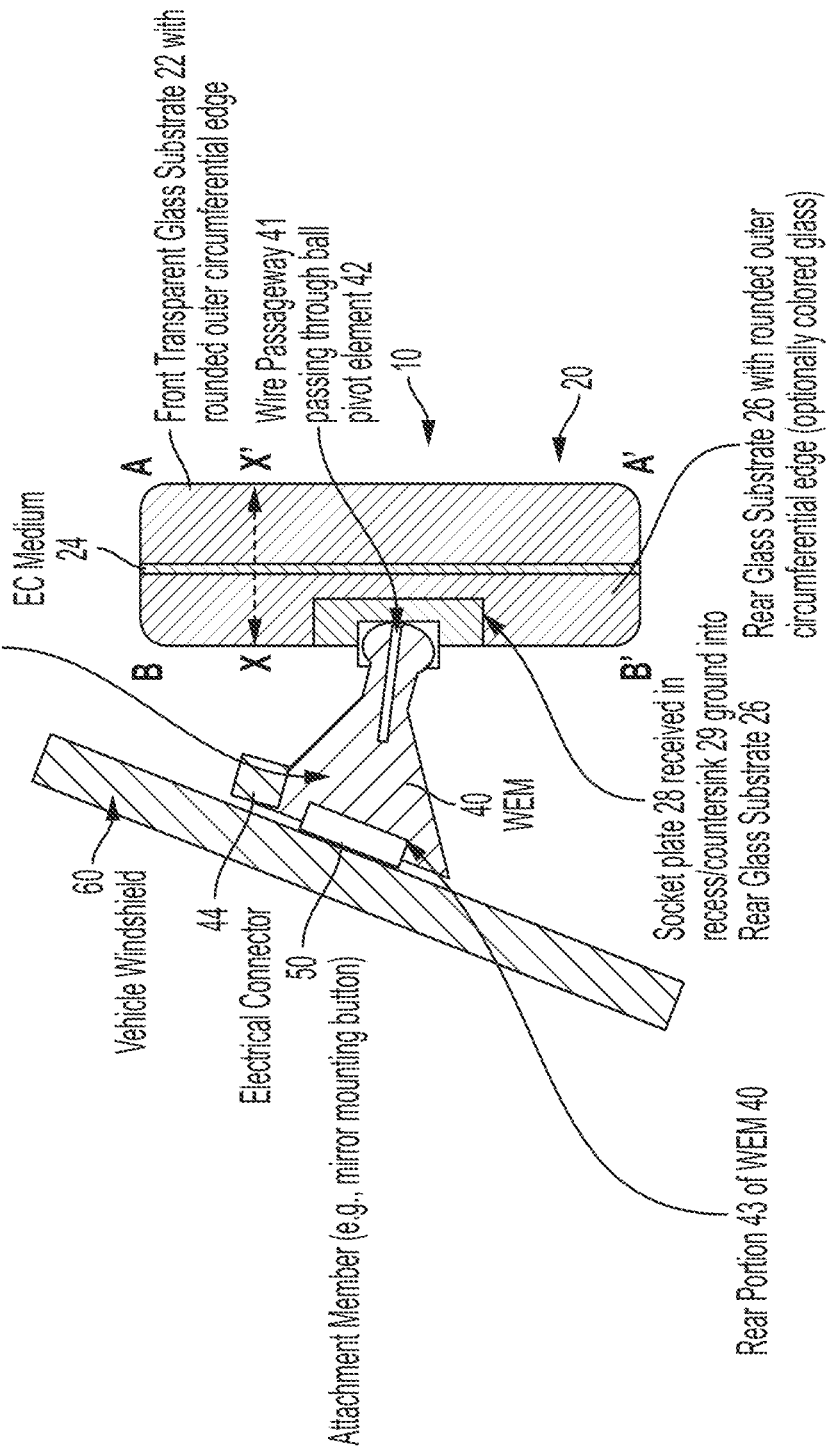
FIG. 1 is a sectional view of a caseless electrochromic rearview mirror assembly in accordance with the present invention, including a windshield electronics module.

FIG. 1 shows an embodiment of an interior electrochromic rearview mirror assembly 10 that does not have a mirror case in accordance with the present invention. Caseless interior electrochromic rearview mirror assembly 10 comprises interior electrochromic rearview mirror reflective element 20 that pivots (via ball-and-socket pivot joint 30) about windshield electronics module (WEM) 40 that is adapted for attaching to (and demounting from) attachment member 50 that is bonded by adhesive to the inner surface of windshield 60. Interior electrochromic rearview mirror reflective element 20 comprises a front transparent glass substrate 22 and a rear glass substrate 26 that sandwich an electrically-dimmable electrochromic (EC) medium 24. Examples of suitable EC media to use are disclosed in U.S. Pat. Nos. 6,420,036; 5,724,187 and 5,688,663; 5,128,799; 5,073,012; 5,115,346; 5,140,455; 5,142,407; 5,151,816; 5,239,405; 5,500,760 and 5,424,865, which are hereby incorporated herein by reference in their entireties.

The outmost perimeter edge A, A' of front transparent glass substrate 22 is rounded and has a radius of curvature of at least 2.5 mm (such rounding achieved in a glass grinding followed by a glass polishing operation, preferably to water-clear transparency, such as disclosed in U.S. Pat. Nos. 8,508,831 and 8,730,553, and U.S. Publication Nos. US-2014-0022390 and US-2014-0293169, which are hereby incorporated herein by reference in their entireties). The outermost perimeter edge B, B' of rear glass substrate 26 is rounded and has a radius of curvature of at least 2.5 mm (such rounding achieved in a glass grinding followed by a glass polishing operation, preferably to water-clear transparency, such as disclosed in U.S. Pat. Nos. 8,508,831 and 8,730,553, and U.S. Publication Nos. US-2014-0022390 and US-2014-0293169, incorporated above).

A recess 29 is established (such as by glass grinding/glass removal) at the rear of rear glass substrate 26. Socket plate 28 is secured (mechanically and/or adhesively) in recess 29.

Socket plate 28 preferably is a plastic molding formed by plastic injection molding of an engineering plastic such as reinforced nylon, polycarbonate or ABS) and comprises socket element 27 that is configured to receive (and once received, to pivot about) ball element 42 of WEM 40.

Ball element 42 of WEM 40 preferably is a plastic molding formed by plastic injection molding of an engineering plastic such as reinforced nylon, polycarbonate or ABS). Rear portion 43 of WEM 40 is configured to attach to (and demount from, preferably via a breakaway connection) and be re-attachable to attachment member 50 (preferably a mirror mounting button) that is bonded via a layer of cured adhesive to the inner surface of windshield 60.

The plate thickness of front transparent glass substrate 22 is preferably around 6 mm or less and the plate thickness of rear glass substrate 26 is preferably around 6 mm or less. The plate thickness of front transparent glass substrate 22 is more preferably around 3 mm or less and the plate thickness of rear glass substrate 26 is more preferably around 3 mm or less. The overall thickness dimension of interior electrochromic rearview mirror reflective element 20 (X to X' as marked on FIG. 1) is around 13 mm or less; more preferably is around 10 mm or less and most preferably is around 7 mm or less.

Wire Passageway 41 passes through ball pivot element 42 and is configured as a passageway/conduit for wire/cables connecting electronic circuitry in WEM 40 to the likes of electrodes that electrically dim EC medium 24. Electrical Connector 44 is preferably a multi-pin plug connector configured to connect to a corresponding multi-pin socket connector (or vice versa) of a wiring harness of the equipped vehicle to carry electrical power to WEM 40 and to connect electronics housed in WEM 40 to accessories/systems of the equipped vehicle, such connection including connection to a BUS communication system of the equipped vehicle, preferably a CAN communication BUS or an ETHERNET communication system.

Recess 29 preferably has a circular cross-section with a diameter of at least 4 cm dimension and more preferably a depth of at least about 2 mm, more preferably at least about 3 mm depth and most preferably at least about 4 mm depth. Recess 29 preferably has a circular cross-section with a diameter less than about 5.5 cm. Recess 29 may be formed have a cylindrical depth profile via glass grinding or may be dish-shaped such as via glass grinding to form a spherically-curved concave depression in the rear surface of rear glass substrate 26.

Socket plate 28 has a circular cross-section that matches that of circular recess 29 so that socket plate 28 can fit into recess 29. The preferred thickness dimension of socket plate 28 is chosen so that socket plate 28 fully fits snugly into recess 29 and the depth and diameter dimension of socket element 27 of socket plate 28 is chosen so that socket element 27 can receive (and once received, can pivot about) ball pivot element 42 of WEM 40 forming ball and socket joint 30. For example, rear glass substrate 26 may have around 6 mm thickness; circular recess 29 (that is ground into the rearmost surface of rear glass substrate 26 or the 4th surface of caseless EC mirror reflective element 20) may have a 45 mm diameter and may be around 4 mm deep; circular socket plate 28 may have an around 44 mm diameter and may be around 4 mm thick outside of circular socket element 27 and circular socket element 27 may have a 40 mm diameter and may be around 3 mm deep.

Figure 2:
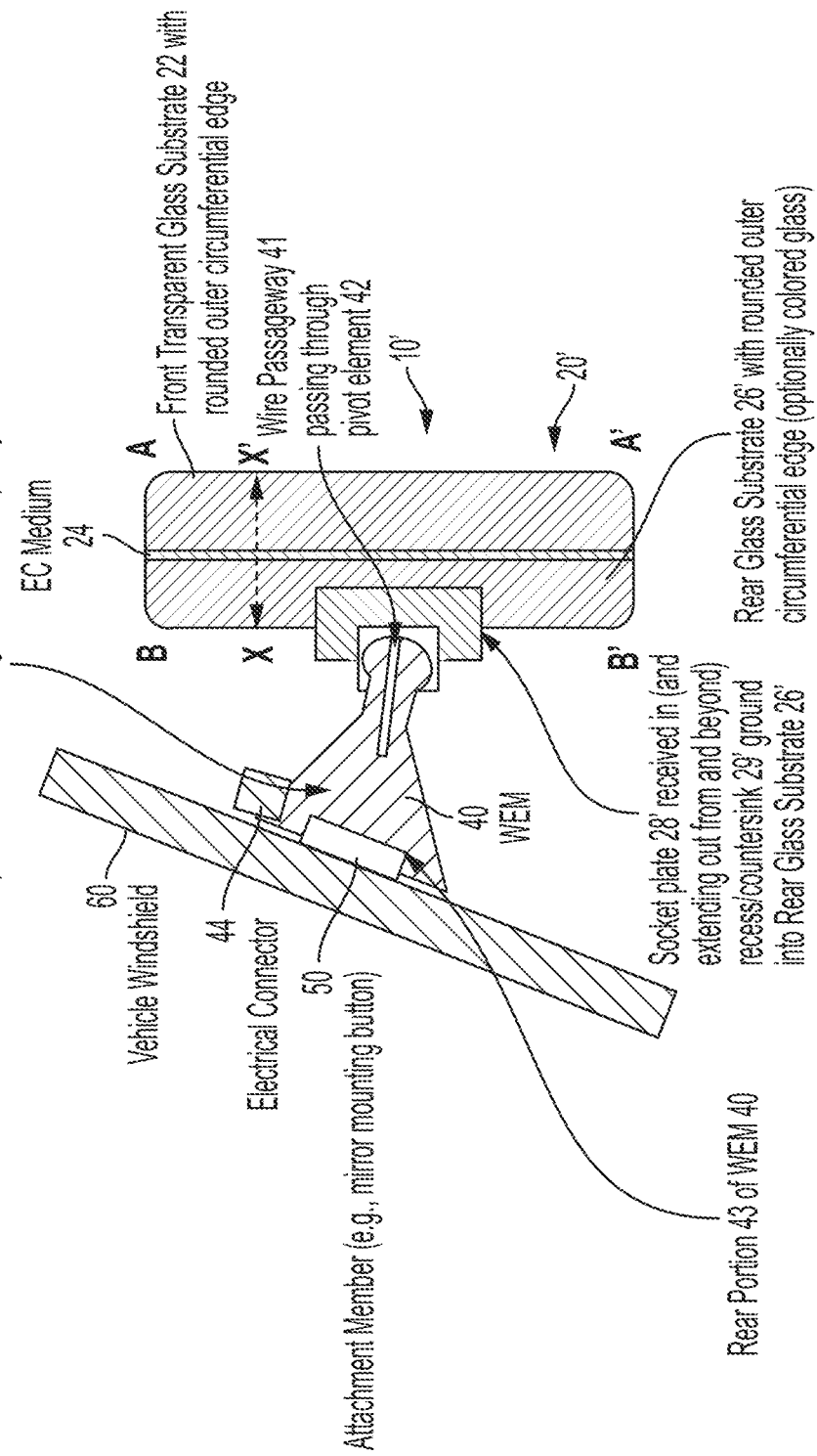
FIG. 2 is a sectional view of another caseless electrochromic rearview mirror assembly of the present invention.

FIG. 2 shows an embodiment where it is desired to accommodate a large diameter ball pivot element 42'. Here the plastic-molded socket plate 28' extends out from and beyond recess 29' and so allows for socket element 27' to accommodate a larger pivot element 42' to form ball and socket joint 30'.

Figure 3:
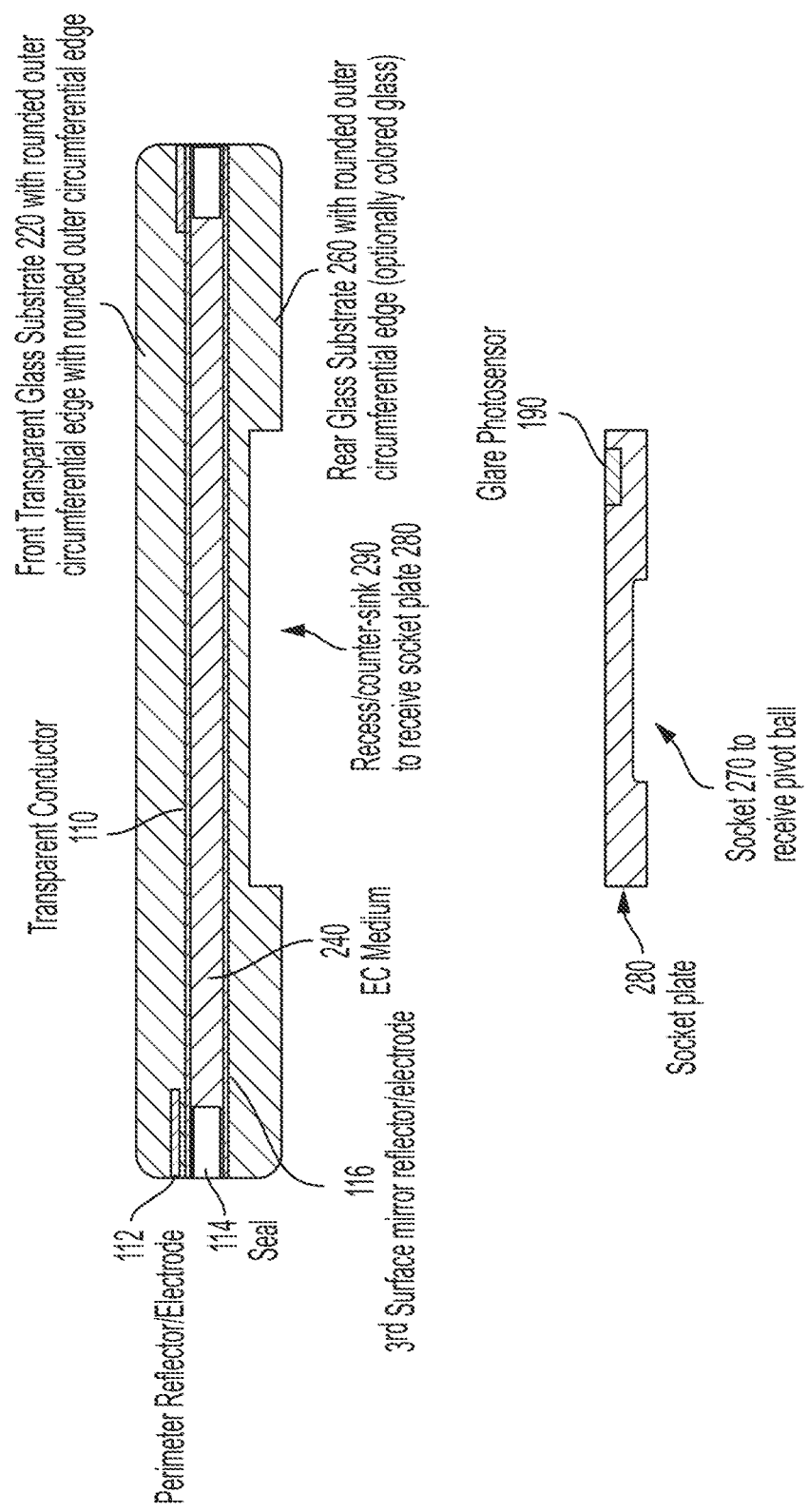
FIG. 3 is an exploded sectional view of a reflective element and socket plate for a caseless electrochromic rearview mirror assembly of the present invention.

As shown in FIG. 3, perimeter reflector/electrode 112 circumscribes the outer border region of the 2nd surface of front transparent glass substrate 220 (such as for example is disclosed in U.S. Pat. Nos. 5,066,112; 7,626,749; 7,274,501; 7,184,190 and/or 7,255,451, which are hereby incorporated herein by reference in their entireties). The 2nd surface of front transparent glass substrate 220 is coated with a transparent electrical conductor 110 (such as, for example, a thin film of indium tin oxide of sheet resistance less than 20 ohms.square). Seal 114 binds and spaces apart front transparent glass substrate 220 and rear glass substrate 260. The front and rear substrates 220, 260 have ground, rounded glass outermost edges having radius of at least 2.5 mm.

EC medium 240 is disposed between 2nd surface transparent electrical conductor 110 of front transparent glass substrate 220 and 3rd surface mirror reflector/electrode 116 of rear glass substrate 260. The 3rd surface mirror reflector/electrode 116 is coated by vacuum deposition (preferably via sputter deposition in a vacuum chamber) onto the side of rear glass substrate 260 that contacts EC medium 240 (this side is the 3rd surface of the caseless EC rearview mirror reflective element). For environmental stability and high reflectivity, 3rd surface mirror reflector/electrode 116 preferably comprises a thin film layer of a silver alloy (preferably a silver/gold alloy sputter deposited from a 95% Ag/5% Au silver/gold alloy sputtering target). Preferably, 3rd surface mirror reflector/electrode 116 comprises a thin film layer of 95% Ag/5% Au silver alloy of physical thickness at least about 500 angstroms (more preferably at least about 800 angstroms physical thickness) so as to be low light transmitting and thus serve as an opacifying or hiding layer for what lies therebehind. However when at least a portion of 3rd surface mirror reflector/electrode 116 is desired to be transflective (such as when a video or other display device displays therethrough), a thinner layer of 95% Ag/5% Au silver alloy can be used so that visible light transmission through the transflective portion of 3rd surface mirror reflector/electrode 116 is at least about 10% T, more preferably is at least about 20% T and most preferably is at least about 30% T while reflectivity is maintained at least about 40% R, more preferably at least about 50% R and most preferably is at least about 60% R.

Perimeter reflector/electrode 112 generally hides seal 114 from view by an observer viewing through front transparent glass substrate 220. Socket plate 280 is configured and dimensioned to be received by and to secure (such as via bonding using an adhesive such as an epoxy adhesive or a urethane adhesive or an acrylic adhesive or a silicone adhesive or an acrylate adhesive) at recess 290. Socket 270 of socket plate 280 is dimensioned and configured to receive a ball pivot element to form a ball and socket pivot joint so that, when the caseless EC mirror reflective element is mounted and used in an equipped vehicle, a driver can adjust the rearward field of view of the mirror to his or her preference/needs. Glare photosensor sensor 190 is configured to view through front transparent glass substrate 220 when socket plate 280 is received in recess 290.

Figure 4:
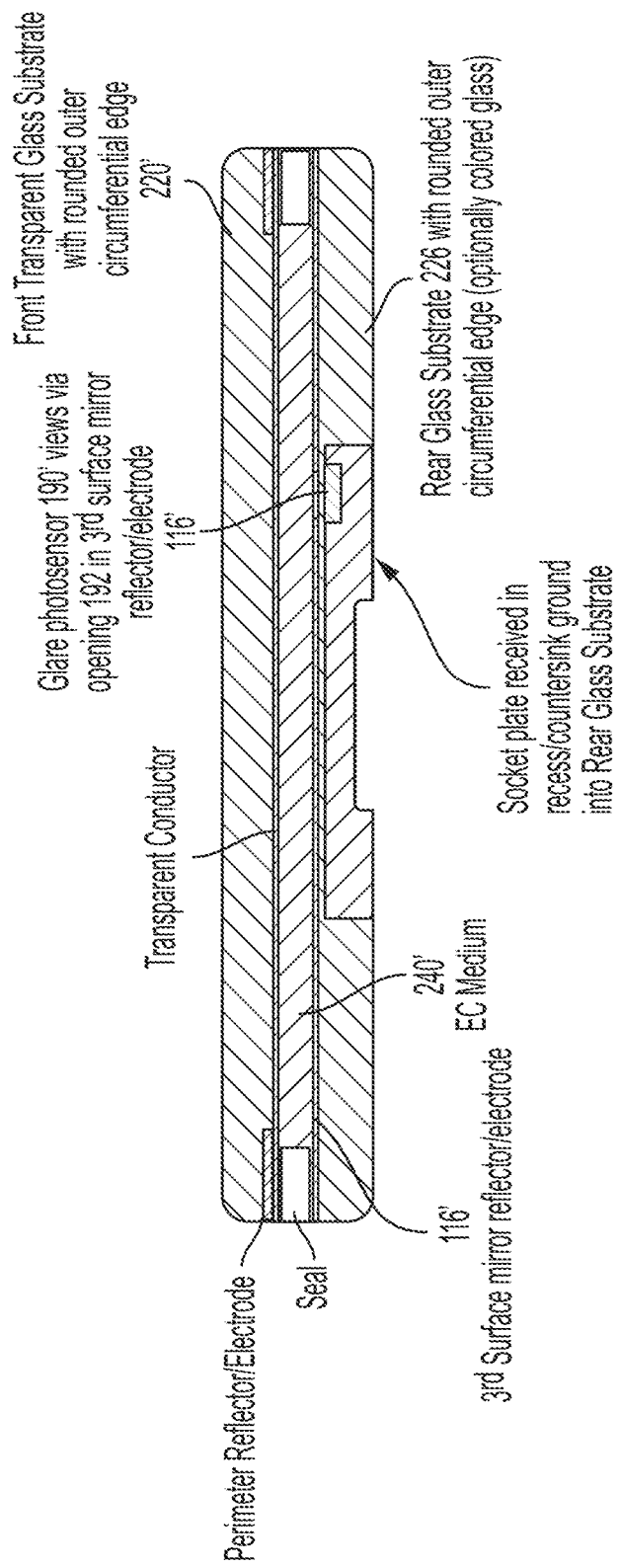
FIG. 4 is a sectional view of the reflective element assembly of FIG. 3, shown with the socket plate received at the recess of the rear substrate of the reflective element.

As shown in FIG. 4, glare photosensor 190' views via opening 192 in 3rd surface mirror reflector/electrode 116' through EC medium 240' and through front transparent glass substrate 220'. Alternatively, 3rd surface mirror reflector/electrode 116' can be a transflective mirror reflector (i.e., substantially reflective to incident visible light but also significantly transmissive to visible light) such as are disclosed in U.S. Pat. Nos. 7,855,755; 7,338,177; 7,274,501; 7,255,451; 7,195,381; 7,184,190; 5,668,663; 5,724,187; 5,530,240 and/or 6,690,268, which are all hereby incorporated herein by reference in their entireties, whereupon opening 192 may be dispensed with. The front and rear substrates 220', 226 have ground, rounded glass outermost edges having radius of at least 2.5 mm.

Figure 5:
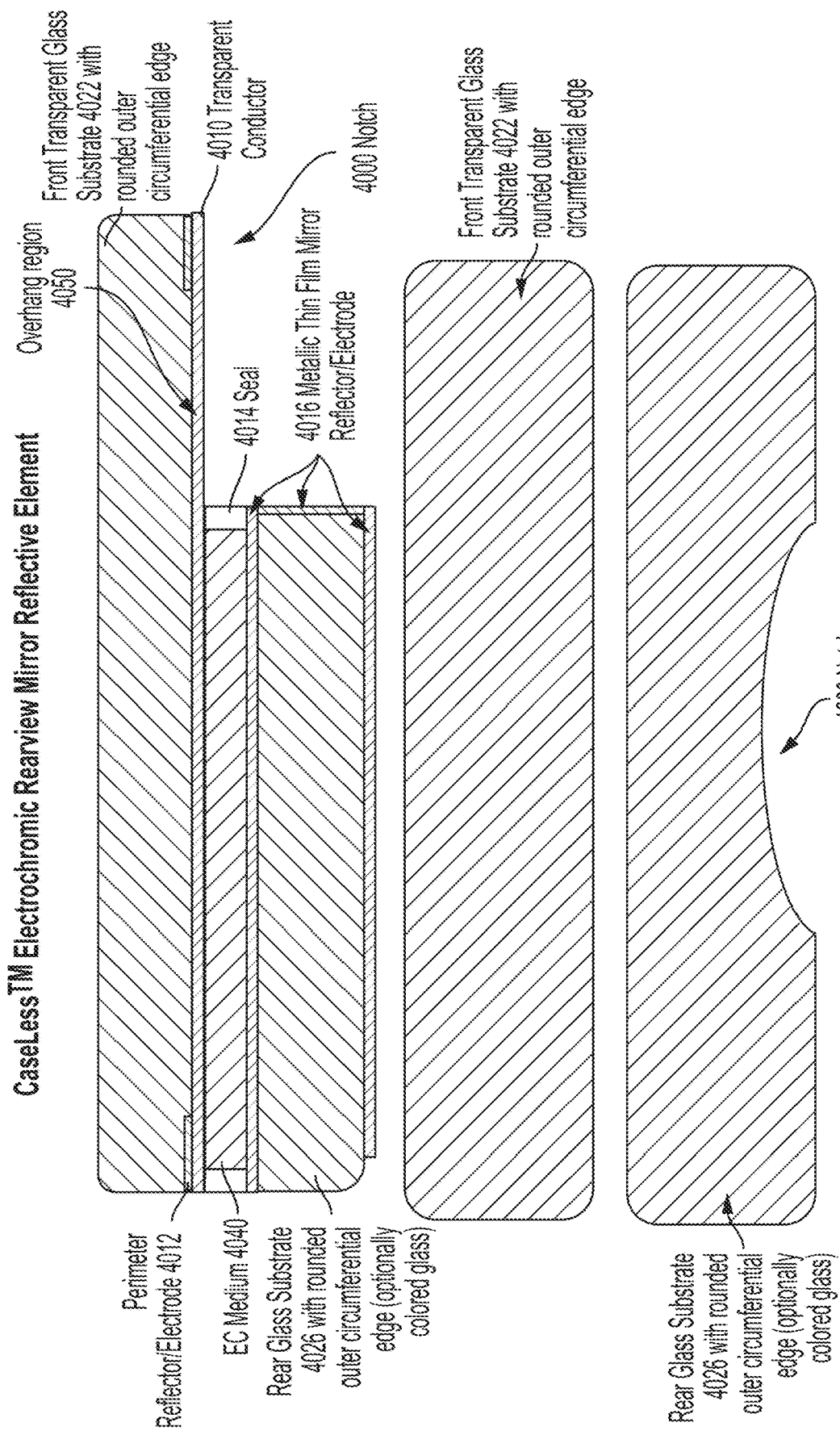
FIG. 5 is a sectional view of a reflective element assembly for a caseless electrochromic rearview mirror assembly of the present invention, shown with a notch to facilitate electrical connection to the electrically conductive layers of the reflective element.

To facilitate electrical connection to transparent electrical conductor layer 4010 and to 3rd surface mirror reflector/electrode 4016 in order to apply voltage across EC medium 4040 and as shown in FIG. 5, rear glass substrate 4026 is notched at notch 4000 so that, with front transparent glass substrate 4022 juxtaposed with rear glass substrate 4026 and with the substrates spaced apart by seal 4014 (that preferably is formed of epoxy and is electrically insulating), overhang region 4050 of front transparent glass substrate 4022 is devoid of EC medium therebehind and also is electrically insulated from rear glass substrate 4026 by seal 4014. The 3rd surface mirror reflector/electrode 4016 wraps around the cut edge of rear glass substrate 4026 at notch 4000 and preferably is in further electrical contact/conductivity with an electrical conductor on the rear surface (the 4th surface of the laminate EC cell) of rear glass substrate 4026.

Figure 6:
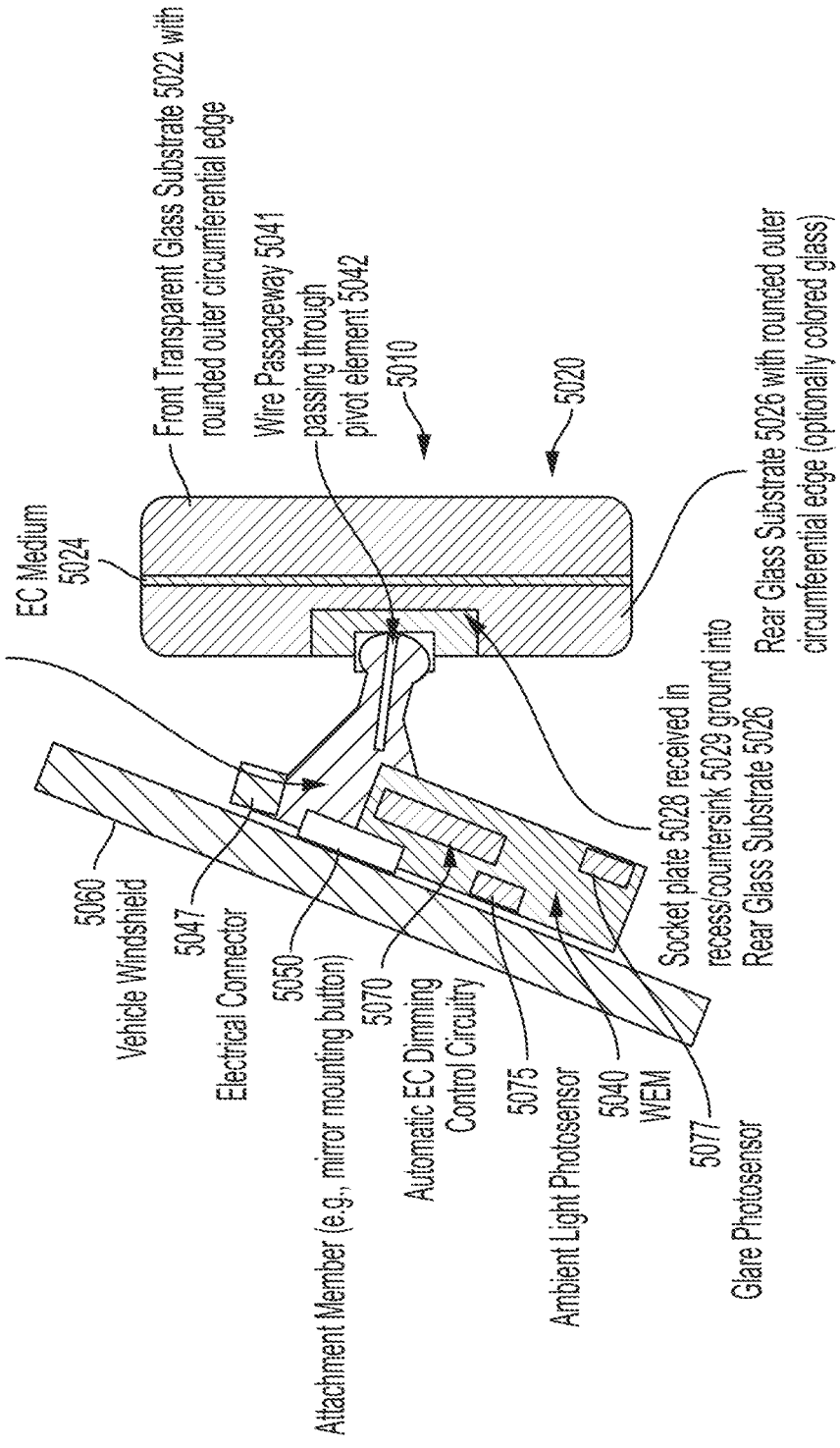
FIG. 6 is a sectional view of a caseless electrochromic rearview mirror assembly of the present invention.

As shown in FIG. 6, a WEM 5040 accommodates glare photosensor 5077, ambient light photosensor 5075 and automatic EC dimming control circuitry 5070. With input from glare photosensor 5077 and ambient light photosensor 5075, automatic EC dimming control circuitry 5070 controls dimming of EC medium 5024 via wiring that passes through ball and socket joint 5030 about which caseless interior electrochromic rearview mirror reflective element 5020 pivots. Attachment member 5050 may be a mirror mounting button that is bonded via adhesive to the inner surface of windshield 5060. The WEM 5040 includes an electrical connector 5047 for electrically connecting the accessories and circuitry of the WEM to a vehicle wire harness or power source or the like when the WEM 5040 is attached at the vehicle windshield 5060. Optionally, attachment member 5050 may have mounted to it or may itself comprise a mounting bracket (such as by utilizing aspects of the systems described in U.S. Publication No. US-2015-0251605, which is hereby incorporated herein by reference in its entirety), which either attaches at attachment element 5050 adhered at the in-cabin surface of the windshield of the equipped vehicle or that itself directly bonds to the windshield via use of a cured adhesive. Such mounting bracket includes a socket or receiving portion that receives or attaches to a ball pivot element of a caseless EC rearview mirror assembly of the present invention, such as via a twist-lock attachment as disclosed in U.S. Publication No. US-2015-0251605, incorporated above.

Figure 7:
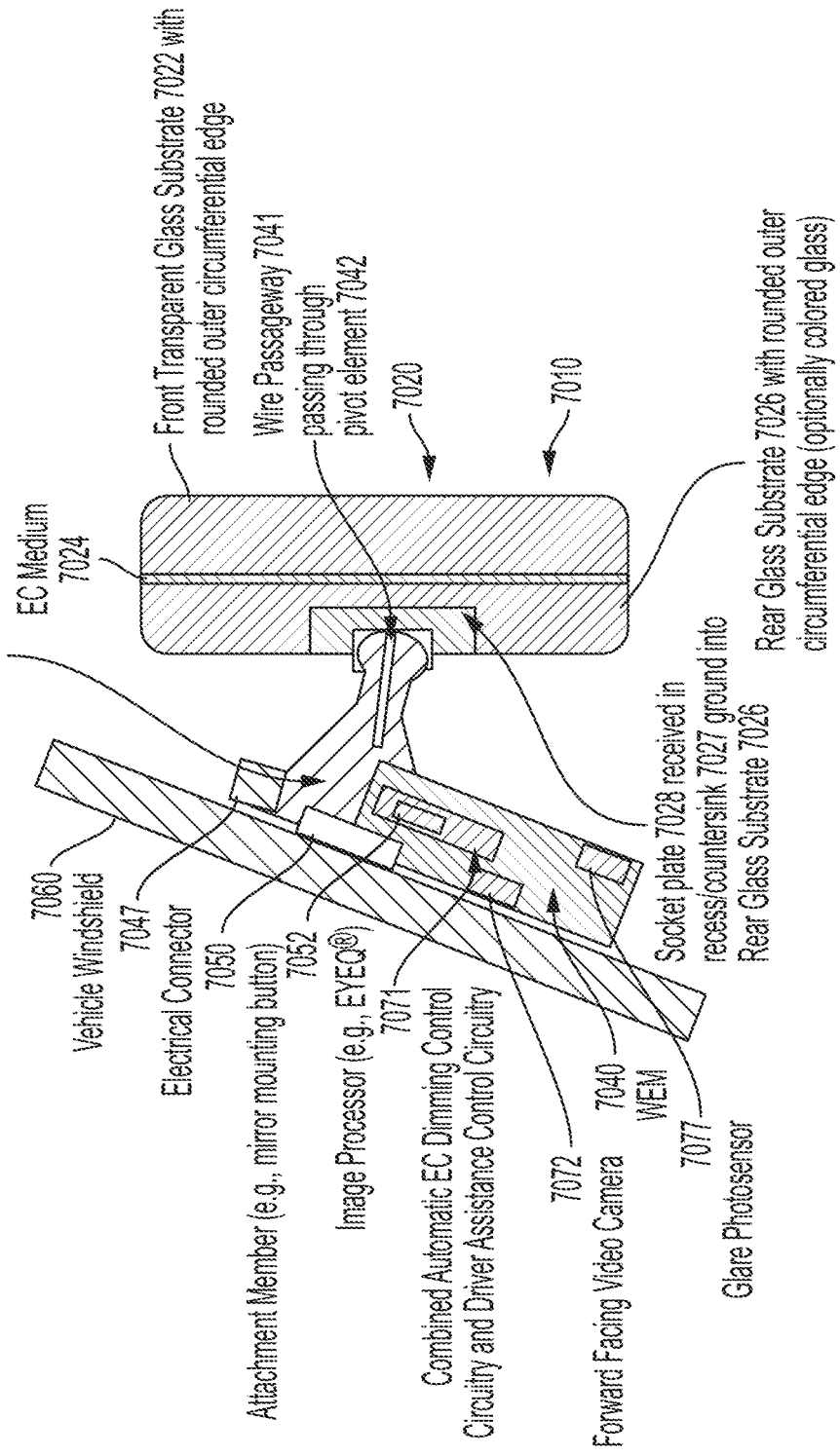
FIG. 7 is a sectional view of another caseless electrochromic rearview mirror assembly of the present invention.

As shown in FIG. 7, a windshield electronics module or WEM 7040 includes an integral ball pivot element 7042 configured to pivotally attach to socket element 7027 of socket plate 7028 so forming ball and socket joint 7030 about which caseless interior electrochromic rearview mirror reflective element 7020 pivots (with a wire passageway 7041 passing through the pivot element 7042). WEM 7040 includes a forward facing video camera 7072 (such as is a forward facing camera utilizing aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties). Camera 7072 preferably comprises a CMOS image sensor comprising a photosensor array of multiple rows of photosensing pixels and multiple columns of photosensing pixels (such as a 1 megapixel array or 3 megapixel array or 8 megapixel array or the like). Camera 7072 views forward of the equipped vehicle through an aperture in a windshield hiding layer of windshield 7060 such as is disclosed in U.S. Pat. Nos. 6,445,287; 6,326,613 and/or 6,824,281, which are hereby incorporated herein by reference in their entireties. Image data captured by camera 7072 is processed by image processor 7052 of the Combined Automatic EC Dimming Control Circuitry and Driver Assistance Control Circuitry 7071 (preferably, captured image data is processed by an EYEQ® image processor and associated image processing/object detection software available from Mobileye N.V. of Jerusalem, Israel such as by an EYEQ2 image processor or an EYEQ3 image processor or an EYEQ4 image processor). Processing of image data captured by camera 7072 at Combined Automatic EC Dimming Control Circuitry and Driver Assistance Control Circuitry 7071 by image processor 7052 provides control outputs/signals for a plurality of driver assistance systems of the equipped vehicle such as driver assistance systems for automatic headlamp control, lane assist and lane departure warning, traffic sign recognition, forward collision warning, automatic emergency braking, adaptive cruise control and/or pedestrian detection/collision avoidance.

Processing by image processor 7052 of image data captured by camera 7072 at Combined Automatic EC Dimming Control Circuitry and Driver Assistance Control Circuitry 7071 establishes the ambient light level exterior of the equipped camera and such is used (during nighttime driving) in conjunction with glare light level data sensed by rear-facing glare sensor 7077 to control dimming of EC medium 7024 (disposed between the front substrate 7022 and the rear substrate 7026) of caseless interior electrochromic rearview mirror reflective element 7020 when glare from headlights of rear-approaching vehicles so warrant. Should camera 7072 by part of a multi-camera surround vision system of the equipped vehicle where one at least such cameras views rearward of the equipped vehicle and captures image data of rear-approaching vehicles, then such rear vision image data can be provided to and processed by image processor 7052 of Combined Automatic EC Dimming Control Circuitry and Driver Assistance Control Circuitry 7071 for control of EC dimming of EC medium 7024, and in such circumstance glare photosensor 7077 can be dispensed with. The WEM 7040 includes an electrical connector 7047 for electrically connecting the accessories and circuitry of the WEM to a vehicle wire harness or power source or the like when the WEM 7040 is attached at the vehicle windshield 7060.

Figure 8:
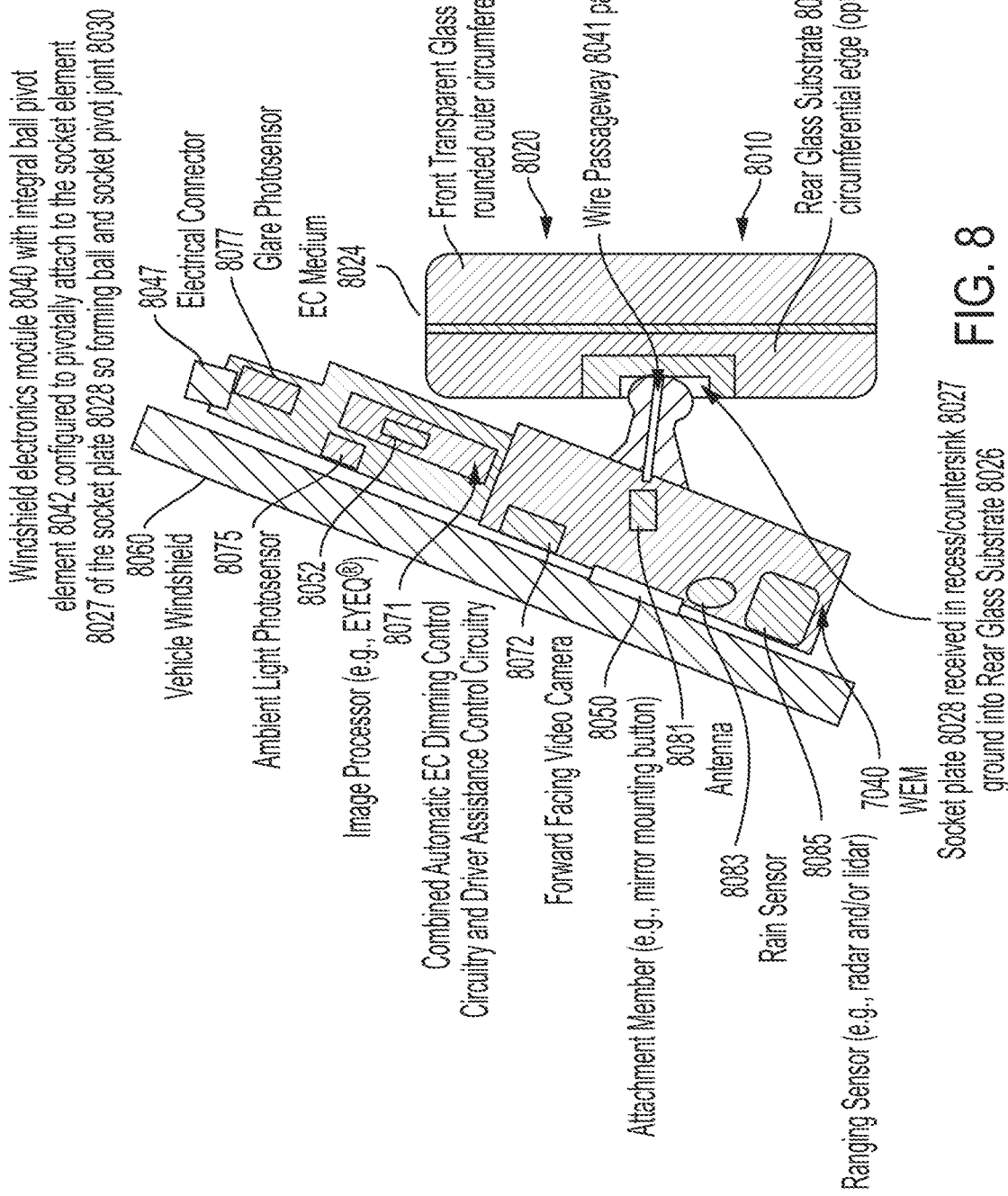
FIG. 8 is a sectional view of another caseless electrochromic rearview mirror assembly of the present invention.

As shown in FIG. 8, windshield electronics module 8040 includes an integral ball pivot element 8042 configured to pivotally attach to socket element 8027 of socket plate 8028 so forming ball and socket joint 8030 about which caseless interior electrochromic rearview mirror reflective element 8020 pivots (with a wire passageway 8041 passing through the pivot element 8042). WEM 8040 includes a forward facing video camera 8072 as well as glare photosensor 8077 and ambient light photosensor 8075 and combined automatic EC dimming control circuitry and driver assistance control circuitry 8071. Windshield electronics module 8040 further accommodates other accessories/features such as antenna 8081, rain sensor 8083 and ranging sensor 8085 (such as, for example, radar and/or lidar sensors). The WEM 8040 includes an electrical connector 8047 for electrically connecting the accessories and circuitry of the WEM to a vehicle wire harness or power source or the like when the WEM 5040 is attached at the vehicle windshield 8060. The WEM establishes the ambient light level exterior of the equipped camera and such is used (during nighttime driving) in conjunction with glare light level data sensed by rear-facing glare sensor 8077 to control dimming of EC medium 8024 (disposed between the front substrate 8022 and the rear substrate 8026) of caseless interior electrochromic rearview mirror reflective element 8020 when glare from headlights of rear-approaching vehicles so warrant. Combined Automatic EC Dimming Control Circuitry and Driver Assistance Control Circuitry 8071 can process signals/sensor data from such other accessories/features such as antenna 8081, rain sensor 8083 and ranging sensor 8085 (such as, for example, radar and/or lidar sensors). Such co-sharing of electrical components and software/co-processing of signals/data enhances economic manufacture of caseless interior electrochromic rearview mirror assembly 8010. As discussed in relation to the embodiment shown in FIG. 7, glare photosensor 8077 and ambient light photosensor 8075 may be dispensed with when forward facing video camera 8072 captures ambient lighting conditions and when another rear-viewing camera of the equipped vehicle detects glaring rear-approaching headlights at night.

Figure 9:
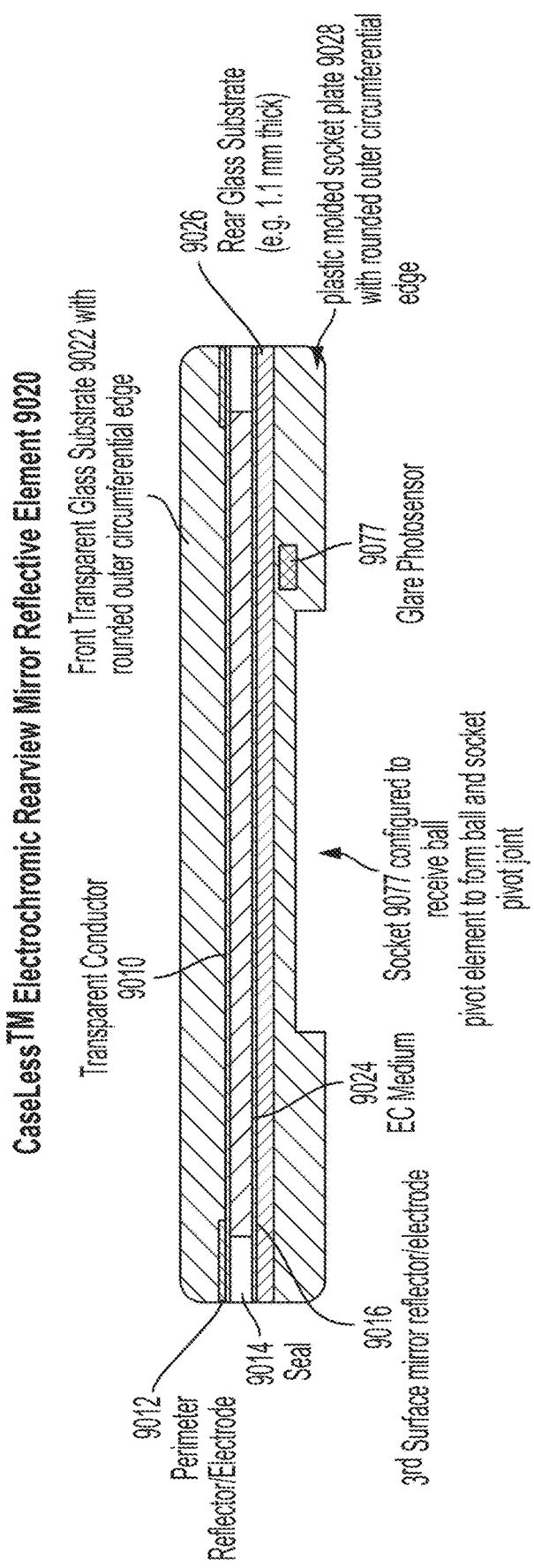
FIG. 9 is a sectional view of another reflective element assembly for a caseless electrochromic rearview mirror assembly of the present invention.

As shown in FIG. 9, rear glass substrate 9026 of caseless EC rearview mirror reflective element 9020 comprises a relatively thin rear glass substrate of plate thickness preferably in the range from about 0.5 mm thickness to around 1.1 mm thickness. Plastic molded socket plate 9028 with molded rounded outer circumferential edges is secured to the rearmost surface of rear glass substrate 9026 by a layer of cured adhesive. Plastic molded socket plate 9028 has the same size and dimensions as rear glass substrate 9026 and when attached is flush therewith. Plastic molded socket plate 9028 is formed such as by molding of an engineering plastic such as acrylonitrile butadiene styrene (ABS) or a polycarbonate or a polyamide such as nylon (preferably a glass- or mineral-reinforced nylon). Socket 9077 is formed and configured in plastic molded socket plate 9028 so as to receive a ball pivot element to form a ball and socket pivot joint to enable pivotal adjustment thereabout of caseless EC rearview mirror reflective element 9020. Plastic molded socket plate 9028 may be molded of a dark plastic resin and may match in color and texture that of the windshield electronics module that houses the electronics controlling EC medium 9024 sandwiched between front transparent glass substrate 9022 with rounded outer circumferential edge and thin rear glass substrate 9026 (that need not have a rounded outer circumferential edge). The front glass substrate has a ground, rounded glass outermost edges of radius greater than or equal to about 2.5 mm and the plastic molded socket plate also has plastic molded, rounded edges of radius greater than or equal to about 2.5 mm.

Figure 10:
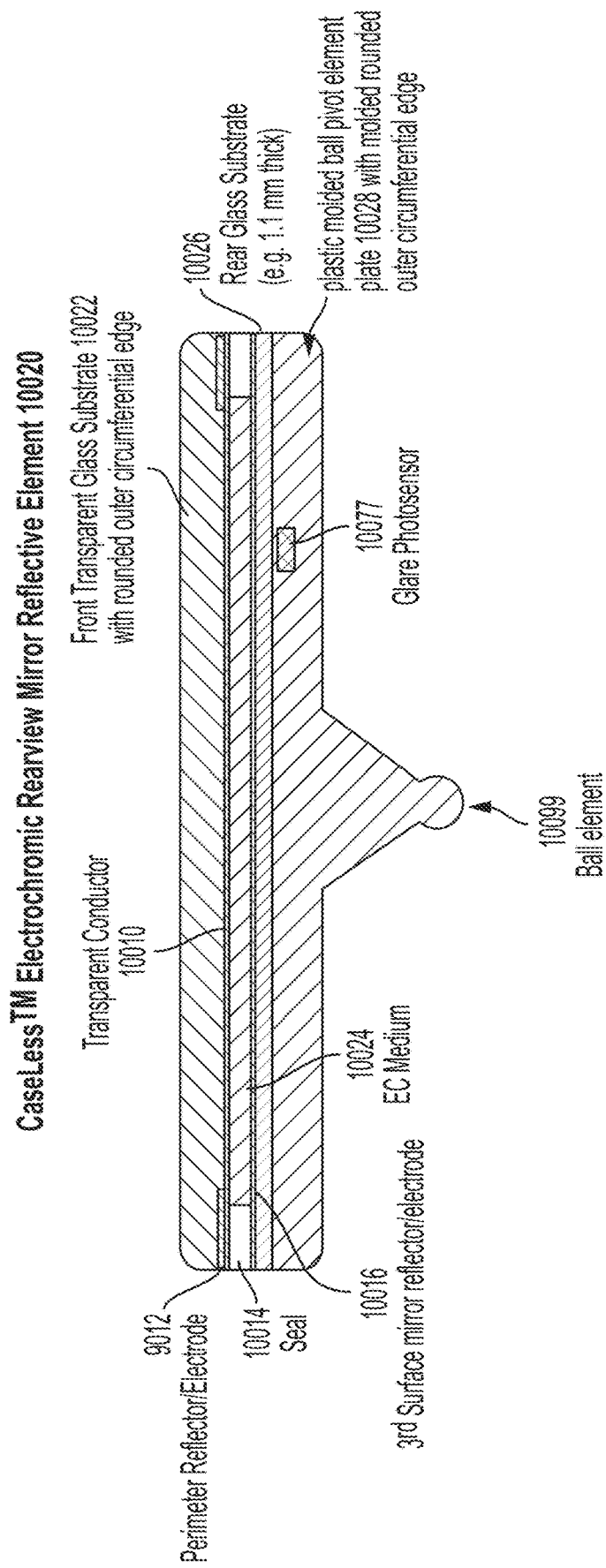
FIG. 10 is a sectional view of another reflective element assembly for a caseless electrochromic rearview mirror assembly of the present invention.

As shown in FIG. 10, rear glass substrate 10026 of caseless EC rearview mirror reflective element 10020 comprises a relatively thin rear glass substrate of plate thickness preferably in the range from about 0.5 mm thickness to around 1.1 mm thickness. Plastic molded ball pivot element plate 10028 with rounded outer circumferential edges is secured to the rearmost surface of rear glass substrate 10026 by a layer of cured adhesive. Plastic molded ball pivot element plate 10028 has the same size and dimensions as rear glass substrate 10026 and when attached is flush therewith. Plastic molded ball pivot plate 10028 is formed such as by molding of an engineering plastic such as acrylonitrile butadiene styrene (ABS) or a polycarbonate or a polyamide such as nylon (preferably a glass- or mineral-reinforced nylon). Ball pivot element 10099 is formed integrally with and is configured in plastic molded ball pivot plate 10028 so as to receive a socket pivot element to form a ball and socket pivot joint to enable pivotal adjustment thereabout of caseless EC rearview mirror reflective element 10020. Plastic molded ball pivot plate 10028 may be molded of a dark plastic resin and may match in color and texture that of the windshield electronics module that houses the electronics controlling EC medium 10024 sandwiched between front transparent glass substrate 10022 with rounded outer circumferential edge and thin rear glass substrate 10026 (that need not have a rounded outer circumferential edge). The front glass substrate has a ground, rounded glass outermost edges of radius greater than or equal to about 2.5 mm and the plastic molded socket plate also has plastic molded, rounded edges of radius greater than or equal to about 2.5 mm.

Note that in previous embodiments, the socket of the ball and socket pivot joint (about which the caseless EC rearview mirror reflective element pivots) is part of the caseless EC rearview mirror reflective element and the ball of the ball and socket pivot joint (about which the caseless EC rearview mirror reflective element pivots) is part of the windshield electronics module that attaches at the vehicle interior (such as to or at the windshield or to or at a header region of the roof above the windshield). However in such embodiments the ball of the ball and socket pivot joint (about which the caseless EC rearview mirror reflective element pivots) may be part of the caseless EC rearview mirror reflective element and the socket of the ball and socket pivot joint (about which the caseless EC rearview mirror reflective element pivots) may be part of the windshield electronics module.

The rear glass substrate used in the caseless EC rearview mirror reflective elements of the present invention may be clear transparent glass or may be colored or tinted glass. In such regard, use can be made of architectural glass normally used for windows on buildings and the like. Such architectural glass is typically used for solar control and can be light reflective and/or light absorptive. For example low-e glasses (such as Pilkington Eclipse Advantage™, Pilkington Solar-E™, Pilkington Solar-E™ Plus available from Pilkington North America of Toledo, Ohio) can be used or thermal control low-e glass (such as Pilkington Energy Advantage™) can be used. Tinted glass (such as Pilkington Graphite Blue™ or Pilkington EverGreen™ or Pilkington Arctic Blue™ or Pilkington SuperGrey™) can be used.

Figure 11:
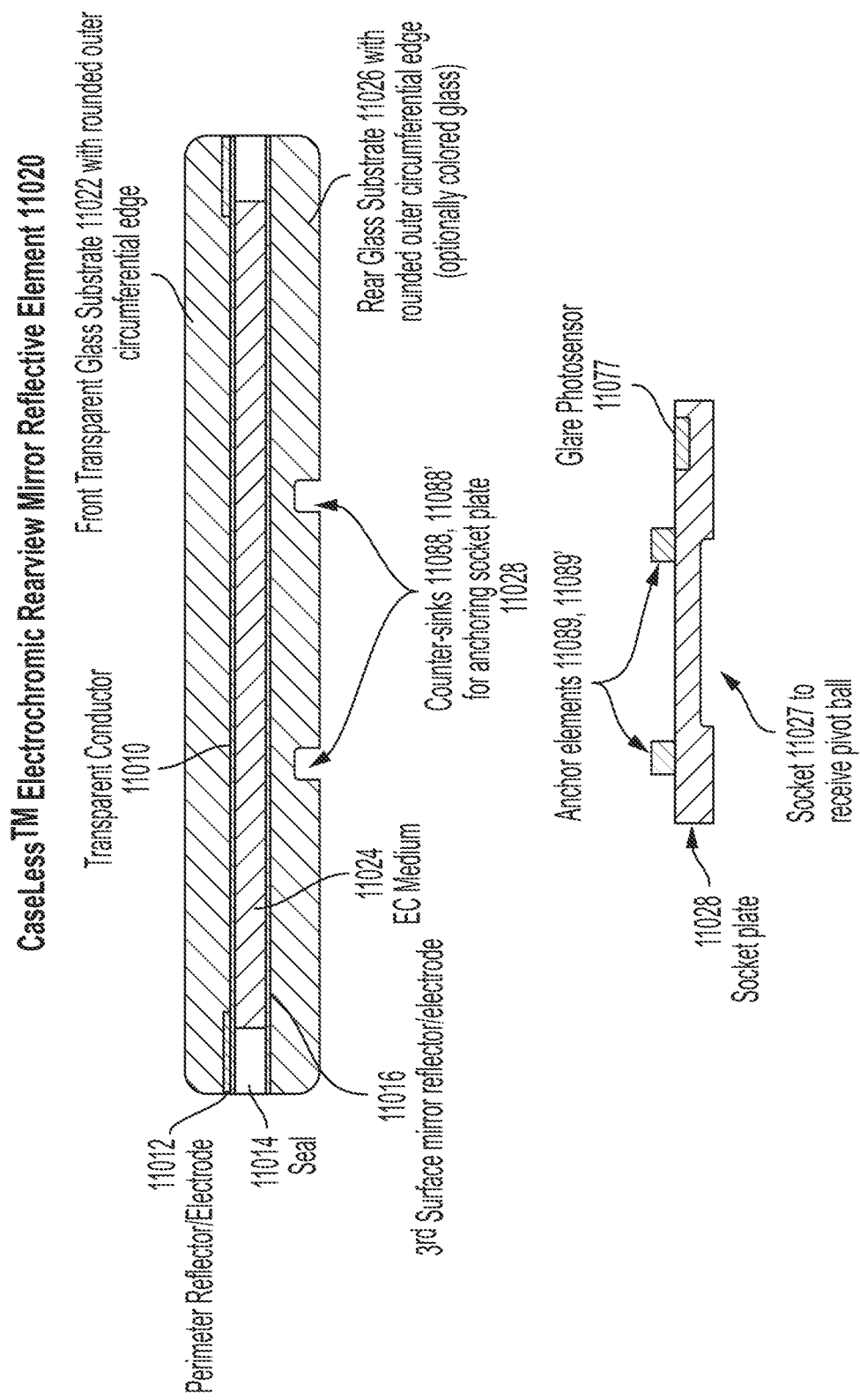
FIG. 11 is an exploded sectional view of another reflective element assembly for a caseless electrochromic rearview mirror assembly of the present invention.

As shown in FIG. 11, anchor elements 11089, 11089' may be formed in socket plate 11028 (such as by injection molding when socket plate 11028 is being molded) and are configured to correspond with and be received by countersinks 11088, 11088' established (such as by drilling using a diamond drill-bit) in rear glass substrate 11026. Such enhances mechanical retention of socket plate 11028 to rear glass substrate 11026 and this mechanical retention can be assisted/augmented using adhesive. In the illustrated embodiment, the front and rear glass substrates 11022, 11026 each have a ground, rounded glass outermost edges of radius greater than or equal to about 2.5 mm.

A trough or a gulley can be ground into the rearmost surface of the rear glass substrate to carry an electrical conductor connecting to, for example, the transparent electronic conductor thin film layer coated at the 2nd surface of the front transparent glass substrate or to the perimeter reflector/electrode coated at the 2nd surface of the front transparent glass substrate or to the 3rd surface mirror reflector/electrode. Also, screened-on or printed-on (such as via an inkjet printer) electrically conductive inks and frits can be used to establish electrically conductive traces or busbars for connecting to, for example, the transparent electronic conductor thin film layer coated at the 2nd surface of the front transparent glass substrate or to the perimeter reflector/electrode coated at the 2nd surface of the front transparent glass substrate or to the 3rd surface mirror reflector/electrode.

Furthermore, and as discussed above, local notches in either or both glass substrates and/or local offsets/overhangs can assist electrical connection to the electrodes providing electrical voltage across the electro-optic medium sandwiched between the front and rear substrates.

Also as described herein with regard to a caseless EC rearview mirror assembly, the innovations of the present invention can be used for a caseless electro-optic rearview mirror assembly such as, for example, a caseless liquid crystal rearview mirror assembly where the front and rear substrates sandwich a liquid crystal medium whose transmissivity is electrically variable, such as for example by utilizing aspects of the assemblies described in U.S. Publication Nos. US-2016-0023606; US-2016-0009226 and/or US-2015-0283945, which are all hereby incorporated herein by reference in their entireties.

As an alternative to the control circuitry disposed in the windshield electronics module controlling dimming of the electro-optic medium of the caseless electro-optic rearview mirror reflective element via wiring that passes through the ball and socket pivot joint, the desired and required electrical connection can be made when the pivot element connects to the socket element when attaching the caseless electro-optic rearview mirror reflective element to the windshield electronics module.

Figure 12:
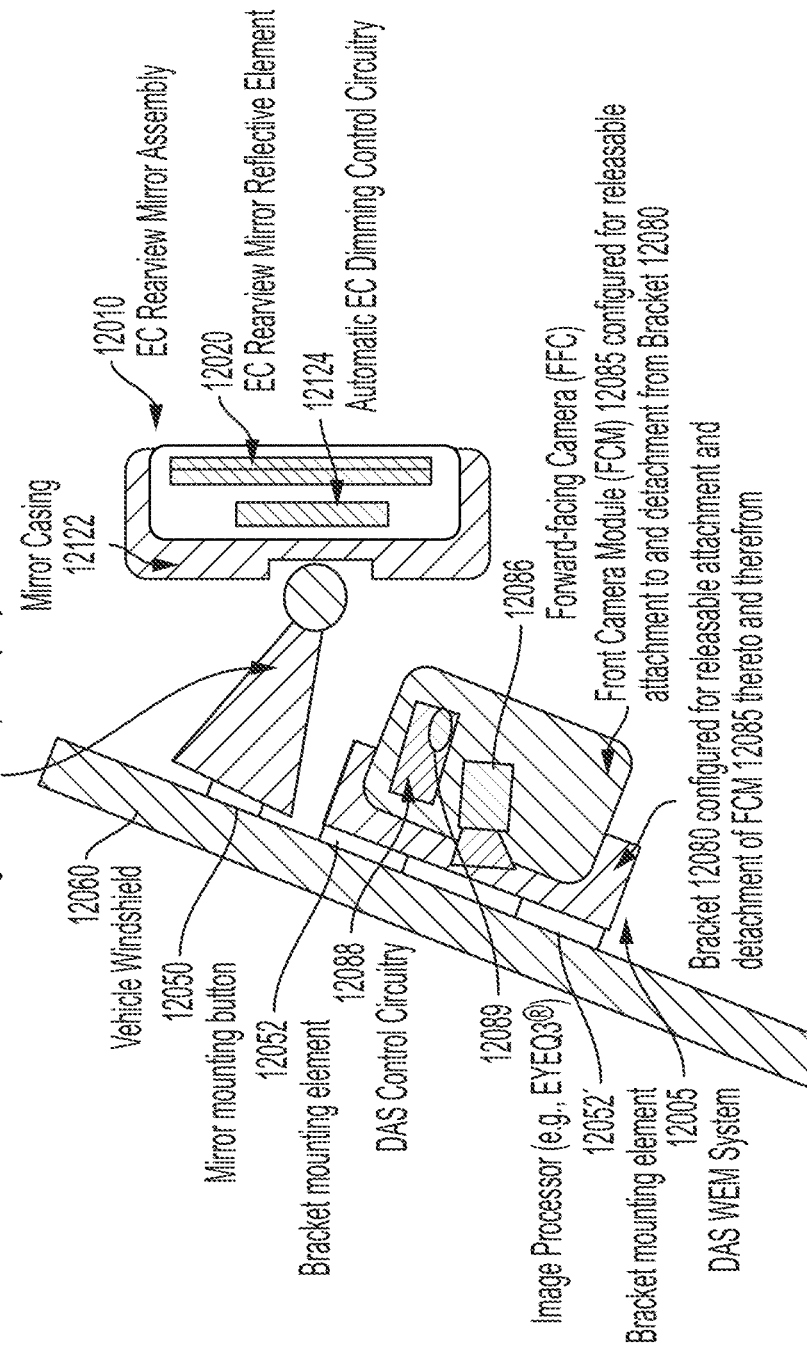
FIG. 12 is a sectional view of a known rearview mirror assembly and separate windshield electronics module housing a forward facing camera.
Figure 13:
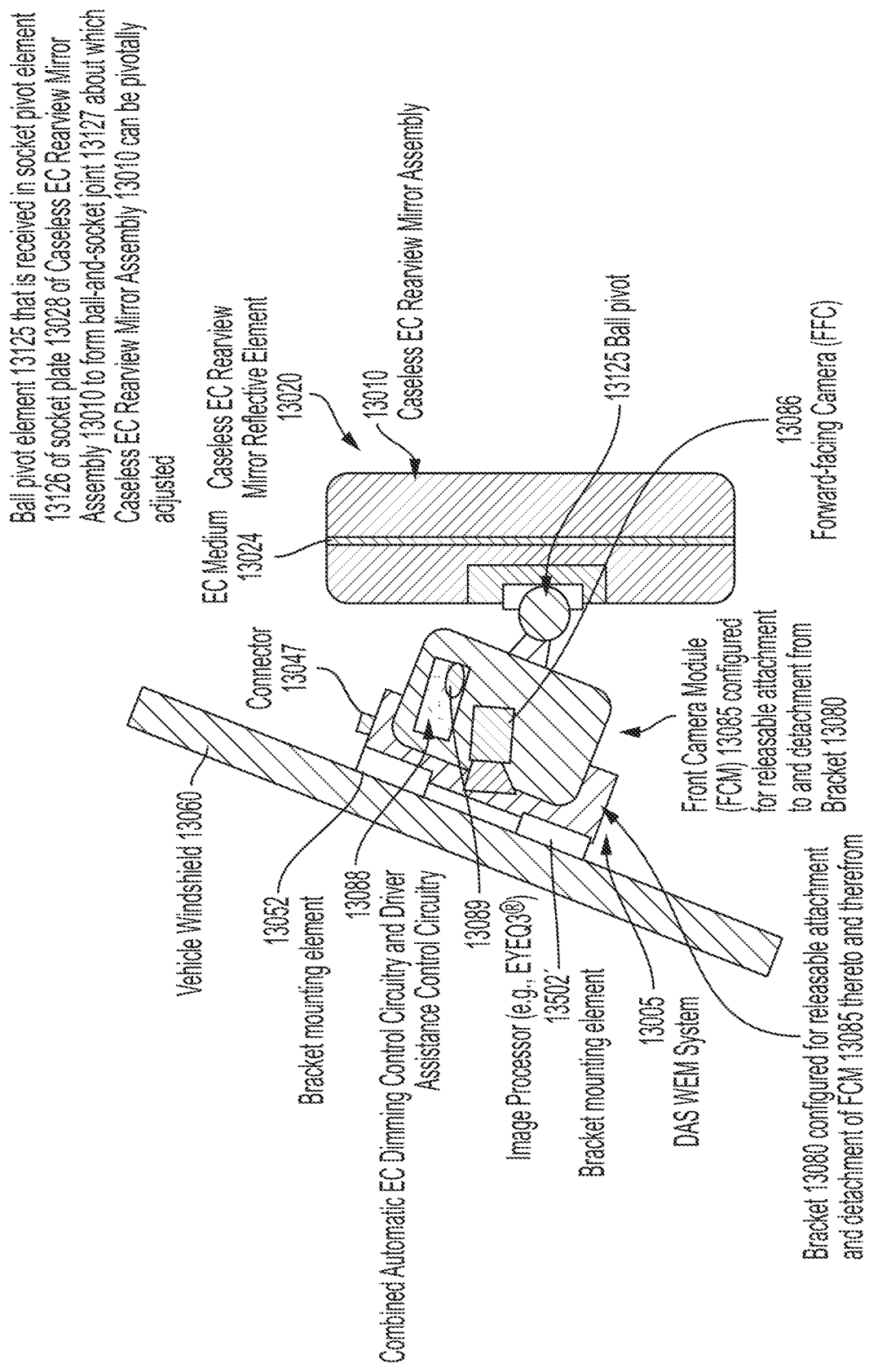
FIG. 13 is a sectional view of another caseless electrochromic rearview mirror assembly of the present invention.

Advantages of the present invention over prior art can be seen by comparison of the conventional, prior art system shown in FIG. 12 to the system in accordance with the present invention shown in FIG. 13. In the known system shown in FIG. 12, EC rearview mirror assembly 12010 mounts to windshield 12060 via mirror mounting button 12050 that is bonded via an adhesive to the in-cabin side of windshield 12060. Mirror mount 12123 of EC rearview mirror assembly 12010 at one ends mount to mirror mounting button 12050 and at the other end comprises ball pivot element 12125 that is received in socket pivot element 12126 of EC rearview mirror assembly 12010 to form ball-and-socket joint 12127 about which mirror casing 12122 of EC rearview mirror assembly 12010 can be pivotally adjusted so that a driver of an equipped vehicle can adjust the rearward field of view of EC rearview mirror reflective element 12020 that is housed in mirror casing 12122. Automatic EC dimming control circuitry 12124 is also housed within the cavity formed by mirror casing 12122. Automatic EC dimming control circuitry 12124 further includes power supplies to regulate and reduce vehicle ignition voltage (typically reduce and regulate 12 V nominal ignition voltage to 5 V or so) to power electronic circuitry. Ignition voltage and other input from the vehicle is provided to EC rearview mirror assembly 12010 via a connector to a wire harness of the equipped vehicle that is provided at or is accessible at mirror casing 12122. Automatic EC dimming control circuitry 12124 receives input from an ambient light photosensor and a glare photosensor of EC rearview mirror assembly 12010 and processes received signals (typically using digital circuitry involving a microprocessor) in order to appropriately dim the EC rearview mirror reflective element 12020 (such as by application of a DC voltage up to 1.2 V or so) when glaring conditions exist at night due to headlights from rear-approaching vehicles. Control outputs from EC rearview mirror assembly 12010 to the rest of the vehicle also pass through the connector that is provided at or is accessible at mirror casing 12122.

As also can be seen in FIG. 12, the Driver Assistance System Windshield Electronics Module (DAS WEM) System 12005 attaches to windshield 12060 at a location separate and spaced from where EC rearview mirror assembly 12010 attaches to windshield 12060. DAS WEM System 12005 comprises Front Camera Module (FCM) 12085 that is configured for releasable attachment to and detachment from bracket 12080 that is itself attached at windshield 12060. As shown in FIG. 12, bracket 12080 attaches to windshield 12060 via bracket mounting elements 12052, 12052' (that typically are metal bonding pins or buttons or posts that are each bonded by the likes of a cured epoxy adhesive to the in-cabin surface of windshield 12060). Alternative bracket 12080 can directly attached to windshield 12060 via bonding thereto using a layer of cured adhesive.

FCM 12085 is a self-contained driver assistance system camera module and typically is manufactured/assembled separate from manufacture/assembly of EC rearview mirror assembly 12010 (and most usually by a different company and at a different manufacturing facility than for the mirror assembly). FCM 12085 houses a Forward-Facing Camera (FFC) 12086 that preferably uses a CMOS imager sensor and that with FCM 12085 received by and mounted to bracket 12080 (itself attached to windshield 12060), views forward through windshield 12060 and captures frames of image data in its field of view. FCM 12085 includes Driver Assistance System (DAS) Circuitry 12088 that includes image processor 12089 (preferably a Mobileye EYEQ3 or EYEQ4 image processor and associated software). Image data captured by FFC 12086 is image processed by image processor 12089 for a variety of driver assistance systems of the equipped vehicle such as for automatic headlamp control, lane assist and lane departure warning, traffic sign recognition, forward collision warning, automatic emergency braking, adaptive cruise control and/or pedestrian detection/collision avoidance. Driver Assistance System (DAS) Circuitry 12088 further includes various digital circuitry including digital memory and other digital components including at least one microprocessor. Driver Assistance System (DAS) Circuitry 12088 further includes power supplies to regulate and reduce ignition voltage (typically to 5 V or so) to power electronic circuitry. Ignition voltage and other input from the vehicle is provided to FCM 12085 via a connector of FCM 12085 that is configured to a wire harness of the equipped vehicle. This connector is provided at or is accessible at FCM 12085 and is configured for connection with a vehicle wire harness. Control outputs from FCM 12085 to the rest of the vehicle also pass through the connector that is provided at or is accessible at FCM 12085. FCM 12085 connects with and is in 2-way communication with a bus data communication system of the equipped vehicle (such as a CAN bus) via this connector.

As can be seen in FIG. 13, the digital circuitry already present (and paid for) in FCM 13085 can be wholly or mostly used for automatic EC dimming control. Thus Combined Automatic EC Dimming Control Circuitry and Driver Assistance Control Circuitry 13088, in addition to providing DAS functionality, can also provide automatic EC dimming control for Caseless EC Rearview Mirror Reflective Element 13020 of Caseless EC Rearview Mirror Assembly 13010. Thus overall packaging can be more compact, and less electronic components are needed and used. Ball pivot element 13125 of FCM 13085 is received in socket pivot element 13126 of socket plate 13128 of Caseless EC Rearview Mirror Assembly 13010 to form ball-and-socket joint 13127 about which Caseless EC Rearview Mirror Assembly 13010 can be pivotally adjusted. Thus there is no need to have a separate mirror mounting button attached to the windshield.

Combined Automatic EC Dimming Control Circuitry and Driver Assistance Control Circuitry 13088, in addition to providing the EC dimming control signal (typically a DV voltage from 0 V to around 1.2 V or so) to dim EC medium 13024 of Caseless EC Rearview Mirror Reflective Element 13020, also provides signals to dim any electrochromic exterior mirror reflective elements used by the equipped vehicle. Such exterior EC mirror dimming commands/signals/outputs from Combined Automatic EC Dimming Control Circuitry and Driver Assistance Control Circuitry 13088 preferably pass through connector 13047 that is provided at or is accessible at FCM 18085 when connector 13047 is connected to q wire harness of the equipped vehicle, and most preferably are communicated to the exterior rearview mirrors of the vehicle via the likes of a CAN bus vehicle data communication network or a LIN/LAN network. Similarly, vehicle data (such as speed, steering angle, yaw rate, transmission gear selection such as for reverse gear inhibit of dimming of EC mirrors, and the like) can communicate to FCM 13085 via such a CAN bus vehicle data communication network and pass via connector 13047 to Combined Automatic EC Dimming Control Circuitry and Driver Assistance Control Circuitry 13088.

FCM 13085 can house other electronic features such as a compass sensor and associated electronics/software, a garage door opener and associated electronics/software (such as HOMELINK® available from Gentex Corporation of Zeeland Mich.), a toll booth transducer and associated electronics/software, a display driver and associated electronics/software, and a video display screen and associated electronics/software. User inputs (such as buttons for HOMELINK®) and other HMI can be provided at FCM 13085.

Figure 14:
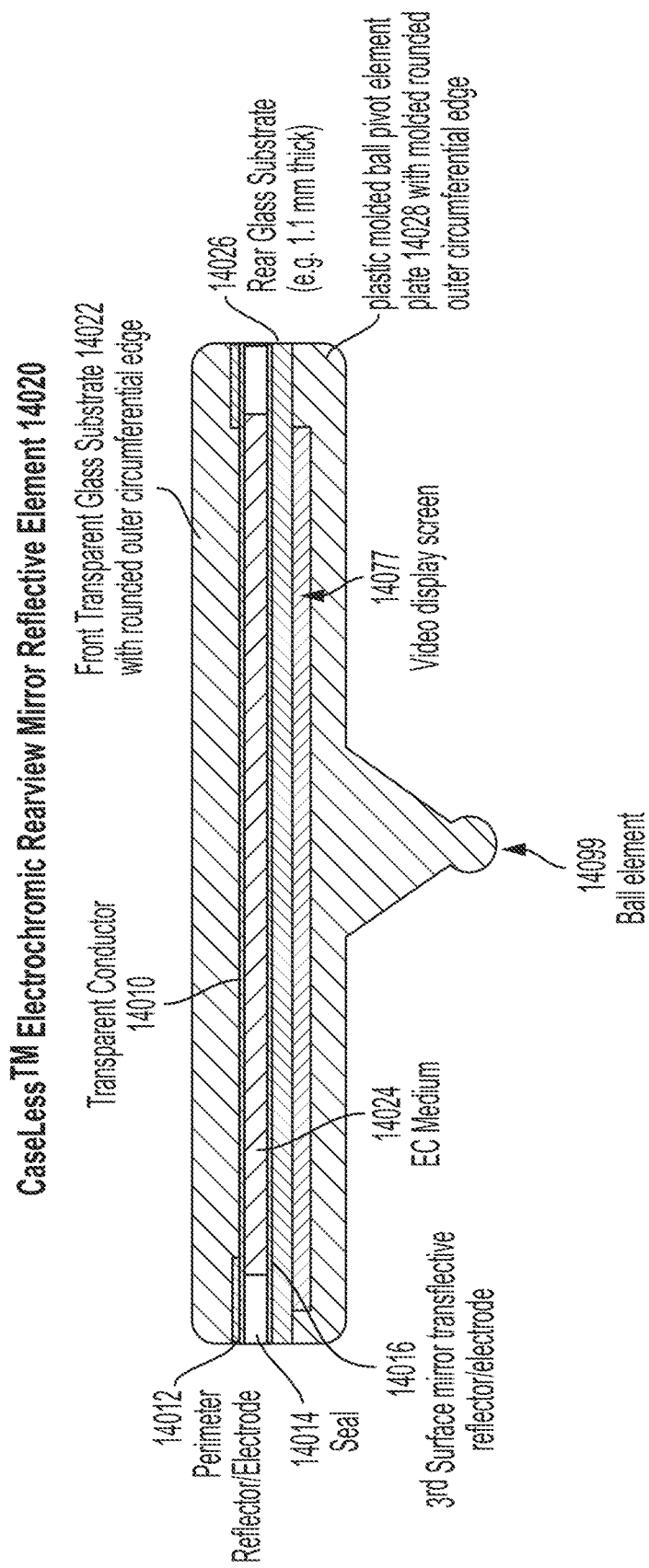
FIG. 14 is a sectional view of another reflective element assembly for a caseless electrochromic rearview mirror assembly of the present invention.

For example, FIG. 14 shows caseless EC rearview mirror reflective element 14020 that comprises a 3rd surface mirror transflective reflector 14016 having at least about 30% transmissivity and at least about 50% reflectivity. Video display screen 14077 is covert behind 3rd surface mirror transflective reflector 14016 until it is backlit to display information. Electronic circuitry to control video display screen 14077 is located in a WEM that includes a socket element that receives ball pivot element 14099 of caseless EC rearview mirror reflective element 14020 to form a ball-and-socket joint that EC rearview mirror reflective element 14020 can pivot about. Caseless EC rearview mirror reflective element 14020 can be used for a bi-mode (such as by utilizing aspects of the systems described in U.S. provisional applications, Ser. No. 62/237,716, filed Oct. 6, 2015 and Ser. No. 62/185,206, filed Jun. 26, 2015, which are hereby incorporated herein by reference in their entireties). The front glass substrate 14022 has a ground, rounded glass outermost edges of radius greater than or equal to about 2.5 mm and the plastic molded pivot element plate 14028 also has plastic molded, rounded edges of radius greater than or equal to about 2.5 mm.

Figure 15:
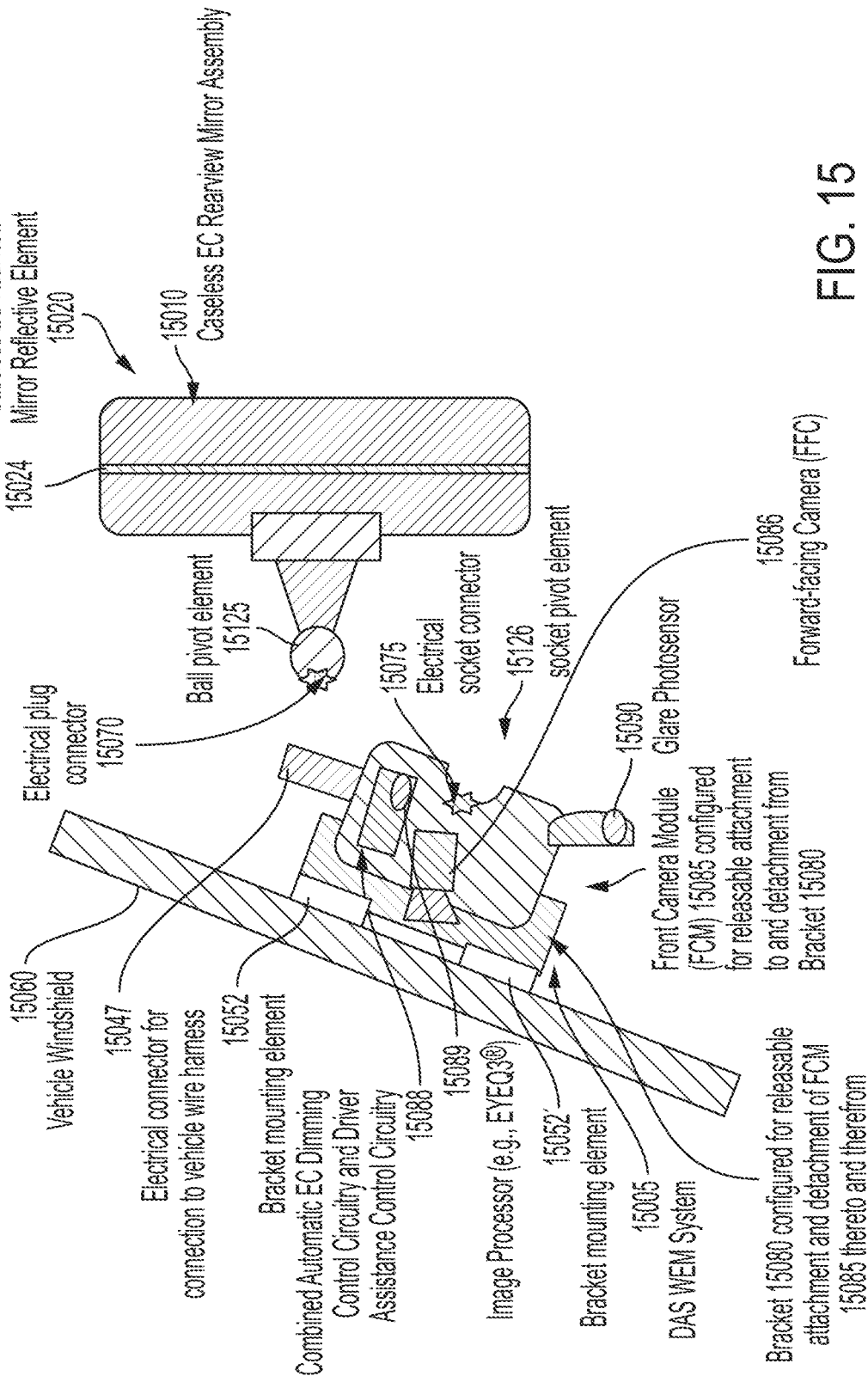
FIG. 15 is an exploded sectional view of another caseless electrochromic rearview mirror assembly of the present invention.

As shown in FIG. 15, ball pivot element 15125 of Caseless EC Rearview Mirror Reflective Element 15020 is received in socket pivot element 15126 of FCM 15085 to form ball-and-socket joint 15127 about which Caseless EC Rearview Mirror Assembly 15010 can be pivotally adjusted. DAS WEM System 15005 comprises Front Camera Module (FCM) 15085 that is configured for releasable attachment to and detachment from bracket 15080. Bracket 15080 is configured for releasable attachment and detachment of FCM 15085 thereto and therefrom with bracket 15080 attached at the in-cabin side of windshield 15060 (either by bracket 15085 mounting to bracket mounting elements 15052, 15052' or by bracket 15080 being bonded directly and fixedly to the windshield using a layer of cured adhesive). Forward-facing Camera (FFC) 15086 (that preferably comprises a CMOS megapixel photosensor array having at least 1,000,000 photosensors (and optionally a 3 megapixel array or an 8 megapixel array or the like) arranged in a matrix array of multiple columns of photosensors and multiple rows of photosensors) is accommodated within a housing/casing of FCM 15085 and is configured to view forward of the equipped vehicle when FCM 15085 is attached to and supported by bracket 15080 at windshield 15060.

Combined Automatic EC Dimming Control Circuitry and Driver Assistance Control Circuitry 15088 is also accommodated within the housing/casing of FCM 15085. Combined Automatic EC Dimming Control Circuitry and Driver Assistance Control Circuitry 15088 comprises Image Processor 15089 (e.g., preferably a Mobileye EYEQ3® or EYEQ4® image processing chip and associated software) and includes other digital and analog circuitry such as digital memory and another microprocessor. Combined Automatic EC Dimming Control Circuitry and Driver Assistance Control Circuitry 15088 receives image data captured by FFC 15086 and image processes received image data via image processor 15089 for a variety of driver assistance systems of the equipped vehicle (including those discussed above herein).

FCM 15085 includes electrical connector 15047 that is configured for connection to a vehicle wire harness of the equipped vehicle (including connection to a communication bus of the vehicle) and receives electrical power and vehicle data from the vehicle and outputs control signals to the vehicle such as via a CAN bus. Combined Automatic EC Dimming Control Circuitry and Driver Assistance Control Circuitry 15088 also receives ambient light data from FFC 15086 and received a glare intensity signal from Glare Photosensor 15090, and when during nighttime driving a glaring condition is determined to exist due to rear-approaching headlights of vehicles to the rear and to the side of the equipped vehicle, Combined Automatic EC Dimming Control Circuitry and Driver Assistance Control Circuitry 15088 generates an EC mirror control signal (typically a DC voltage in the range from 0 V to around 1.2 V) that is fed to electrical terminals at electrical socket connector 15075 that is part of socket pivot element 15126 that is included in FCM 15085.

Socket pivot element 15126 that is included in FCM 15085 is configured to mechanically receive and electrically connect electrical socket connector 15075 to electrical plug connector 15070 of ball pivot element 15125 that is part of Caseless EC Rearview Mirror Reflective Element 15020 of Caseless EC Rearview Mirror Assembly 15010. Ball pivot element 15125 of Caseless EC Rearview Mirror Reflective Element 15020 is received in socket pivot element 15126 of FCM 15085 to form ball-and-socket joint 15127 about which Caseless EC Rearview Mirror Reflective Element 15020 can be pivotally adjusted, and in so doing, electrical socket connector 15075 connects to electrical plug connector 15070 and Combined Automatic EC Dimming Control Circuitry and Driver Assistance Control Circuitry 15088 electrically connects with Caseless EC Rearview Mirror Reflective Element 15020 to automatically control dimming of the EC medium 15024 that, when electrically powered, dims the reflectance of Caseless EC Rearview Mirror Reflective Element 15020. In such manner, and at an automobile assembly plant, FCM 15085 can be received from FCM Supplier A and mounted to bracket 15080 (already attached to windshield 15080) and Caseless Rearview Mirror Reflective Element 15020 can be received from Mirror Supplier B (that may be a different supplier/company than FCM Supplier A) and socket pivot element 15126 and electrical socket connector 15075 and ball pivot element 15125/electrical socket connector 15075 are configured such that when the automaker assembly worker snaps/presses/twists ball pivot element 15125 of Caseless EC Rearview Mirror Reflective Element 15020 into socket pivot element 15126 of FCM 15085, electrical connection is made between electrical socket connector 15075 and electrical plug socket connector 15070, and such electrical connection is maintained as Caseless EC Rearview Mirror Reflective Element 15020 pivotally adjusts about FCM 15085 via ball-and-socket joint 15127. Such "plug and play" assembly of Caseless EC Rearview Mirror Assembly 15010 has numerous advantages both in economics and in functionality.

Figure 16:
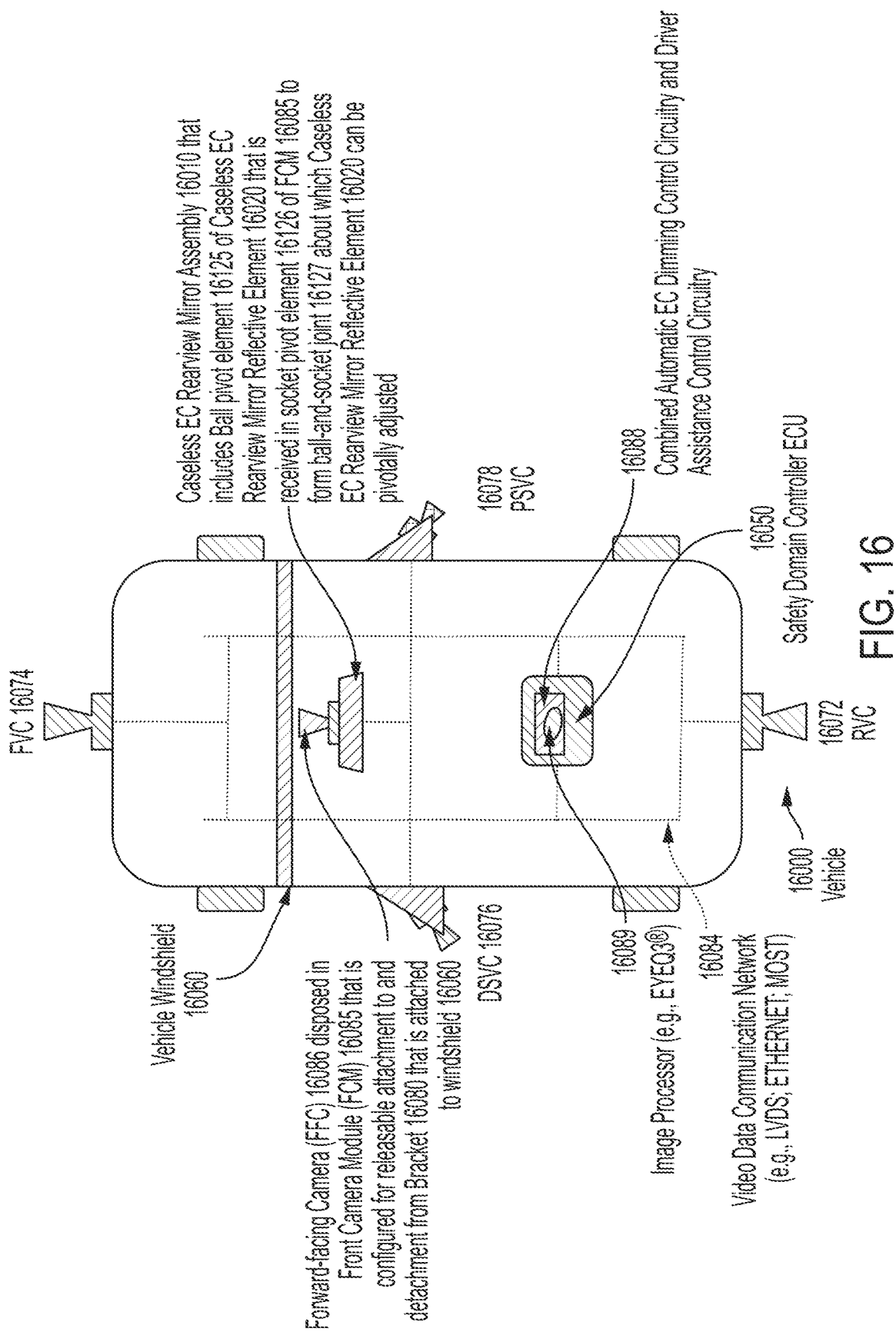
FIG. 16 is a plan view of a vehicle incorporating a plurality of cameras in accordance with the present invention.

As shown in FIG. 16, vehicle 16000 comprises at least four exterior-mounted cameras. FVC 16074 is an at least forward viewing camera mounted at the front of vehicle 16000. RVC 16072 is an at least rearward viewing camera mounted at the rear of vehicle 16000. DSVC 16076 is an at least sideward viewing camera mounted at the driver-side of vehicle 16000 (such as, for example, in or at a driver-side exterior rearview mirror assembly of the equipped vehicle or mounted at or in a driver-side body portion of the equipped vehicle or mounted at or in a driver-side exterior pillar portion of the equipped vehicle). PSVC 16078 is an at least sideward viewing camera mounted at the passenger-side of vehicle 16000 (such as, for example, in or at a passenger-side exterior rearview mirror assembly of the equipped vehicle or mounted at or in a passenger-side body portion of the equipped vehicle or mounted at or in a passenger-side exterior pillar portion of the equipped vehicle). Forward-facing Camera (FFC) 16086 is disposed in Front Camera Module (FCM) 16085 that is configured for releasable attachment to and detachment from bracket 16080 that is attached to windshield 16060. Caseless EC Rearview Mirror Assembly 16010 includes ball pivot element 16125 of Caseless EC Rearview Mirror Reflective Element 16020 that is received in socket pivot element 16126 of FCM 16085 to form ball-and-socket joint 16127 about which Caseless EC Rearview Mirror Reflective Element 16020 can be pivotally adjusted.

Image data captured by camera FVC 16074, RVC 16072, DSVC 16076, PSVC 16078 and FFC 16086 are provided via Video Data Communication Network 16084 to Safety Domain Controller ECU 16050. Captured image data can be carried over the likes of LVDS or ETHERNET or MOST cabling/networking. Safety Domain Controller ECU 16050 comprises Combined Automatic EC Dimming Control Circuitry and Driver Assistance Control Circuitry 16088. Combined Automatic EC Dimming Control Circuitry and Driver Assistance Control Circuitry 16088 comprises Image Processor 16089 (e.g., Mobileye's EYEQ3® or EYEQ4® image processor and associated image processing/object detection software). Safety Domain Controller ECU 16050 connects with a vehicle data communication bus of vehicle 16000 (such as a CAN bus). Image data captured by at least one of cameras RVC 16072, DSVC 16076 and PSVC 16078 is processed by Automatic EC Dimming Control Circuitry and Driver Assistance Control Circuitry 16088 and should at night a glaring condition be determined to exist due to headlights of rear-approaching vehicles, a control signal/command is sent from Safety Domain Controller ECU 16050 via the likes of a CAN bus to Caseless EC Rearview Mirror Assembly 16010 that causes EC medium 16024 of Caseless EC Rearview Mirror Reflective Element 16020 to dim to reduce reflected glare to the driver of the equipped vehicle.

Should vehicle 16000 be equipped with a driver-side EC mirror and a passenger-side EC mirror, image data captured by at least one of cameras RVC 16072, DSVC 16076 and PSVC 16078 is processed by Automatic EC Dimming Control Circuitry and Driver Assistance Control Circuitry 16088 and should at night a glaring condition be determined to exist due to headlights of rear-approaching vehicles, then dimming of the driver-side EC mirror and/or passenger-side EC mirror is controlled individually and independent of (when glaring conditions make appropriate) dimming of EC medium 16024 of Caseless EC Rearview Mirror Reflective Element 16020. Thus, the system can (responsive to image data captured by multiple exterior, sideward and rearward viewing cameras) drive all three mirrors (the interior rearview mirror, the driver side exterior rearview mirror and the passenger side exterior rearview mirror) independently. The cameras provide more inputs, so the system can better determine when there is glare at each mirror location (and the level of such glare). The mirror control processing capability can be added to the controller ECU that is already present in the vehicle for the surround view image processing. The controller may process image data and may send a PWM signal to a mirror drive circuit of each mirror assembly, or the controller may include the drive circuit functions and may simply power the respective individual mirror reflective element when glare is detected for that mirror reflective element or such power/control may comprise a network command over a LIN/CAN communication network. Thus, the present invention utilizes the surround view system to individually drive the EC cells of the interior and exterior rearview mirrors. The surround view system can thus drive all three EC cells independently for enhanced system glare protection performance.

Figure 17:
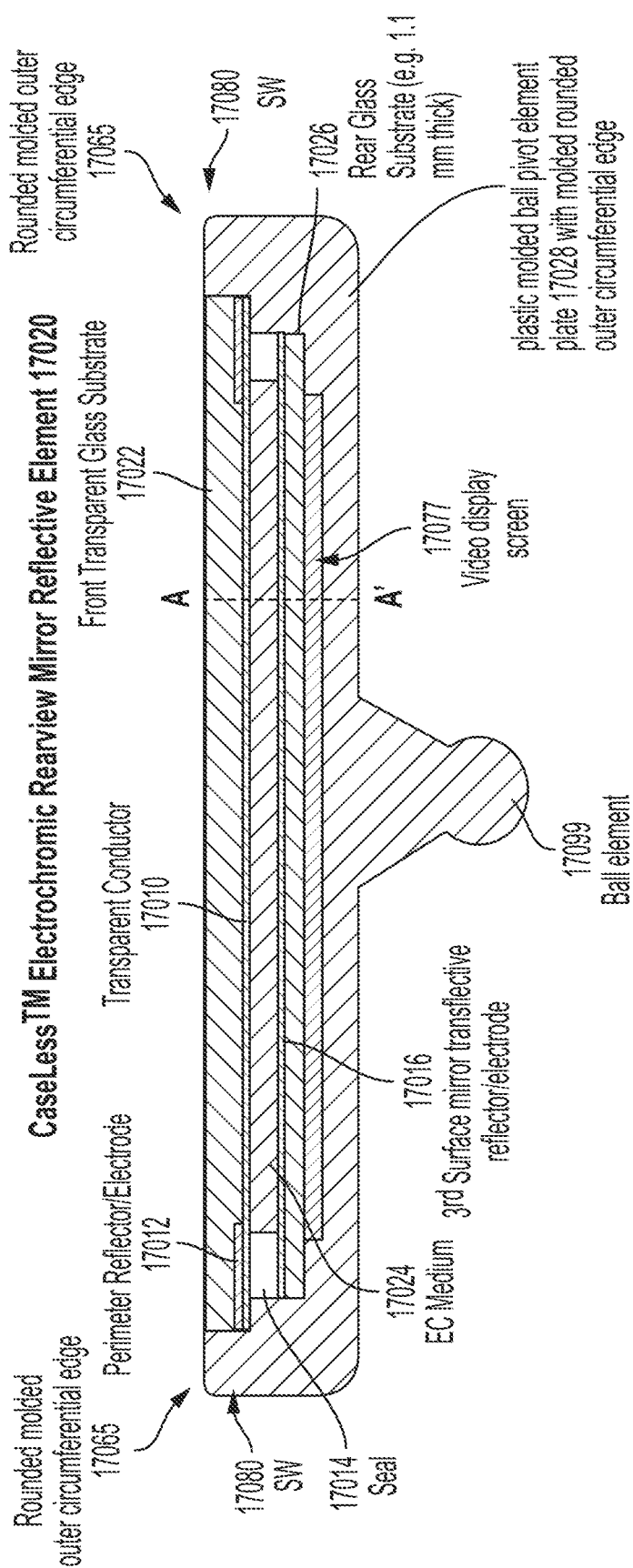
FIG. 17 is a sectional view of another reflective element assembly for a caseless electrochromic rearview mirror assembly of the present invention.

As shown in FIG. 17, a Caseless Electrochromic Rearview Mirror Reflective Element 17020 comprises a plastic molded ball pivot element plate 17028 with rounded outer circumferential edge. Ball pivot element 17099 of plastic molded ball pivot element plate 17028 (that is integrally molded with plastic molded ball pivot element plate 17028 in a plastic injection molding operation that forms plastic molded ball pivot element plate 17028) is configured to mechanically fit and electrically couple with a receiving socket pivot element of a WEM attached at a vehicle windshield, and with automatic EC dimming control circuitry and preferably with driver assistance control circuitry also accommodated in the WEM about which Caseless Electrochromic Rearview Mirror Reflective Element 17020 is pivotally adjustable via a ball-and socket-joint formed of ball pivot element 17099 of plastic molded ball pivot element plate 17028 and the socket pivot element of the WEM. Display driver/control circuitry for video display screen 17077 of Caseless Electrochromic Rearview Mirror Reflective Element 17020 is also accommodated in the WEM.

Plastic side wall SW 17080 of plastic molded ball pivot element plate 17028 (formed integrally with plastic molded ball pivot element plate 17028 in the plastic injection molding operation that forms plastic molded ball pivot element plate 17028) circumscribes the outer cut glass edge of front transparent glass substrate 17022. The front surface of front transparent glass substrate 17022 is generally coplanar/flush with the top of side wall SW 17080 and the front and rear plastic outer edges (rounded molded outer circumferential edge 17065) of SW 17080 are rounded (via molding in its injection molding formation) and has a radius of at least 2.5 mm. The mirror assembly may utilize aspects of the mirror assemblies described in U.S. Pat. Nos. 7,289,037 and/or 7,255,451, which are hereby incorporated herein by reference in their entireties.

Preferably, so as to facilitate electrical connection to Perimeter Reflector/Electrode 17012 and/or to Transparent Electrical Conductor 17010 and to 3rd surface mirror transflective reflector/electrode 17016 so as to provide an EC-dimming voltage across EC medium 17024, at least one dimension of rear glass substrate 17026 (that preferably has a plate thickness in the range from about 0.5 mm to about 1.6 mm thick) is smaller in size than a corresponding dimension of front transparent glass substrate 17022 (that preferably has a thickness less than about 2.2 mm and more preferably around 1.6 mm). The EC cell formed by front transparent glass substrate 17022 and rear glass substrate 17026 sandwiching EC medium 17024 nests into plastic molded ball pivot element plate 17028 with cut outer edges of front transparent glass substrate 17022 protected by side wall SW 17080.

The overall thickness dimension (A to A' as shown in FIG. 17) of Caseless Electrochromic Rearview Mirror Reflective Element 17020 is preferably around 20 mm or less, more preferably around 15 mm or less, and most preferably around 10 mm or less.

Should the WEM that Caseless Electrochromic Rearview Mirror Reflective Element 17020 is to mechanically attach and electrically couple with comprise an integral ball pivot member, then Caseless Electrochromic Rearview Mirror Reflective Element 17020 can comprise an integral socket pivot element in lieu of ball pivot element 17099.

Figure 18:
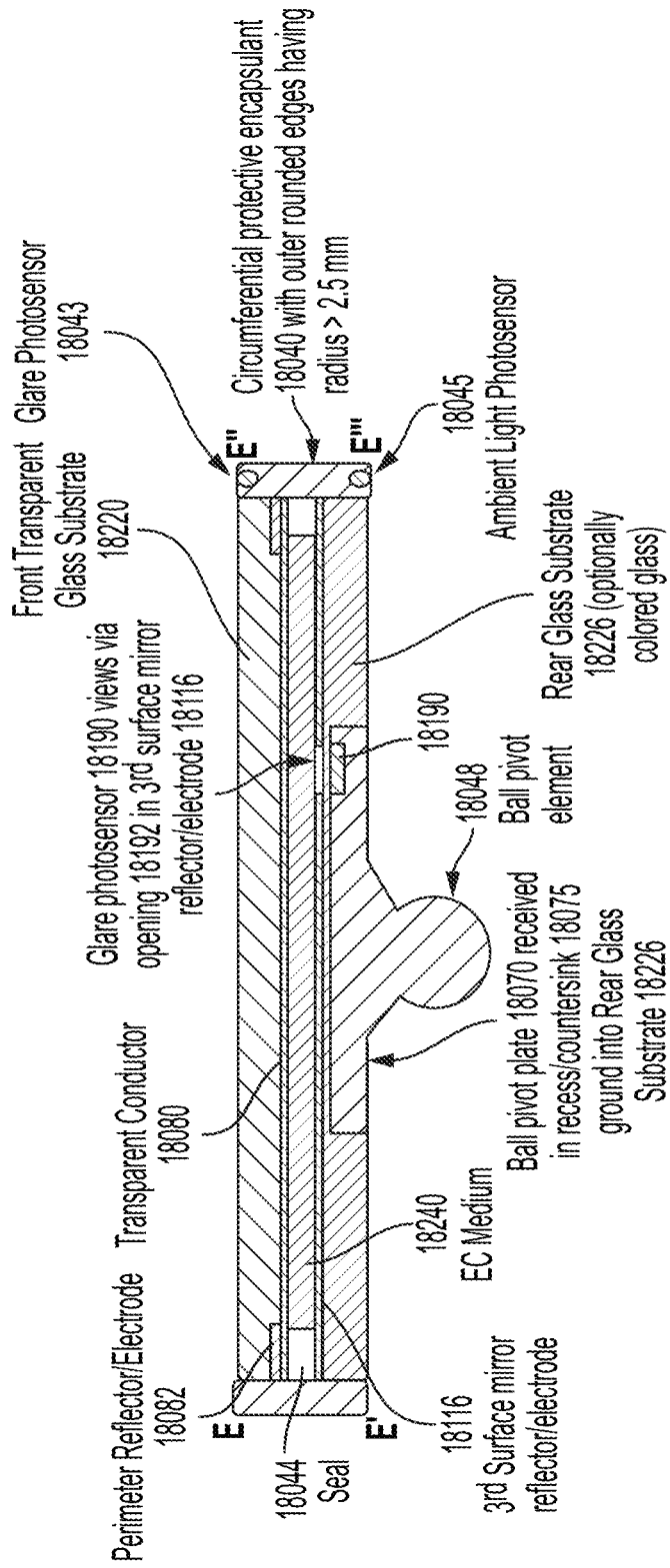
FIG. 18 is a sectional view of another reflective element assembly for a caseless electrochromic rearview mirror assembly of the present invention.

As shown in FIG. 18, caseless electrochromic rearview mirror element 18020 comprises front transparent glass substrate 18220 and rear glass substrate 18226 spaced apart by seal 18044 with EC medium 18240 disposed in the interpane cavity between the glass substrates. EC medium 18240 is in contact with transparent electrical conductor 18080 and 3rd surface mirror reflector/electrode 18116. Recess 18075 is established by a glass grinding operation at the rear of rear glass substrate 18226. Ball pivot plate 18070 (preferably formed of an engineering plastic via injection molding) is received in recess/countersink 18075 ground into rear glass substrate 18226 and is secured therein mechanically and/or adhesively using a layer of cured adhesive or the like.

Ball pivot element 18048 of ball pivot plate 18070 is configured to mechanically fit and electrically couple with a receiving socket pivot element of a WEM attached at a vehicle windshield, and with automatic EC dimming control circuitry and preferably with driver assistance control circuitry also accommodated in the WEM about which Caseless Electrochromic Rearview Mirror Reflective Element 18020 is pivotally adjustable via a ball-and socket-joint formed of ball pivot element 18048 of plastic molded ball pivot plate 18070 and the socket pivot element of the WEM.

Circumferential protective encapsulant 18040 circumscribes and encapsulates the cut outer glass edges of front transparent glass substrate 18220 and of rear glass substrate 18226, and has outer rounded edges having radius>2.5 mm E, E', E", E"'. Optionally, a glare photosensor can be included in circumferential protective encapsulant 18040 (such as glare sensor 18043 shown in FIG. 18). Optionally, an ambient light photosensor can be included in circumferential protective encapsulant 18040 (such as ambient light sensor 18045 shown in FIG. 18).

Circumferential protective encapsulant 18040 is preferably formed of a plastic material and more preferably has an ASTM D2240 type A durometer value in the 50 to 90 Shore A range, and most preferably in the 65-75 range. For example, circumferential protective encapsulant 18040 can be formed of thermoplastic elastomer (TPE) such as Santoprene or can be formed of a rubber-like urethane that has some rubber-like resilience so that should circumferential protective encapsulant 18040 of Caseless Electrochromic Rearview Mirror Reflective Element 18020 be impacted by a driver or occupant of an equipped vehicle, protection against cuts or injury is given by the chosen shape and material used for circumferential protective encapsulant 18040.

Figure 19:
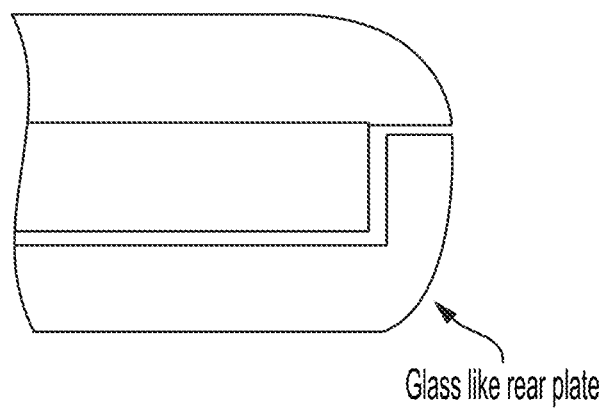
FIG. 19 is a partial sectional view of another reflective element and rearview mirror assembly of the present invention.

Optionally, the rear of the Caseless Electrochromic Rearview Mirror Reflective Element may be encased by a glass element or glass-like rear plate. For example, and such as shown in FIG. 19, the Caseless Electrochromic Rearview Mirror Reflective Element may comprise an electro-optic (such as electrochromic) reflective element having a front rounded glass substrate and a rear glass substrate, with a glass-like rear plate that is rounded about its perimeter and that encases the rear substrate and abuts the rear of the front substrate at an overhang region. The glass-like rear plate may provide a rounded perimeter surface that provides a smooth rounded continuous transition from the rounded perimeter surface of the front glass substrate to the rear perimeter edge region of the glass-like rear plate.

Thus, the mirror reflective element can be made with the electrical connections on the back. The back-plate and housing are replaced with a clear plastic (transparent so as to be glass-like or translucent) or glass substrate to extend the look of a single glass module. The glass-like rear plate may be adhered to the mirror reflective element (such as to the rear of the rear substrate or to the rear of the front substrate at the overhang region. As shown in FIG. 19, the glass-like rear plate can have the same contoured perimeter edge or surface to generally correspond with the rounded or contoured perimeter edge surface of the front substrate.

Electrical contacts (such as for providing electrical connection to terminals for powering the electrochromic reflective element) can be routed along or through and brought out at a center region of the glass-like rear plate (where they may electrically connect to a wire or lead at the mirror mount). Optionally, the electronics may or may not be incorporated into the glass-like rear plate.

Optionally, the glass-like rear plate can have water clear or glossy rounded perimeter surface and rear surface or may have a frosted perimeter and rear surface (or may have a clear/glossy perimeter edge and a frosted rear surface or vice versa). Optionally, the glass-like rear plate may be colored, such as black or such as a color to match a color scheme of the vehicle. Optionally, the rear glass-like plate may be metalized. The metalized surface appearance may be glossy or diffuse. This (or other diffuse or frosted or opaque finish) may be done to hide the electrical contacts and for cosmetic reasons.

The glass-like rear plate can have molded into it various features such as, for example, a stepped lip to match the offset or overhang of the reflective element (such as shown in FIG. 19). The glass-like rear plate may include channels (such as formed along the surface of the plate that opposes the rear surface of the rear substrate) for routing wires, and the glass-like rear plate may include built-in electrical contacts/inserts to assist in making electrical connections. The glass-like rear plate may include an attachment feature at the center region of the plate for connecting the mirror to the mirror mount (and the attachment feature or pivot element may be molded as part of the molded plastic plate or may be separately formed and attached at the glass-like rear plate).

Figure 20:
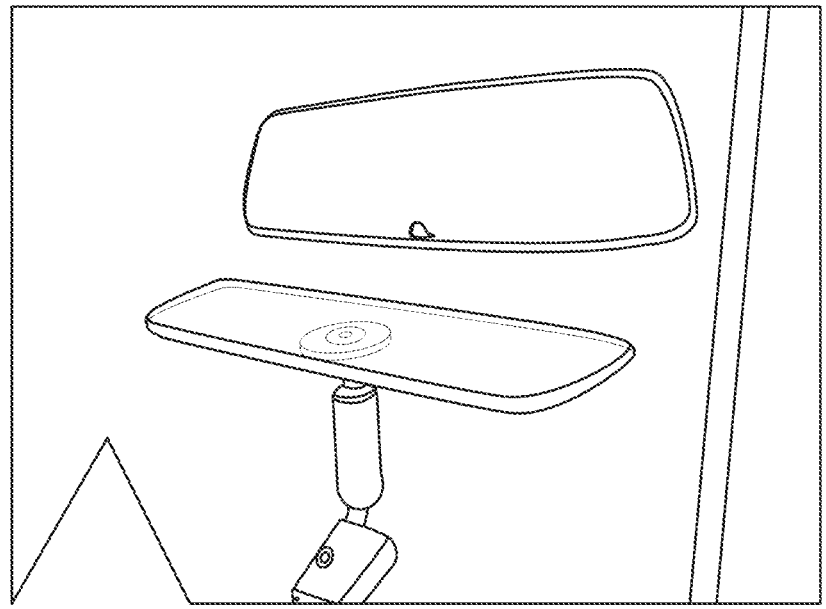
FIG. 20 is a perspective view of another reflective element and rearview mirror assembly in accordance with the present invention, shown with the reflective element detached from a plastic rear mirror portion.
Figure 21:
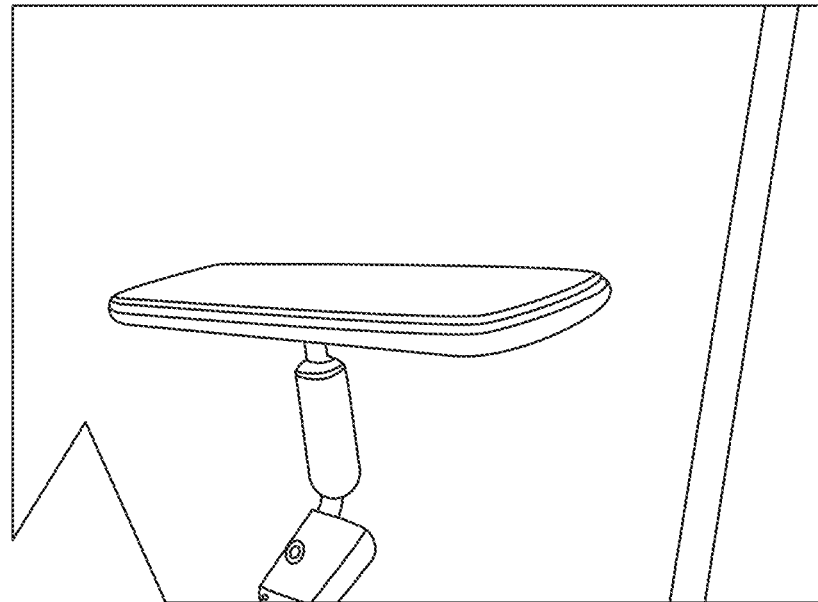
FIG. 21 is another perspective view of the reflective element and rearview mirror assembly of FIG. 20, shown with the reflective element attached at the plastic rear mirror portion.

As shown in FIGS. 20 and 21, the reflective element may be received in or attach at a front surface or recess of the glass-like rear plate to form a mirror head having rounded front and rear perimeter edges. The glass-like rear plate may comprise a green tinted acrylic so that the glass-like rear plate appears to be made of glass.

In addition to putting a reflective finish or a reflective matte finish or a non-reflective matte finish on the mating surface of the glass-like rear plate, that surface may have a paint applied thereto, or since it would be molded with all the features for wires, conductive epoxy, tab and/or the like, and/or that surface may have an in-mold transfer film process. This would hide all the electrical connections when looking at the rear of the mirror assembly by providing an opaque film at the mating surface of the glass-like rear plate. The rounded edge of the glass-like rear plate may have a glossy finish to continue the look of an all glass assembly at the rear of the mirror assembly. When looking directly at the mirror assembly, it would have the look of a glass edge wrapping around to the rear of the mirror head or assembly.

Also, the glass-like rear plate, along with a clear adhesive used for lamination, may act as a scatter-proof safety feature for the mirror assembly.

Other features such as edge lighting may be embedded into the glass-like rear plate to enhance the appearance of the mirror reflective element. Optionally, reading lights, light sensors, touch sensors, signal lights and/or the like may be incorporated into the glass-like rear plate (with the electrical connections for the electronic devices or elements being routed through channels of the glass-like rear plate or being insert molded in the glass-like rear plate during molding of the plastic glass-like rear plate).

Also, use of perimeter seals where the seal is partially electrically conductive and partially electrically insulating can be used to make electrical connection in the caseless interior electro-optic mirrors of the present invention, and especially when laser-ablated demarcations are used to avoid short-circuiting the second surface transparent conductor of the front substrate to the second surface mirror reflector of the rear substrate.

Optionally, edge lighting can come from a central hole in the glass-like rear plate where the mirror gets coupled to the mirror mount. Different forms of lighting may be used such as LEDs. Different LED colors could be used to indicate a respective or particular signal similar to blind zone indicator LED. In such an application, the entire edge of the mirror may light up or flash on/off. Screen printable LEDs may also be molded directly into the glass-like rear plate (such as by utilizing aspects of the mirror assemblies described in U.S. Pat. No. 9,327,649, which is hereby incorporated herein by reference in its entirety).

The lighting effect may be achieved by either lighting the edges, whereby the glass-like rear plate can act as a light guide, or by adding diffusers (such as small light diffusing particles to acrylic), whereby the entire back surface can glow.

Figure 23:
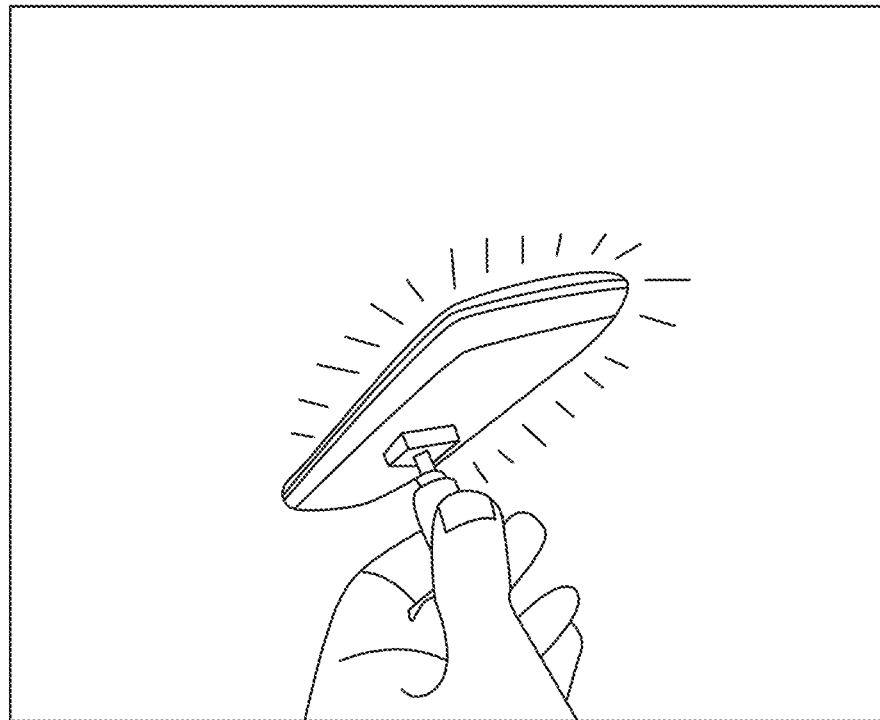
FIG. 23 is another perspective view of the reflective element and rearview mirror assembly of FIG. 23, shown with an illumination source activated to provide perimeter lighting around the plastic rear mirror portion.
Figure 22:
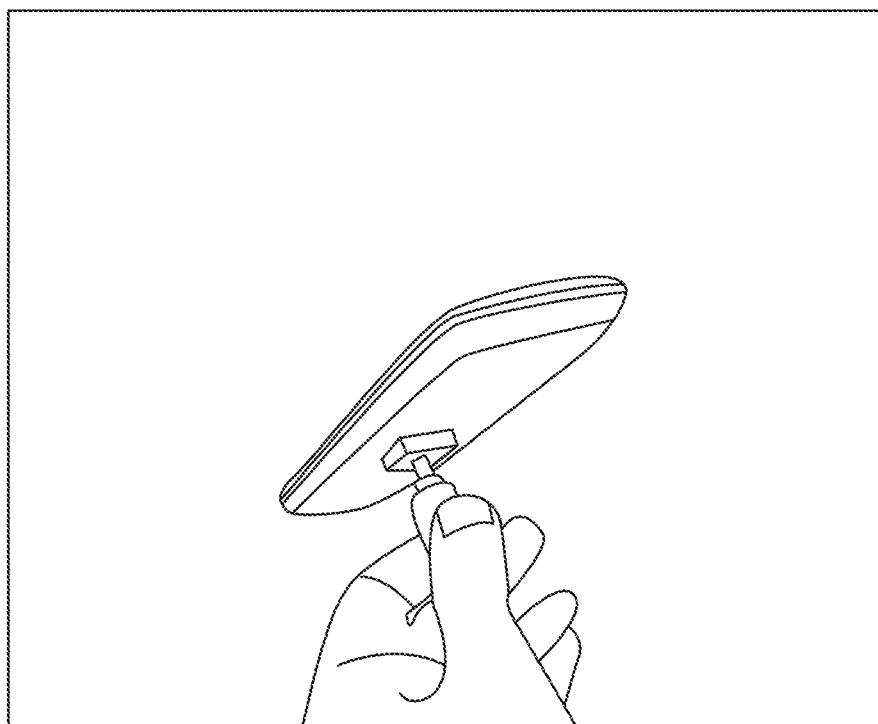
FIG. 22 is a perspective view of another reflective element and rearview mirror assembly in accordance with the present invention.

For example, and with reference to FIGS. 22 and 23, the mirror assembly may include at least one light emitting diode (or other suitable illumination source) to provide a desired lighting effect at the rear mirror portion. As shown in FIG. 22, when the light is deactivated, the glass-like rear plate appears as a clear or tinted or colored rear mirror portion. As shown in FIG. 23, when the light is activated, the perimeter curved surfaces of the glass-like rear plate glow or emit light, such as white light or colored light, depending on the particular application of the mirror assembly and desired appearance (optionally, the LED or LEDs may be operable to emit a colored light as selected by the driver or occupant of the vehicle equipped with the mirror assembly). The LED or LEDs may be disposed at a center portion of the mirror assembly whereby the light emitted by the LED(s) emits through the glass-like rear mirror portion so as to be viewable at the periphery of the mirror portion. The light may also or otherwise cause the rear surface of the glass light plate or rear mirror portion to glow or emit light.

The glass-like rear plate may comprise any suitable material, such as, for example, an ACRYLITE® Hi-Gloss acrylic sheet or the like, which may provide the appearance of painted glass without the associated weight of glass. Optionally, clear light-diffusing particles embedded in the plate may deflect the light rays entering the edges (or entering from a LED at the mirror assembly), whereby the total internal reflection may be suppressed, allowing the light rays to exit the plate via the surfaces in a controlled manner, whereby the glass-like cover plate may provide a substantially uniformly glowing surface.

Other high gloss features/patterns may be added to the in-mold process to provide the desired or selected or customized appearance at the rear of the mirror assembly. Optionally, fluorescent additives may be incorporated into the acrylic sheet. In this way, the sheet may appear colorless when not illuminated and colored when illuminated. Optionally, the desired or selected color can be achieved or provided from the color of the LED itself without a fluorescent additive. Optionally, having a high gloss film at the rear surface of the glass-like rear plate will give it an appearance of more depth. Optionally, any pattern could be incorporated into the glass-like rear plate to provide the desired appearance.

Optionally, edge lighting such as discussed above may be implemented at a plastic mirror casing where the casing or housing may be modified to effectively have a glass-like bezel. For example, a perimeter portion of a mirror casing may be formed of transparent or translucent or clear plastic to allow for light emitted by one or more LEDs inside the mirror casing to pass through or illuminate the clear plastic portion of the mirror casing. The clear casing portion (or optionally a clear bezel portion of the mirror assembly) may function as a light pipe for various lighting applications. The mirror casing with light pipe feature is suitable for interior and exterior mirror applications.

Therefore, the present invention provides an electro-optic rearview mirror system for a vehicle that includes a caseless electro-optic rearview mirror reflective element comprising a front transparent glass substrate with a rounded outer circumferential glass edge, a rear substrate with a rounded outer circumferential edge, and an electro-optic medium sandwiched between the front transparent glass substrate and the rear substrate. A plate is attached at the rear of the rear substrate and the caseless electro-optic rearview mirror reflective element is connected to and pivotal about an interior portion of the vehicle via a ball and socket pivot joint. Optionally, a socket pivot element of the plate forms the ball and socket pivot joint with a ball pivot element of a mirror mounting structure, or a ball pivot element of the plate forms the ball and socket pivot joint with a socket element of a mounting structure at the interior portion of the vehicle. Control circuitry is disposed separate from the caseless electro-optic rearview mirror reflective element for automatically controlling dimming of the electro-optic medium. The control circuitry controls dimming of the electro-optic medium of the caseless electro-optic rearview mirror reflective element via wiring that passes through the ball and socket pivot joint.

The mounting structure at the interior portion of the vehicle may comprise a windshield electronics module, with the control circuitry disposed in the windshield electronics module. In such an application, a socket pivot element of the plate may form the ball and socket pivot joint with a ball pivot element of the windshield electronics module, or a ball pivot element of the plate may form the ball and socket pivot joint with a socket element of the windshield electronics module.

Optionally, the rear substrate may comprise the plate. Optionally, the plate may attach at a rear portion or surface of the rear substrate, such as by being received in a recess established at the rear portion or surface of the rear substrate. Optionally, a radius of the rounded outer circumferential glass edge of the front transparent glass substrate is the same as a radius of the rounded outer circumferential edge of the rear substrate. Optionally, the rear substrate and/or the plate may comprise a transparent or translucent material. Optionally, the rear substrate comprises a rear glass substrate. Optionally, the control circuitry may control dimming of the electro-optic medium responsive to processing of image data captured by a rearward viewing camera disposed at a rear portion of the vehicle, as discussed below.

Optionally, an interior electro-optic rearview mirror assembly such as described above (such as an interior electrochromic rearview mirror assembly or an interior liquid crystal rearview mirror assembly such as described in U.S. Publication No. US-2015-0283945, which is hereby incorporated herein by reference in its entirety) and/or an exterior electro-optic rearview mirror assembly may be operated (such as to electrically dim or darken its electro-optic medium) in conjunction with and controlled by one or more cameras of the vehicle. For example, by combining the electronic content of exterior mirror controls and surround view cameras (such as discussed above with respect to FIG. 16), a simpler system may be provided for the mirror systems. By further combining the mirror electronics and camera electronics, the auto-dimming function typically included within the interior rearview mirror assembly electronics can be assimilated into the overall system, with greater functionality (such as auto-dimming each mirror) and lower costs. For example, and such as is disclosed in U.S. Pat. Nos. 5,760,962 and 5,550,677 (which are hereby incorporated herein by reference in their entireties), an interior electrochromic rearview mirror assembly (and preferably a 3-mirror set of an interior electrochromic rearview mirror assembly and a driver-side exterior electrochromic rearview mirror assembly and a passenger-side exterior electrochromic rearview mirror assembly) can be controlled using a camera of an equipped vehicle, where the camera has a rearward field of view and where, at night, images of headlights of rear-approaching other vehicles are image processed by an image processor of the equipped vehicle, and when it is determined by such image processing that a glaring condition exists due to such rear-approaching other vehicles, a control of the equipped vehicle dims the reflectivity of the interior electrochromic rearview mirror assembly of the equipped vehicle (and in a 3-mirror set, independently dims the individual mirrors). By so doing, the use of a glare photosensor and an ambient photosensor in the interior electrochromic rearview mirror assembly (as is today conventional) is obviated.

Such a rear-viewing camera of the equipped vehicle can provide captured images/image data for a variety of other functions besides automatic dimming mirror control. For example, a camera mounted at the rear of the equipped vehicle may be part of a driver assistance system of the equipped vehicle that provides/supports semi-autonomous or autonomous driving or that provides/supports 360-degree anti-collision monitoring or tailgating alert or the like as well as capturing images/image data for automatic dimming mirror control. Also, since the camera field of view entirely encompasses the mirror field of view, the image data can be sent to a display entirely contained in the interior mirror to provide a full mirror video display when the mirror operates in a display mode, as discussed below.

Figure 24:
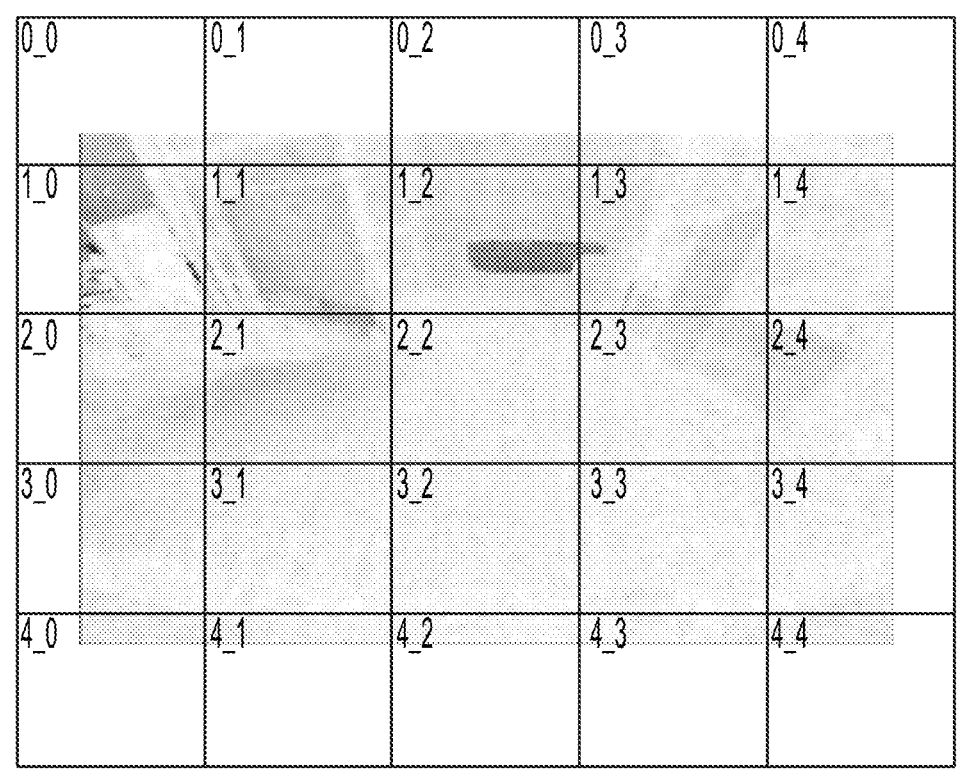
Figure 25:
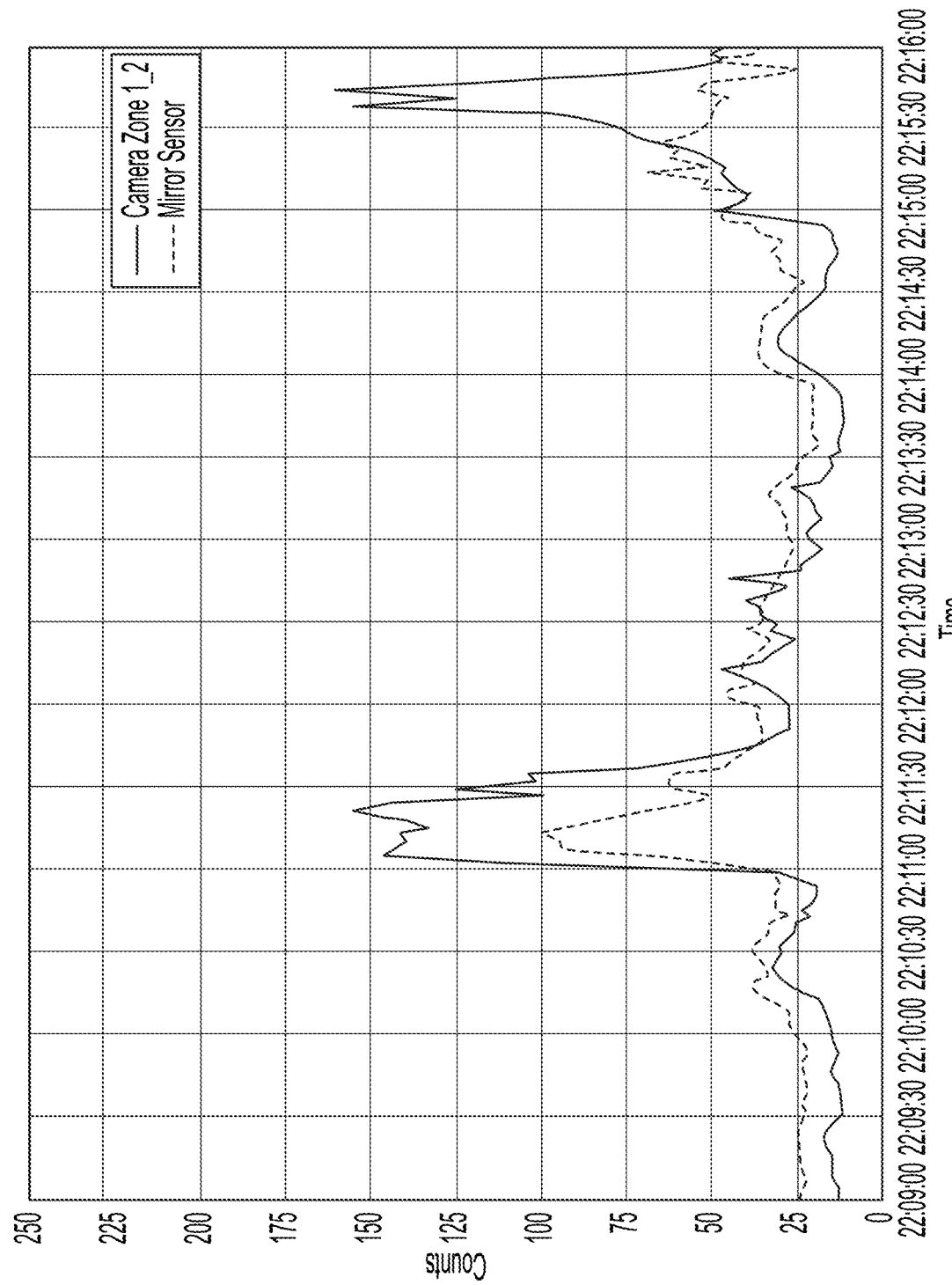
FIG. 25 is a chart showing luminance data captured by the rear backup camera of FIG. 24 and comparing outputs of a mirror sensor and a rear backup camera in determining glare light in a selected zone.
Figure 27:
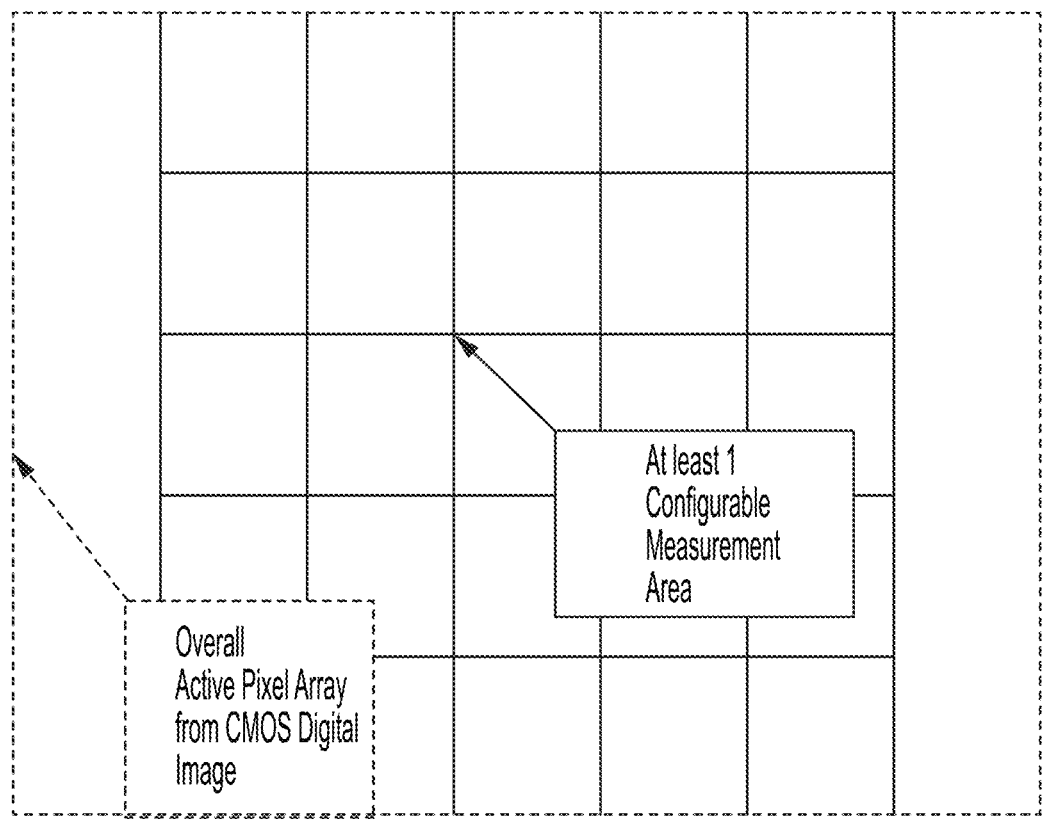
FIGS. 27-29 are schematics showing example grids of the image frame of the rear backup camera.
Figure 28:
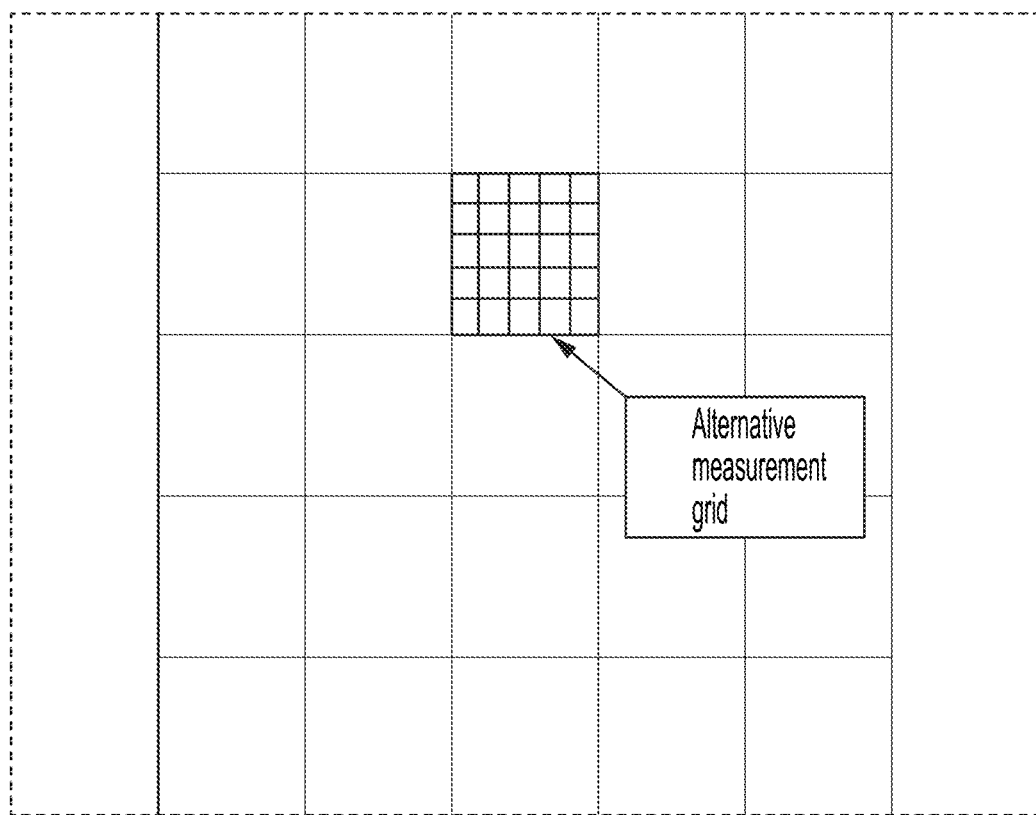
Figure 29:
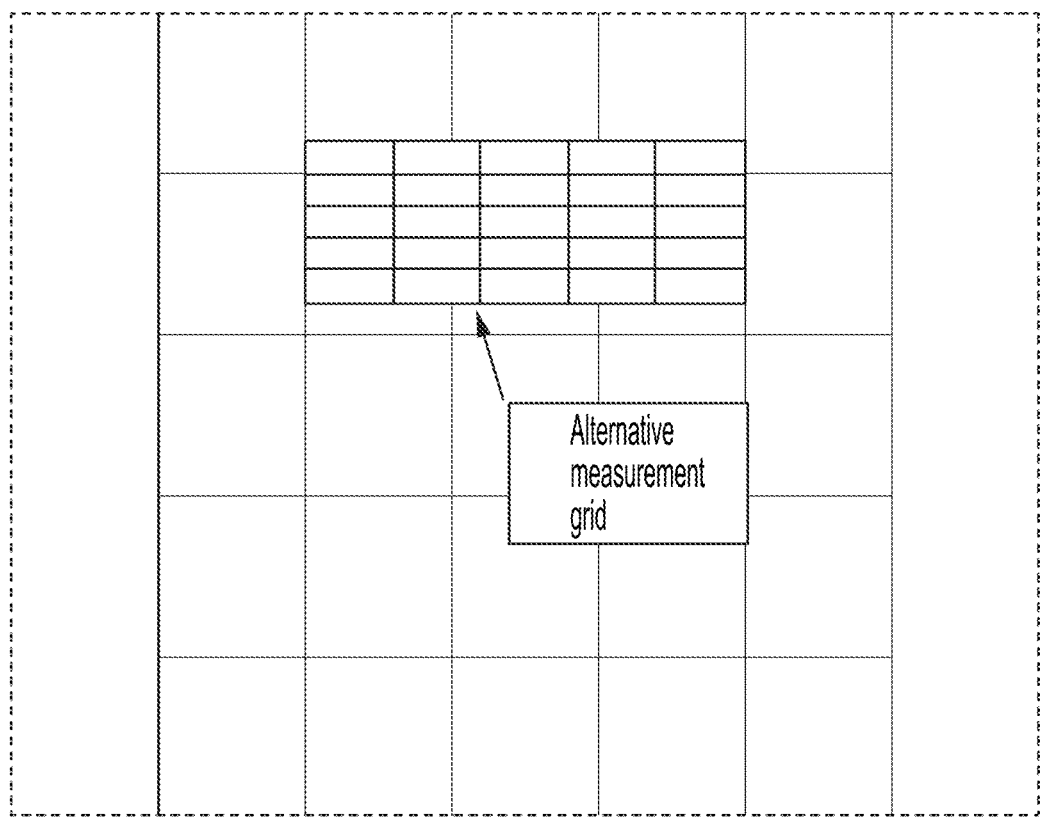

The rear camera may include processing capabilities or the processor may be part of a backup assist system or the like, where the processor is operable to process image data captured by the rear camera to determine luminance and glare in the captured image data (such as via processing the internal registers to the camera, which contain luminance data for each location or for configurable locations). Responsive to determination of glare (via low-level processing of luminance data), the system may control the EC cell of the interior rearview mirror and/or the EC cell of one or both of the exterior mirrors of the vehicle. For example, and such as shown in FIG. 24, the backup camera data can be broken up into a 5×5 grid or 25 sub cells. The internal registers to the camera contain the luminance data for each cell. FIG. 24 shows the NTSC image captured by the camera, while FIG. 25 shows luminance data recorded from the 5×5 grid. In FIG. 24, a light source was placed at head-rest of the driver's seat of the vehicle and aimed at the interior rearview mirror. The area which is illuminated behind the vehicle (where the light aimed at the mirror is reflected off the mirror so as to be directed rearward of the vehicle) and captured in the image is where glare light sources can affect the driver of the vehicle.

The camera captures image data via an active pixel array of a CMOS digital image sensor. Such CMOS digital image sensors are manufactured by On Semiconductor, Omnivision, and others. The CMOS image sensor comprises a photosensor array of multiple rows of photosensing pixels and multiple columns of photosensing pixels. In accordance with the present invention, it is preferable to use an image sensor comprising at least one million photosensor elements or pixels (preferably arranged in columns and rows with more columns than rows), more preferably at least 3 megapixels and more preferably at least 8 megapixels.

The camera image (FIG. 26) shows a 5×5 measurement area within the overall active pixel array of a CMOS digital image sensor. Each row×column area or cell of the grid (preferably a 5×5 grid) is individually accessible to measure its relative luminance value. The processing and averaging of luminance values of cells of a grid is performed by the image signal processor (ISP) of the camera to determine luminance values, so that the camera can determine an appropriate exposure setting and/or other camera settings or parameters (this is not image processing done by a separate image processor for object detection or the like). The low level processing by the camera's ISP simply determines average luminance values, and the system of the present invention accesses the camera's register or processer to determine luminance of the individual cells to determine whether the luminance value of a given cell or region may be indicative of a headlamp of a trailing vehicle behind the equipped vehicle. The system can adjust the size of the grid and cells to zoom in on different regions of the captured images.

Figure 30:
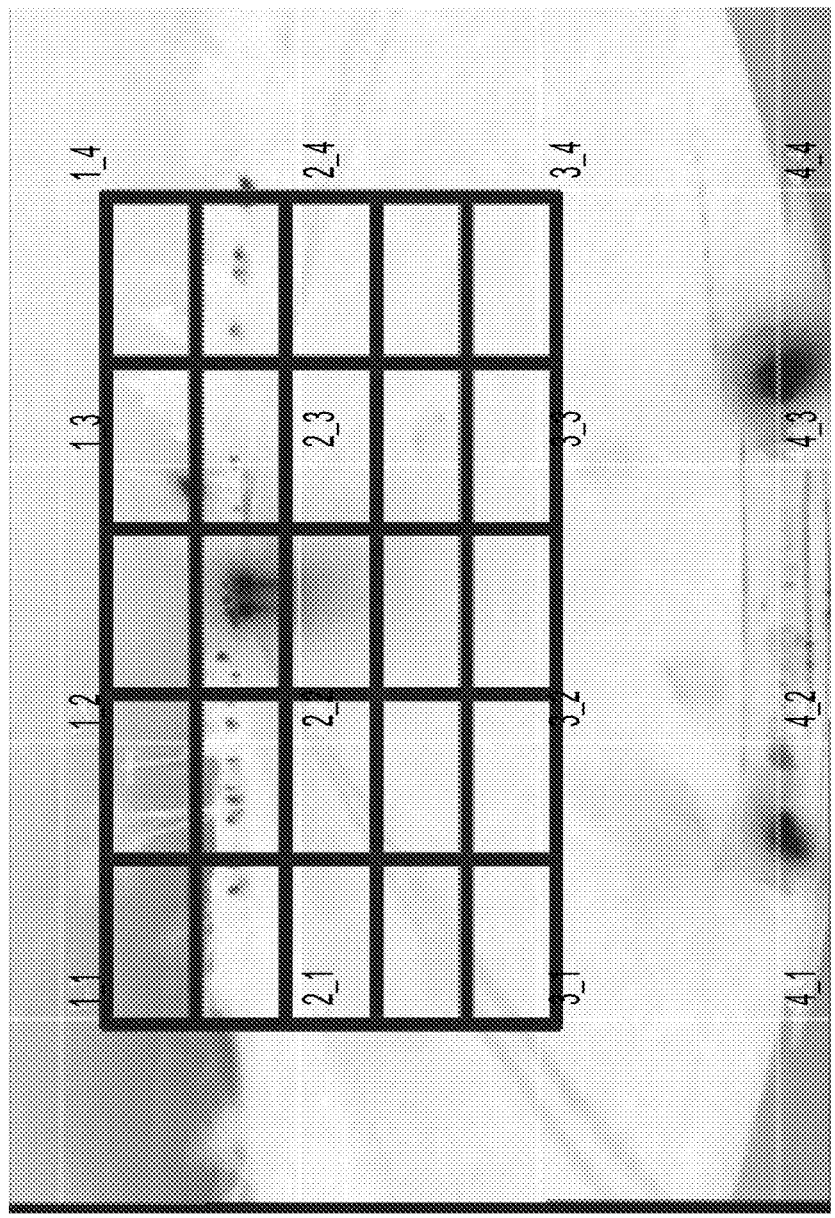
FIG. 30 is an image showing an optional grid for processing image data for a mirror zone of activity.

The boundaries of the row×column measurement area or cell can be configurably adjusted via software depending on the purpose of the measurement. Smaller areas may be used to assist in determining if there is a glare light source(s) present in reference to the surrounding area. Larger areas may allow the software algorithm to determine the amount of ambient light. The ability to dynamically change the measurement boundaries (see FIGS. 26-30) gives the glare monitoring software improved detail specifically during dawn and dusk driving. Optionally, for example, if initially the entire frame of image data is divided into a 5×5 grid (FIG. 26), and the luminance of one of the cells is above a threshold level (and thus indicative of a headlamp or light source being present in that cell, such as cell 1,2 in FIG. 26), the system may adjust the 5×5 grid to increase the resolution of the desired area or cell to enhance the system's ability to determine the location of a potential light source, via the determined luminance of the cells as determined by the camera's image signal processor. The size of the 5×5 grid can be dynamically adjusted to provide enhanced resolution for glare light detection and to determine the location of the glare light source, and the grid can be dynamically adjusted as the scene changes or as different light sources or luminance values are detected at different areas of the captured image data. For example, the image data may be processed via the "zoomed in" 5×5 grid such as shown in FIG. 30, which is optimized to determine luminance of the cells shown, where the greater luminance is in a smaller cell such that the system can more accurately determine the location and intensity of the light source causing the increased luminance. The system may process image data (or access processing done by the camera's ISP) by selecting appropriate cells representative of headlight areas (where headlights of rearward approaching vehicles are expected to be present in the field of view of the rear backup camera). For example, with respect to the 5×5 grid of FIG. 30, the vertical height of the grid more closely approximates the mirror's "zone of activity" and thus provides greater resolution in processing those regions or zones. Optionally, the system may not access or process some of the cells of the selected or applied grid if they encompass regions where glare would not be expected (such as rows 3 and 4 of FIG. 26). These row×column measurement regions or grids may also be configured based on vehicle conditions or parameters, such as speed, transmission gear selection, steering angle, tailgate position or status or the like. Optionally, for example, different grids may be utilized for different vehicles or types of vehicles.

The outer regions of the sensed frame of image data, such as, for example, the upper corners, gives the glare monitoring software the ability to determine luminance values for day and night determination similar to the ambient or forward optical sensor on a conventional interior auto dimming mirror. Optionally, if the system is utilizing a grid like that shown in FIG. 30 (FIGS. 28 and 29), the system may not determine ambient light (since even the upper corner regions of the grid are at or near where glare light may be expected). Optionally, the system may episodically or periodically utilize a grid like that shown in FIG. 26 for ambient light determination (via determined luminance of the upper corner regions of the captured image data) and utilize a zoomed in grid (see FIGS. 28-30) for determination of glare. For example, the system may process a particular number of frames of image data with a grid preferred for glare detection and then may process one or more frames of image data with a larger grid (e.g., FIG. 26) for ambient light detection. By zooming in to particular regions or cells where luminance is determined to be greater, the system can more accurately determine the location of the source of the glare and the intensity or luminance of the glare light source, and then can determine the appropriate dimming control for the interior rearview mirror and/or the driver-side exterior rearview mirror and/or the passenger-side exterior rearview mirror, depending on the determined general location of the glare light source. This allows the system to, for example, dim the driver-side mirror when glare light (luminance above a threshold value) at a cell at the driver side, and then dynamically reduce dimming of the driver-side mirror and increase dimming of the interior mirror as the detected glare light moves toward a center cell of the grid, and then dynamically reduce dimming of the interior mirror and increase dimming of the passenger-side mirror as the detected glare light moves toward a passenger side cell of the grid.

Figure 26:
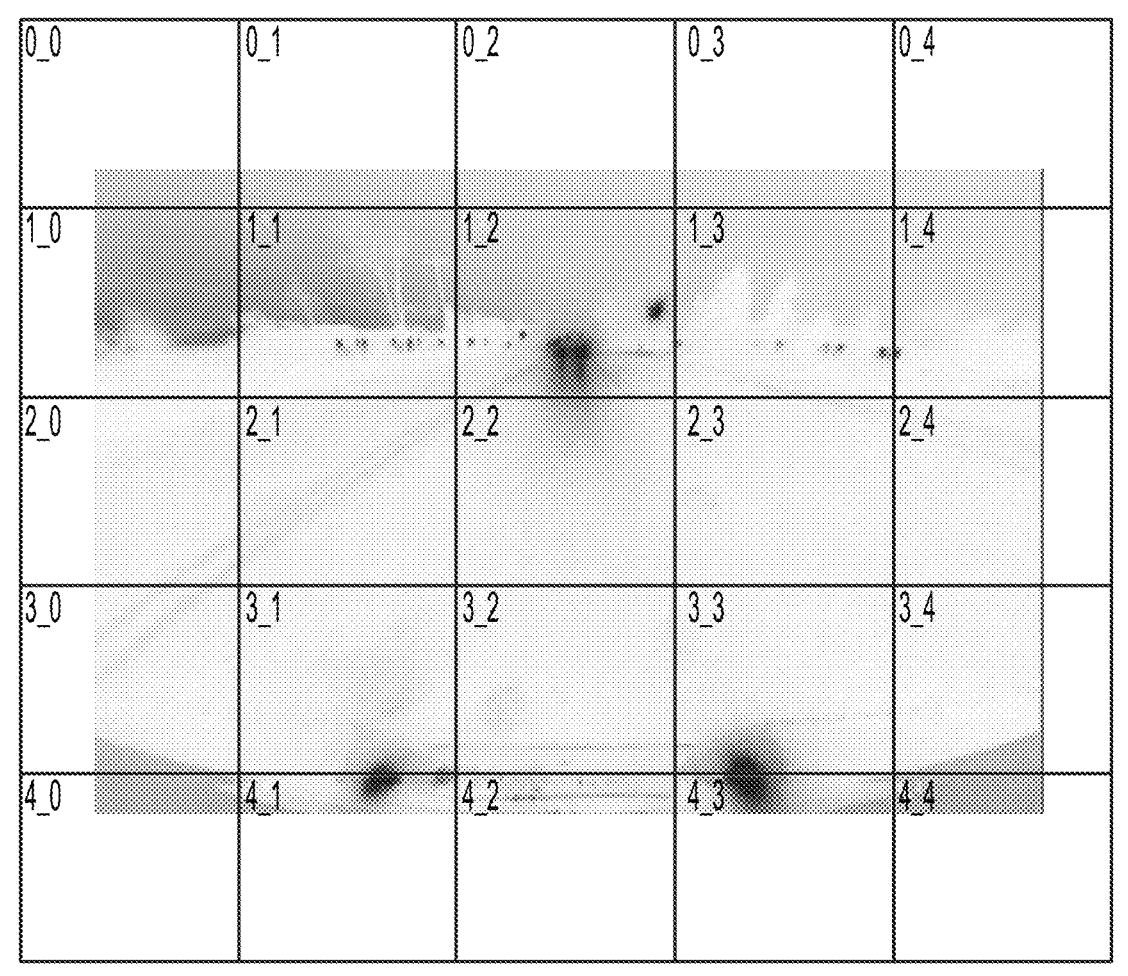

In case the primary camera is not optimal, the software algorithm may change to a secondary camera input, such as a camera located in the CHMSL area. The glare software algorithm can also utilize the image sensor's internal automatic controls as additional information to verify daytime from night time. Controls such as automatic exposure, automatic white balance, and the amount of analog and/or digital gain applied to the CMOS digital image sensor. The CMOS digital image sensor is able to capture a very large viewing area, although the critical glare zone that impacts the interior mirror is significantly smaller than the viewing area noted in the image (FIG. 26). FIG. 24 shows the probable location of the glare light sources, when the tailgate is closed or in the up position. The relative luminance data is corrected to absolute data with the below equation that is determined by the following inputs from camera image registers: exposure time, analog gain and digital gain.

$$\text{Glare} = \log_2\left(\frac{\text{Measurement Area Value}}{(\text{Analog Gain} + \text{Digital Gain}) \times \text{Exposure Time}}\right) + \text{Offset}$$

Figure 31:
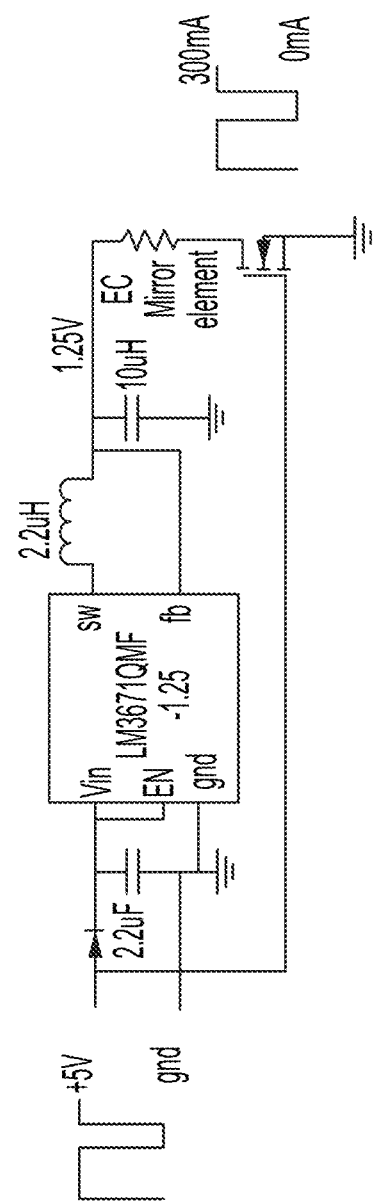
FIG. 31 is a schematic of an EC mirror dimming control.

Optionally, the PCB assembly in the interior mirror may include protection circuitry/power supply/ambient and glare sensors. Optionally, a hybrid design/configuration (see FIG. 31), which only includes EC drive circuitry in the interior mirror that is driven by a PWM signal from an external camera ECU, such as from a rear backup camera. Optionally, the interior mirror PCB assembly may be eliminated, whereby electrification or power of the EC cell hardware left in the interior mirror may be achieved by a simple power signal from an external camera ECU or other central processor of the vehicle.

Figure 32A:
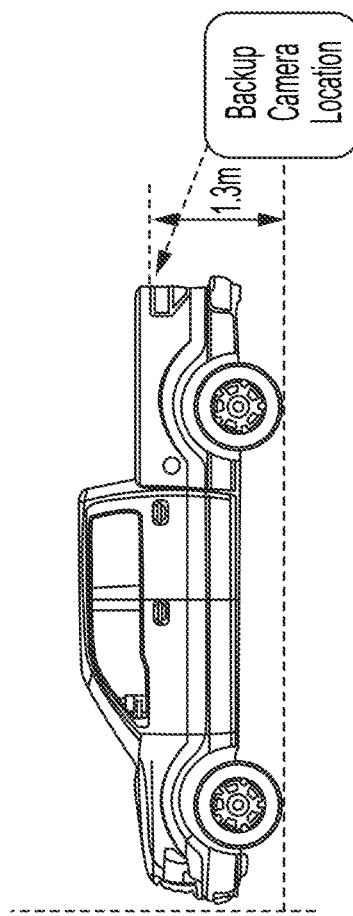
FIGS. 32A and 32B show the location of a rear backup camera on a vehicle, shown as a pickup truck.
Figure 32B:
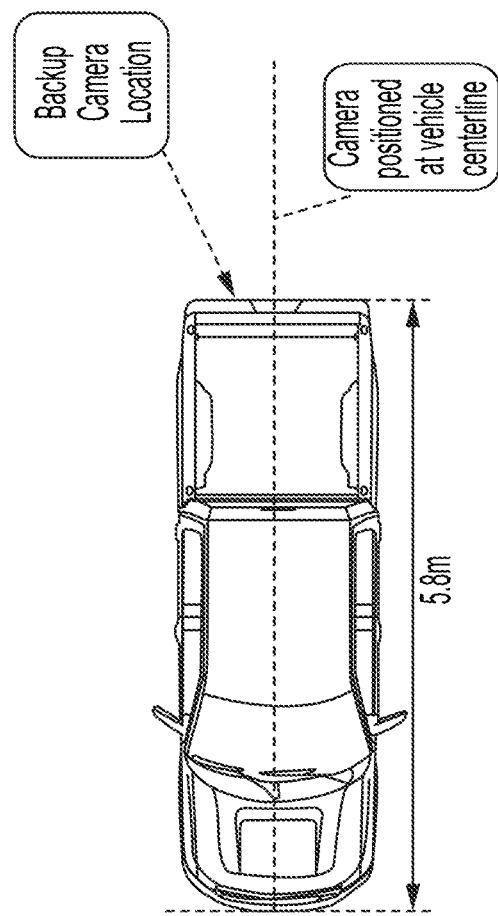
Figure 33A:
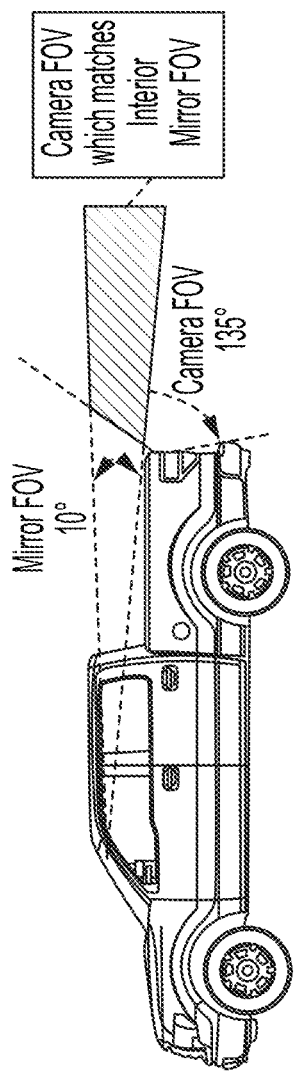
FIGS. 33A and 33B show the fields of view for a rear backup camera and for the interior rearview mirror of the vehicle.
Figure 33B:
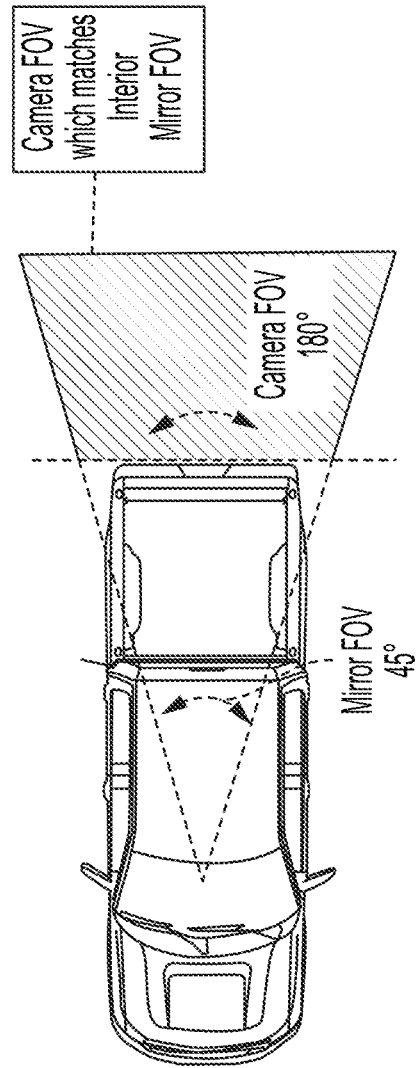
Figure 34A:
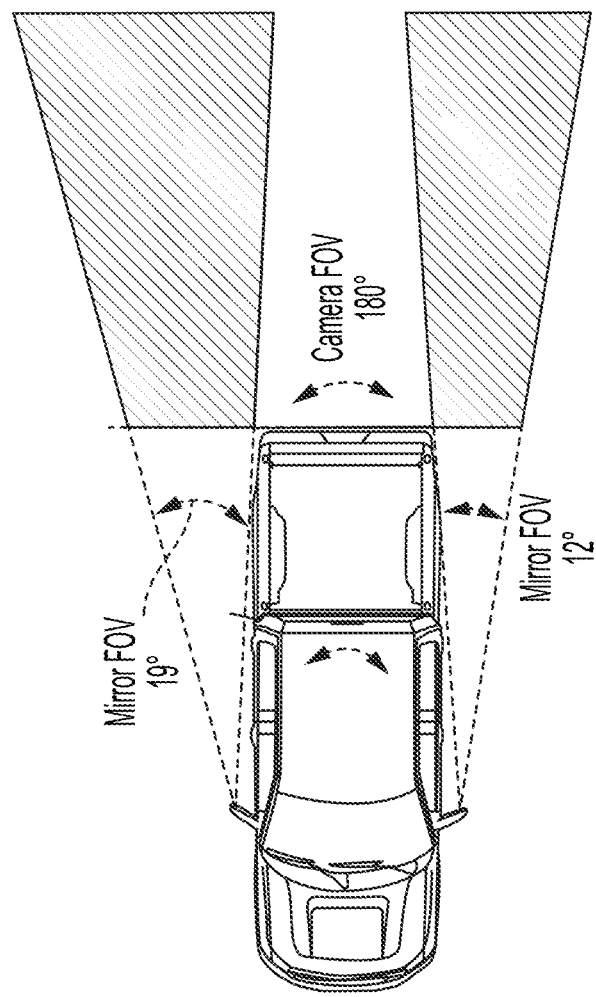
FIGS. 34A and 34B show the fields of view for a rear backup camera and for interior and exterior rearview mirrors of the vehicle.
Figure 34B:
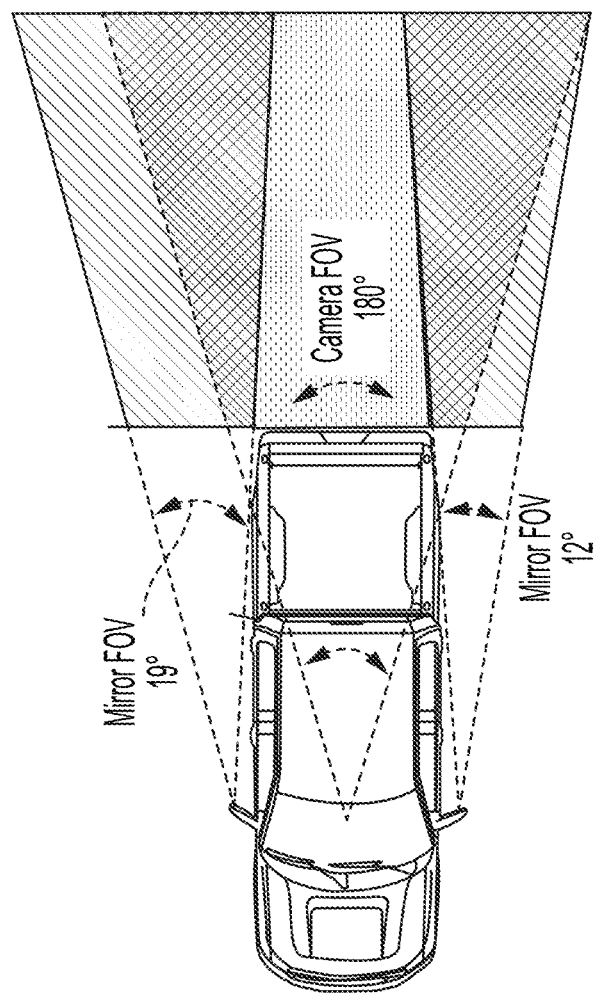
Figure 35:
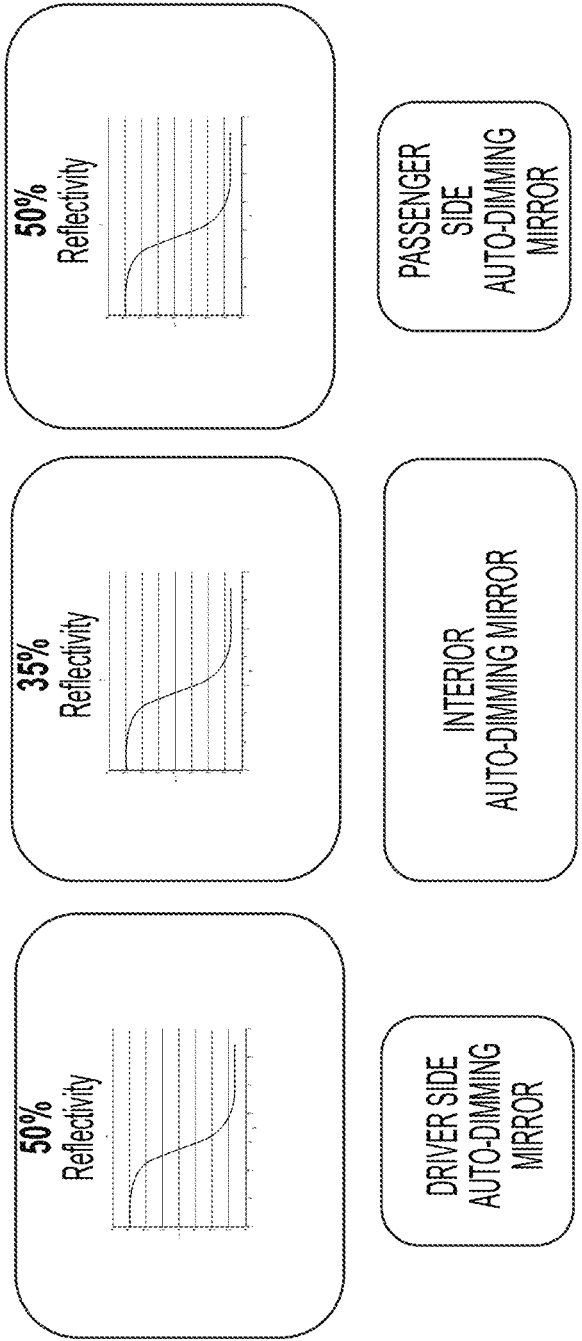
FIG. 35 shows control transition curves for independently controlling the interior and exterior mirrors responsive to processing of image data captured by the rear backup camera.

Referring now to FIGS. 32A-34B, a vehicle has a rear backup camera mounted at a typical height and location at a rear portion (typically at a center region) of the vehicle. As can be seen in FIG. 32, the rear backup camera's field of view encompasses at least the area immediately behind the vehicle and preferably encompasses a rear body portion (e.g., rear bumper) of the vehicle (such as by utilizing aspects of the vision systems described in U.S. Pat. Nos. 6,690,268 and 7,167,796, which are hereby incorporated herein by reference in their entireties. The camera may have a wide angle rearward field of view, such as 180 degrees (or more) laterally and at least 100 degrees vertically, such as around 135 degrees vertically (such as shown in FIGS. 33A and 33B). To provide the appropriate FOV and to meet the requirements of FMVSS 111, the principal axis of the camera is tilted more downward towards the ground. As can be seen in FIGS. 33A-34A, the regions of interest or zone of activity for the EC dimming of the interior and/or exterior mirrors are the zones where there is overlap of the rearward field of view of the respective mirror and the rearward field of view of the rear camera (if the camera is located off of the centerline of the vehicle, the mirror zone of activity may be adjusted to accommodate such offset, such that the mirror zone of activity corresponds to where the interior rearview mirror views rearward of the vehicle). The overlap areas or zone of activity thus defines the regions that are usable for glare detection. Thus, responsive to processing of image data captured by the cameras at respective zones (such as the three zones in FIG. 34B, including a passenger side mirror zone, an interior mirror zone and a driver side mirror zone), the control circuitry can drive or dim an appropriate one or more of the three mirrors. For example, and as shown in FIG. 35, the dimming control can dynamically monitor and drive or control the respective EC cells of the three mirrors to provide an appropriate degree of dimming for each mirror (with each mirror being independently controlled based on determined glare at its respective zone of activity).

The rear backup camera can thus provide a rear backup camera function (such as capturing image data for object detection or display of video images during a reversing maneuver of the vehicle) and an EC driving/dimming function (such as determining glare in one or more particular zones of the captured image data and controlling or dimming a respective one or more of the mirrors accordingly). The system thus may dynamically track the glare light (determining the presence of such light, and the intensity of the light and the position of the light in the camera's field of view) for all three mirrors and control the mirrors accordingly to provide the desired or appropriate degree of dimming as glare light is detected at one or more of the zones of activity. Optionally, the system may process image data captured by the rear backup camera to determine the distance and location of a glare light source, such as by determining the number of pixels occupied by the glare light source (knowing a typical size of a headlamp) or the number of pixels between two glare light sources (knowing a typical spacing between headlights of a vehicle). Optionally, the system may determine a color of the detected glare light source and may determine or recognize that the glare light source is an LED headlight of a vehicle or an incandescent lamp or the like.

Thus, the rear backup camera may be used for glare and ambient light monitoring, with the camera monitoring ambient light behind vehicle and glare light behind the vehicle. The camera can detect glare for all three mirror positions. The camera measurement area is dynamic and can be changed for resolution, and the camera measurement area size can be optimized for headlights for best resolution. The ambient measurement zone may be at the outer regions of the viewing area where glare light is not expected to be (see FIGS. 24 and 26).

Figure 36:
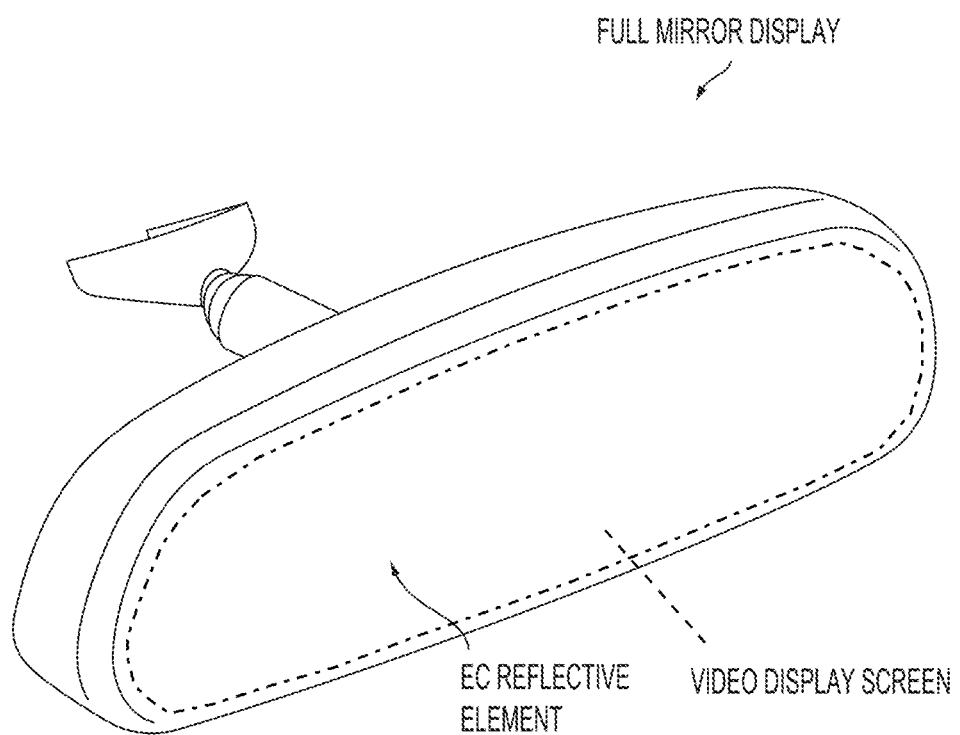
FIG. 36 is a perspective view of an interior rearview mirror assembly having a full mirror display screen for displaying video images captured by the rear backup camera.

Optionally, the rear backup camera may also be used to capture image data for a full mirror display screen disposed in the interior mirror head. For example (and such as described in U.S. Publication No. US-2016-0375833, which is hereby incorporated herein by reference in its entirety), and as shown in FIG. 36, the interior rearview mirror may include a video display screen that displays images derived from image data captured by a rearward viewing camera when the mirror is set to a display mode. In such applications, the camera may capture image data and only a relevant portion of the captured image data (such as the zone of activity for the interior mirror) may be used to generate images for display at the mirror when the mirror is in the display mode (which provides about the same view as the mirror itself would in the mirror mode, but since the camera is typically outside of the body of the vehicle (or inside but at the rear window and viewing through the rear window), the camera's view is without any obstruction of passengers or occupants or cargo or seat headrests that may block or obstruct the field of view of the driver via reflectance off of the mirror reflector of the mirror reflective element of the interior mirror). The backup camera may also be used to determine the ambient lighting (such as by determining light levels at the upper corner regions of the camera's field of view or of the zone of activity) and thus to adjust the backlighting intensity of the video display. The mirror display screen may comprise a full mirror display and may utilize aspects of the mirror displays described in U.S. Publication No. US-2016-0375833 and/or U.S. provisional applications, Ser. No. 62/476,951, filed Mar. 27, 2017, Ser. No. 62/466,089, filed Mar. 2, 2017, Ser. No. 62/355,460, filed Jun. 28, 2016, and/or 62/334,506, filed May 11, 2016, which are all hereby incorporated herein by reference in their entireties. With such a full mirror display, the video display screen may occupy at least 75 percent of the reflective region of the mirror reflective element. The display device includes a backlighting array of LEDs for backlighting a display screen (such as a TFT display screen or the like), and the backlighting array of LEDs may include a plurality of zones of LEDs, such that the zones may be independently controlled.

The full mirror display mirror assembly thus may function in a mirror mode, where the mirror head is adjusted by the driver of the vehicle so as to provide a mirror rearward field of view rearward and through a rear window of the vehicle, such as in a similar manner as conventional interior rearview mirror assemblies. The mirror assembly may also function in a display mode (such as responsive to actuation of a user input, such as a button or switch or the like, or such as via a voice command or touch sensor or the like, such as a touch or proximity sensor disposed at and behind a front substrate of the mirror reflective element at a lower region of the reflective element), where the display screen in the mirror head is activated so that the driver views displayed video images (or other information) through the reflective element of the mirror assembly. When the mirror assembly is operating in the display mode, the mirror head may pivot or adjust more towards the driver (such as downward and/or toward the driver side of the vehicle) to enhance the driver's view of the displayed images (such adjustment may be manual or may be via an actuator of the mirror that makes the adjustment responsive to the mirror switching to the display mode, and then reverses the adjustment responsive to the mirror switching back to the mirror mode). Optionally, when the mirror assembly is operating in the display mode, the mirror head may pivot or adjust upward, with the upward tilting of the mirror head causing the primary reflection off of the reflective element to be out of the driver's eyes (since it would be aimed up toward the headliner or down into the cabin area instead of out the rear window).

The present invention thus may provide EC dimming control of an interior rearview mirror assembly and optionally also the exterior rearview mirror assemblies via processing of frames of image data captured by a rear backup camera of the vehicle. Optionally, the sensing and dimming driver circuitry can all be packaged in the rear backup camera, such that the electronic content of the mirror head can be significantly reduced. Optionally, the glare and ambient light sensing may be provided by the rear backup camera, whereby the camera may provide a pulse width modulation (PWM) signal to the circuitry in the mirror head. Optionally, the glare and ambient light sensing may be provided by the rear backup camera, and the camera may provide an EC drive output to the mirror head. Optionally, the sensing and EC driving may be provided by a surround view electronic control module or ECU (that may process image data captured by a rearward viewing camera of the vehicle). Optionally, the glare and ambient light sensing may be provided by one or more others of a surround view system, such as by a forward viewing camera (for ambient light) and/or driver and passenger side viewing cameras (for glare and ambient light).

The present invention thus provides enhanced styling of the interior mirror head (due to the reduced electronic content, the mirror head may have a thinner or lower profile housing or may comprise a caseless mirror head, such as discussed above). This reduces the interior mirror mass and costs, and may provide enhanced performance of the EC (glare and ambient light) sensor(s), since the sensor is not sensing through a rear window (which may have varying tint levels from one vehicle to another), and since the glare sensor will not be blocked by a rear head rest or a rear occupant of the vehicle. The present invention thus provides reduced system cost and complexity to OEMs. For example, by moving the sensors and controls out of the mirror head and utilizing the existing capabilities of the rear backup camera (and/or surround view ECU), the system can reduce mirror costs by reducing the electronic components in the mirror from around 50 to around 30 components or even down to around only 2 components (if all electronics are in the rear backup camera, such that the mirror cell merely receives a power signal or cell electrification signal from the camera or ECU).

Optionally, and such as disclosed in U.S. Publication No. US-2013-0338882 (which is hereby incorporated herein by reference in its entirety), an electronics module is disposed at an interior surface of a windshield of a vehicle equipped with an accessory system. A mirror head having an electro-optic reflective element is pivotally attached at the electronics module. Control circuitry is disposed in the electronics module. When the mirror head is pivotally attached at the electronics module, the control circuitry is electrically connected to an electro-optic reflective element of the mirror head and is operable to control dimming of the electro-optic reflective element. The control circuitry is at least operable to control dimming of the electro-optic reflective element responsive to at least one photosensor or camera. The control circuitry is associated with at least one other function or system of the equipped vehicle. Preferably, the electronics module houses a camera and the control circuitry is at least in part associated with the camera. Preferably, the control circuitry comprises an image processor operable to process image data captured by the camera, and the camera has a forward field of view through a windshield of the equipped vehicle. Preferably, the image processor processes captured image data for at least two driver assistance functions selected from the group consisting of (i) headlamp control, (ii) lane keeping, (iii) forward collision detection, (iv) collision mitigation braking, (v) automatic emergency braking, (vi) traffic sign recognition and (vii) pedestrian detection.

Optionally, by further combining the mirror electronics and rear backup camera electronics (such as at a rear portion of the vehicle, such as at a rear handle assembly for a liftgate or the like), the rear camera can provide glare feedback for auto-dimming the mirror reflective elements(s) of auto-dimming mirrors of the equipped vehicle. A camera to control automatic dimming of an interior and/or exterior electro-optic mirror assembly or system of the equipped vehicle may be mounted at a side portion of the equipped vehicle, at or on a roof of the equipped vehicle and/or a rear portion of an equipped vehicle.

By combining the electronics content of outside mirrors and outside mirror controls (such as a LIN module or indicators or lighting) with a camera (such as from a surround vision system such as disclosed in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties), package size can be reduced and electronics functionality is enhanced. As discussed above, by combining mirror electronics (such as compass, video display, GDO, ETC, telematics, base circuitry and/or the like) and camera electronics, the auto-dimming functionality typically contained in the inside mirror electronics can be assimilated into the overall system, with greater functionality (such as independently dimming each individual mirror in a 3-mirror set) and lower costs. As indicated above, a rear camera can provide glare feedback for auto-dimming mirrors. A camera mounted as part of an exterior door handle of an equipped vehicle can provide glare feedback for auto-dimming mirrors.

Thus, the present invention provides a multifunctional rear backup camera system for a vehicle that includes a rear backup camera disposed at a rear portion of a vehicle equipped with the multifunctional rear backup camera system so as to have a rearward field of view rearward of the vehicle, with the rearward field of view encompassing a region encompassed by a rearward view of the driver of the vehicle via the interior rearview mirror and encompassing a rear blind zone immediately to the rear of the equipped vehicle that is not encompassed by the field of rearward view of the interior mirror assembly of the equipped vehicle. A processor is operable to process image data captured by the rear backup camera. Responsive to processing by the processor of image data captured by the rear backup camera, the processor is operable to generate respective outputs for (i) a rear backup camera function, (ii) a mirror dimming control at least for an electro-optic interior mirror assembly of the equipped vehicle and (iii) ambient light detection. The processor processes a mirror zone of captured frames of image data for mirror dimming control and processes upper corner regions of captured frames of image data for ambient light detection. The processor processes lower regions of captured frames of image data for the rear backup camera function, with the lower regions encompassing a rear blind zone immediately to the rear of the equipped vehicle that is not encompassed by the field of rearward view of the electro-optic interior mirror assembly of the equipped vehicle, such that the lower regions are used to monitor the area immediately rearward of the equipped vehicle to assist the driver of the vehicle during a reversing maneuver of the vehicle.

The interior rearview mirror assembly includes an electro-optic reflective element and the output for the mirror dimming control is provided to the interior rearview mirror assembly to control dimming of the electro-optic reflective element. The output for the rear backup camera function provides one of (i) object detection and (ii) video display at a display device viewable by a driver of the vehicle of video images derived from captured frames of image data.

The processor processes image data of the substantially the entire rearward field of view of the rear backup camera for the rear backup camera function. Based on such processing, the output for the rear backup camera function may provide video display of video images derived from captured frames of image data, with the video display being at a video display screen or device (such as a backlit thin film transistor (TFT) display screen or the like) viewable by a driver of the equipped vehicle. The display device may be disposed at the interior rearview mirror assembly and behind the electro-optic reflective element and is viewable, when activated, through the electro-optic reflective element.

The display device thus may assist the driver in a reversing maneuver by displaying (such as at the mirror head) images representative of the rearward field of view of the rear backup camera. Such display may assist the driver in parking or reversing out of a driveway or parking space, and may assist the driver in a trailer hookup function, where the driver is reversing the vehicle toward a trailer hitch to align the tow ball of the vehicle with the trailer hitch. The system may provide graphic overlays or the like to assist the driver in reversing the vehicle toward the trailer hitch or toward a parking space or the like, such as by utilizing aspects of the systems described in U.S. Pat. Nos. 8,874,317; 6,690,268 and/or 5,949,331, which are hereby incorporated herein by reference in their entireties.

Optionally, responsive to processing by the processor of image data captured by the rear backup camera, the processor may generate respective outputs for mirror dimming control for electro-optic reflective elements of the interior mirror assembly, a driver-side exterior rearview mirror assembly and a passenger-side exterior rearview mirror assembly. The respective outputs for mirror dimming control may be provided responsive to glare light detection (via luminance values of cells or sub-arrays of captured image data as determined by the camera's ISP) at respective mirror zones of captured frames of image data for the interior rearview mirror assembly, the driver-side exterior rearview mirror assembly and the passenger-side exterior rearview mirror assembly. For example, a mirror zone for the interior rearview mirror comprises a zone of image data encompassed by the rearward view of the driver via reflection at the interior rearview mirror assembly when the interior rearview mirror assembly is mounted at an interior portion of the vehicle and when the driver is driving the vehicle, while a mirror zone for the driver-side exterior rearview mirror assembly comprises a zone of image data encompassed by the rearward view of the driver via reflection at the driver-side exterior rearview mirror assembly when the driver-side exterior rearview mirror assembly is mounted at a driver side portion of the vehicle and when the driver is driving the vehicle, and a mirror zone for the passenger-side exterior rearview mirror assembly comprises a zone of image data encompassed by the rearward view of the driver via reflection at the passenger-side exterior rearview mirror assembly when the passenger-side exterior rearview mirror assembly is mounted at a passenger side portion of the vehicle and when the driver is driving the vehicle.

Therefore, the present invention provides an "all-in-one" single rear backup camera multifunctionality, where processing of image data captured by a single rear backup camera can be used to (i) provide video images for display during a reversing maneuver, (ii) provide object detection of objects rearward of the vehicle to assist the driver during a reversing maneuver, (iii) provide glare light determination at one or more mirror zones of activity and to provide control signals for dimming the interior rearview mirror and/or the exterior rearview mirrors, and (iv) provide ambient light determination. Such an all-in-one multifunctional rear backup camera is an improvement over known display systems that use two separate cameras disposed at the rear of the vehicle (such as provided on the 2016 Cadillac CT6), with one camera for the rear backup camera function and a separate camera for a mirror display (such as a full mirror display), and with the separate EC control circuitry (and glare sensor and ambient light sensor) in the mirror casing of the interior mirror assembly. The present invention thus provides reduced electronic content in the mirror assembly and avoids use of multiple cameras or sensors, instead using a single existing rear backup camera to provide video images for display, object detection, and EC dimming control (optionally independent EC dimming control of each of the interior mirror, driver-side mirror and passenger-side mirror based on processing of captured image data representative of respective zones of activity for each mirror).

Thus, the system may process consecutive frames of video image data (captured by the single rear backup camera) for at least triple functionality, including (i) rear blind spot monitoring when executing a reversing maneuver or as part of a 360 degree surround view or bird's eye view system, (ii) electro-optic dimming control with particular functionality in the context of the caseless electro-optic rear view mirror assemblies and systems of the present invention, (iii) light detection such as for electro-optic dimming control or for other accessories or systems of the vehicle (such as for use in controlling the intensity of the video display screen responsive to changes in ambient lighting conditions), and/or (iv) following/trailing traffic monitoring in conjunction with or for a full mirror display camera monitoring system that allows a driver to choose between a rearward view provided by the mirror reflector of the mirror reflective element of the interior rearview mirror assembly and a full video display that displays video images provided by frames of image data captured by the single multifunctional rear backup camera of the vehicle. Thus, in accordance with the present invention, an automaker can utilize a rear backup camera (now mandated after 2018 per FMVSS 111 to be present on all light vehicles manufactured and used in the United States) for multiple functions without the need to provide separate cameras and/or separate photosensors for functions other than rear blind spot monitoring.

Changes and modifications to the specifically described embodiments may be carried out without departing from the principles of the present invention, which is intended to be limited only by the scope of the appended claims, as interpreted according to the principles of patent law.

The invention claimed is:

1. A multifunctional rear backup camera system for a vehicle, said multifunctional rear backup camera system comprising:
   a rear backup camera disposed at a rear portion of a vehicle equipped with said multifunctional rear backup camera system so as to have a rearward field of view;
   a processor operable to process frames of image data captured by said rear backup camera;

wherein, responsive to processing by said processor of frames of image data captured by said rear backup camera, said processor generates respective outputs for (i) a rear backup assist function, (ii) a mirror dimming control for at least an electro-optic interior rearview mirror assembly of the equipped vehicle and (iii) ambient light detection;

wherein said processor processes a mirror zone of captured frames of image data for mirror dimming control and processes upper corner regions of captured frames of image data for ambient light detection;

wherein said processor processes at least lower regions of captured frames of image data for the rear backup assist function, and wherein the lower regions encompass a rear blind zone immediately to the rear of the equipped vehicle that is not encompassed by the mirror-reflected rearward view of the electro-optic interior rearview mirror assembly of the equipped vehicle;

wherein the electro-optic interior rearview mirror assembly includes an electro-optic reflective element, and wherein the generated output for the mirror dimming control is provided to the electro-optic interior rearview mirror assembly to control dimming of the electro-optic reflective element; and wherein the generated output for the rear backup assist function provides at least one selected from the group consisting of (i) object detection and (ii) video display at a display device viewable by a driver of the equipped vehicle of video images derived from captured frames of image data.

2. The multifunctional rear backup camera system of claim 1, wherein said processor processes captured frames of image data of the entire rearward field of view of said rear backup camera for the rear backup assist function.

3. The multifunctional rear backup camera system of claim 1, wherein the generated output for the rear backup assist function provides video display at a display device viewable by a driver of the equipped vehicle of video images derived from captured frames of image data.

4. The multifunctional rear backup camera system of claim 3, wherein said display device is disposed at the electro-optic interior rearview mirror assembly.

5. The multifunctional rear backup camera system of claim 4, wherein said display device is disposed behind the electro-optic reflective element and is viewable, when activated, through the electro-optic reflective element.

6. The multifunctional rear backup camera system of claim 5, wherein said display device comprises a full mirror display, and wherein the electro-optic interior rearview mirror assembly is operable in a display mode to display video images at the reflective area of the electro-optic interior rearview mirror assembly.

7. The multifunctional rear backup camera system of claim 6, wherein, responsive to processing by said processor of frames of image data captured by said rear backup camera, said processor generates an output for displaying video images derived from the mirror zone of the captured frames of image data.

8. The multifunctional rear backup camera system of claim 1, wherein, responsive to processing by said processor of frames of image data captured by said rear backup camera, said processor generates respective outputs for mirror dimming control for electro-optic reflective elements of an electro-optic exterior driver-side rearview mirror assembly and an electro-optic exterior passenger-side rearview mirror assembly.

9. The multifunctional rear backup camera system of claim 8, wherein respective outputs for mirror dimming control are provided responsive to glare light detection at respective mirror zones of captured frames of image data for the electro-optic interior rearview mirror assembly, the electro-optic exterior driver-side rearview mirror assembly and the electro-optic exterior passenger-side rearview mirror assembly.

10. The multifunctional rear backup camera system of claim 1, wherein the electro-optic reflective element comprises a caseless electro-optic rearview mirror reflective element comprising (i) a front transparent glass substrate having a planar first surface and a second surface opposing the planar first surface, and wherein the front transparent glass substrate comprises a rounded outer circumferential glass region circumscribing the planar first surface, (ii) a rear substrate having a third surface and a fourth surface opposing the third surface, and wherein the rear substrate comprises a rounded outer circumferential region circumscribing the fourth surface, and (iii) an electro-optic medium sandwiched between and contacting a transparent electrical conductor disposed at the second surface of the front transparent glass substrate and a mirror reflector disposed at the third surface of the rear substrate.

11. The multifunctional rear backup camera system of claim 10, wherein the rounded outer circumferential glass region of the front transparent glass substrate has a radius of curvature of at least 2.5 mm, and wherein the rounded outer circumferential region of the rear substrate has a radius of curvature of at least 2.5 mm.

12. The multifunctional rear backup camera system of claim 10, wherein the caseless electro-optic rearview mirror reflective element comprises a plate at the rear of the rear substrate, and wherein the plate of the caseless electro-optic rearview mirror reflective element is connected to and is pivotable relative to a mounting structure at an interior portion of the vehicle via a ball and socket pivot joint, and wherein one selected from the group consisting of (i) a socket pivot element of the plate forms the ball and socket pivot joint with a ball pivot element of the mounting structure at the interior portion of the vehicle and (ii) a ball pivot element of the plate forms the ball and socket pivot joint with a socket element of the mounting structure at the interior portion of the vehicle, and wherein, with the plate of the caseless electro-optic rearview mirror reflective element connected to the interior portion of the vehicle via the ball and socket pivot joint, the rounded outer circumferential glass region of the front transparent glass substrate and the rounded outer circumferential region of the rear substrate are viewable and contactable by an occupant of the vehicle.

13. The multifunctional rear backup camera system of claim 12, wherein control circuitry for the mirror dimming control is disposed in the vehicle separate from the caseless electro-optic rearview mirror reflective element, and wherein, with the plate of the caseless electro-optic rearview mirror reflective element connected to the interior portion of the vehicle via the ball and socket pivot joint, the control circuitry controls dimming of the electro-optic medium of the caseless electro-optic rearview mirror reflective element via wiring that passes through the ball and socket pivot joint.

14. The multifunctional rear backup camera system of claim 12, wherein the plate is attached at a rear portion of the rear substrate.

15. The multifunctional rear backup camera system of claim 14, wherein the plate is received in a recess established at the rear portion of the rear substrate.

16. The multifunctional rear backup camera system of claim 12, wherein the rear substrate comprises the plate.

17. The multifunctional rear backup camera system of claim 12, wherein the rear substrate comprises a rear glass substrate.

18. A multifunctional rear backup camera system for a vehicle, said multifunctional rear backup camera system comprising:
 a rear backup camera disposed at a rear portion of a vehicle equipped with said multifunctional rear backup camera system so as to have a rearward field of view;
 a processor operable to process frames of image data captured by said rear backup camera;
 wherein, responsive to processing by said processor of frames of image data captured by said rear backup camera, said processor generates respective outputs for (i) a rear backup assist function, (ii) a mirror dimming control for an electro-optic interior rearview mirror assembly of the equipped vehicle and an electro-optic exterior driver-side rearview mirror assembly of the equipped vehicle, and (iii) ambient light detection;
 wherein said processor processes a mirror zone of captured frames of image data for mirror dimming control and processes upper corner regions of captured frames of image data for ambient light detection;
 wherein said processor processes at least lower regions of captured frames of image data for the rear backup assist function, and wherein the lower regions encompass a rear blind zone immediately to the rear of the equipped vehicle that is not encompassed by the mirror-reflected rearward view of the electro-optic interior rearview mirror assembly of the equipped vehicle;
 wherein each of the electro-optic interior rearview mirror assembly and the electro-optic exterior driver-side rearview mirror assembly includes an electro-optic reflective element, and wherein respective outputs for the mirror dimming control are provided to (i) the electro-optic interior rearview mirror assembly to control dimming of the electro-optic reflective element of the electro-optic interior rearview mirror assembly and (ii) the electro-optic exterior driver-side rearview mirror assembly to control dimming of the electro-optic reflective element of the electro-optic exterior driver-side rearview mirror assembly; and
 wherein the generated output for the rear backup assist function provides (i) object detection and (ii) video display at a display device viewable by a driver of the equipped vehicle of video images derived from captured frames of image data.

19. The multifunctional rear backup camera system of claim 18, wherein said processor processes captured frames of image data of the entire rearward field of view of said rear backup camera for the rear backup assist function.

20. The multifunctional rear backup camera system of claim 18, wherein said display device is disposed behind the electro-optic reflective element of the electro-optic interior rearview mirror assembly and is viewable, when activated, through the electro-optic reflective element of the electro-optic interior rearview mirror assembly.

21. The multifunctional rear backup camera system of claim 20, wherein said display device comprises a full mirror display, and wherein the electro-optic interior rearview mirror assembly is operable in a display mode to display video images at the reflective area of the electro-optic interior rearview mirror assembly.

22. The multifunctional rear backup camera system of claim 21, wherein, responsive to processing by said processor of frames of image data captured by said rear backup camera, said processor generates an output for displaying video images derived from the mirror zone of the captured frames of image data.

23. The multifunctional rear backup camera system of claim 18, wherein respective outputs for mirror dimming control are provided responsive to glare light detection at respective mirror zones of captured frames of image data for the electro-optic interior rearview mirror assembly and the electro-optic exterior driver-side rearview mirror assembly.

24. A multifunctional rearward viewing camera system for a vehicle, said multifunctional rearward viewing camera system comprising:
 a rearward viewing camera disposed at a vehicle equipped with said multifunctional rearward viewing camera system so as to have a rearward field of view;
 a processor operable to process frames of image data captured by said rearward viewing camera;
 wherein, responsive to processing by said processor of frames of image data captured by said rearward viewing camera, said processor generates respective outputs for (i) a video image display function that displays at a video display screen video images derived from frames of image data captured by said rearward viewing camera, (ii) a mirror dimming control for an electro-optic interior rearview mirror assembly of the equipped vehicle and an electro-optic exterior driver-side rearview mirror assembly of the equipped vehicle and (iii) ambient light detection;
 wherein said processor processes a mirror zone of captured frames of image data for mirror dimming control and processes upper corner regions of captured frames of image data for ambient light detection;
 wherein said processor processes captured frames of image data for the video image display function;
 wherein the electro-optic interior rearview mirror assembly includes an electro-optic reflective element, and wherein the generated output for the mirror dimming control is provided to the electro-optic interior rearview mirror assembly to control dimming of the electro-optic reflective element of the electro-optic interior rearview mirror assembly;
 wherein the electro-optic exterior driver-side rearview mirror assembly includes an electro-optic reflective element, and wherein the generated output for the mirror dimming control is provided to the electro-optic exterior driver-side rearview mirror assembly to control dimming of the electro-optic reflective element of the electro-optic exterior driver-side rearview mirror assembly; and
 wherein the generated output for the video image display function provides video display at said video display screen viewable by a driver of the equipped vehicle of video images derived from captured frames of image data.

25. The multifunctional rearward viewing camera system of claim 24, wherein said video display screen is disposed behind the electro-optic reflective element of the electro-optic interior rearview mirror assembly and is viewable, when activated, through the electro-optic reflective element.

26. The multifunctional rearward viewing camera system of claim 25, wherein said video display screen comprises a full mirror display, and wherein the electro-optic interior rearview mirror assembly is operable in a display mode to display video images at the reflective area of the electro-optic interior rearview mirror assembly.

27. The multifunctional rearward viewing camera system of claim 26, wherein, responsive to processing by said processor of frames of image data captured by said rearward viewing camera, said processor generates an output for displaying video images derived from the mirror zone of the captured frames of image data.

28. The multifunctional rearward viewing camera system of claim 24, wherein respective outputs for mirror dimming control are provided responsive to glare light detection at respective mirror zones of captured frames of image data for the electro-optic interior rearview mirror assembly and the electro-optic exterior driver-side rearview mirror assembly.

* * * * *